(12) United States Patent
Ishikawa

(10) Patent No.: US 6,266,594 B1
(45) Date of Patent: Jul. 24, 2001

(54) BODY SWING CONTROL APPARATUS FOR INDUSTRIAL VEHICLES

(75) Inventor: Kazuo Ishikawa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/061,389

(22) Filed: Apr. 16, 1998

(30) Foreign Application Priority Data

| Apr. 23, 1997 | (JP) | 9-106012 |
| May 23, 1997 | (JP) | 9-133718 |
| Jun. 6, 1997 | (JP) | 9-149508 |
| Jun. 9, 1997 | (JP) | 9-151059 |
| Jun. 11, 1997 | (JP) | 9-153998 |

(51) Int. Cl.[7] .......................... B60G 17/08; B60G 17/015
(52) U.S. Cl. ..................... 701/50; 701/50; 701/213; 701/124; 702/101; 702/102; 177/1; 177/136; 177/141; 340/438
(58) Field of Search ................ 701/50, 124, 213; 364/424.04; 340/438; 702/101, 102, 41, 42; 177/136, 1, 141

(56) References Cited

U.S. PATENT DOCUMENTS

| 4,499,541 | * | 2/1985 | Yuki et al. ............... 364/424 |
| 4,511,974 | * | 4/1985 | Nakane et al. ............ 364/463 |
| 4,886,291 | | 12/1989 | Okamoto ................. 280/707 |
| 5,659,470 | * | 8/1997 | Goska et al. ............ 364/424.04 |
| 5,813,697 | * | 9/1998 | Bargenquast et al. ....... 280/754 |

(List continued on next page.)

FOREIGN PATENT DOCUMENTS

| 0 236 804 A1 | 9/1987 | (DE) | B66F/17/00 |
| 0 796 749 A2 | 9/1997 | (EP) | B60G/9/02 |
| 2264689 | * | 9/1993 | (GB) . |
| 2 290 149 | 12/1995 | (GB) | B66F/17/00 |
| 58-167400 | 10/1983 | (JP) . |
| 58-183307 | 10/1983 | (JP) . |
| 58167215 | 10/1983 | (JP) . |
| 58-211903 | * | 12/1983 | (JP) . |
| 61-036010 | 2/1986 | (JP) . |

(List continued on next page.)

OTHER PUBLICATIONS

Patent Abstracts of Japan, Publication No. 58183307, published Oct. 26, 1983.
Patent Abstracts of Japan, Publication No. 58214406, published Dec. 13, 1983.

*Primary Examiner*—William A. Cuchlinski, Jr.
*Assistant Examiner*—Tuan To
(74) *Attorney, Agent, or Firm*—Morgan & Finnegan, L.L.P.

(57) ABSTRACT

A rear axle which supports rear wheels is attached to the body of a vehicle in such a way as to be swingable up and down around a center pin. A controller detects the running state from detection values $\theta$ and V of a sensor for detecting the tire angle of the rear wheels and a sensor for detecting a vehicle speed, and detects the load state from detection values H and w of a height sensor and a pressure sensor. When a determination value derived from the detection values $\theta$ and V becomes equal to or greater than a set value which is determined in accordance with the detection values H and w, an electromagnetic changeover valve of a dumper is switched to carry out control to lock the rear axle. When a sensor is diagnoses as failing, maximum values $\theta$max and Vmax or the like are selected as most severe detection values. Even one of a set of sensors fails, therefore, the rear axle will not be locked as long as the vehicle runs in such a way that the detection value of the other sensor allows the determination value to be smaller than the set value.

31 Claims, 30 Drawing Sheets

U.S. PATENT DOCUMENTS

| | | | |
|---|---|---|---|
| 5,880,408 | * | 3/1999 | Schriener ............................. 177/136 |
| 5,941,921 | * | 8/1999 | Dasys et al. ......................... 701/50 |
| 5,950,141 | * | 9/1999 | Yamamoto et al. .................... 702/41 |
| 5,995,001 | * | 11/1999 | Wellman et al. ..................... 340/438 |
| 6,069,324 | * | 5/2000 | Shimizu et al. ...................... 177/136 |

FOREIGN PATENT DOCUMENTS

| | | | |
|---|---|---|---|
| 61-282110 | | 12/1986 | (JP) . |
| 62-149411 | | 9/1987 | (JP) . |
| 62-214009 | * | 9/1987 | (JP) . |
| 63-188511 | | 8/1988 | (JP) . |
| 2-227312 | | 9/1990 | (JP) . |
| 3-164320 | | 7/1991 | (JP) . |
| 5-193322 | | 8/1993 | (JP) . |
| 5-201221 | | 8/1993 | (JP) . |
| 58211903 | * | 12/1993 | (JP) . |
| 6-312611 | | 11/1994 | (JP) . |
| WO 94/00308 | * | 1/1994 | (WO) . |

* cited by examiner

<weight less than $W_0$>

<weight equal to or greater than $W_0$>

BODY SWING CONTROL APPARATUS FOR INDUSTRIAL VEHICLES

BACKGROUND OF THE INVENTION

The present invention relates to a body swing control apparatus for an industrial vehicle, which performs control to lock the axles swingably provided on the body of the industrial vehicle in accordance with the running state and/or the load state.

To stabilize an industrial vehicle like a forklIft while running, conventionally, the axle that supports the rear wheels is attached swingable to the body. When the forklift turns, the lateral force that is produced by the centrifugal force causes the body to tilt, which may result in lower running stability.

As a solution to this shortcoming, Japanese Unexamined Patent Publication No. Sho 58-211903 discloses a scheme of locking the axle when the centrifugal force acting on a vehicle is detected to be equal to or greater than a predetermined value by the centrifugal force detecting means that is provided on a forklift. The locking of the axle of this forklift suppresses any lower tilting of the body while turning and can thus allow the forklift to turn stably.

Japanese Unexamined Patent Publication No. Sho 58-167215 discloses a system which is equipped with means for detecting when the weight of a load on the fork becomes equal to or heavier than a predetermined weight and means for detecting when the fork rises to or above a predetermined height, and locks the axle when both detection means detect the mentioned statuses.

If the axle is left swingable when such a sensor fails, it becomes hard to secure the running stability when the vehicle makes a turn, or when the fork is heavily loaded and lifted up high. When a sensor fails, it is generally desirable to forcibly restrict the swinging of the axle to the safe side.

In the case where the axle is held locked at the time of failure of sensors, if the vehicle weight acts on the rear wheel side because of empty loads or the like while the forklift runs on a rough road, one of the drive wheels or the front wheels may be lifted up while the two rear wheels are in contact with the road. This leads to insufficient ground contact pressure of the drive wheels. In this case, the drive wheels probably slip and the forklift may not be able to move out in the worst case.

SUMMARY OF THE INVENTION

It is a primary object of the present invention to provide a body swing control apparatus for industrial vehicles which can prevent, as much as possible, occurrence of troubles, such as slipping of drive wheels in the light load state and running state, even when some sensor fails.

It is another object of this invention to secure a range where an axle is held swingable as wide as possible when a sensor fails.

It is a different object of this invention to provide an apparatus capable of ensuring stable turning even when a tire angle sensor fails.

It is yet another object of this invention to provide an apparatus capable of coping with a predictable unstable running state of a vehicle.

It is a further object of this invention to provide an apparatus capable of ensuring stable running of a vehicle by promptly locking an axle at the time the vehicle turns.

It is yet a further object of this invention to provide an apparatus which can allow an operator to easily grasp locking of an axle.

To achieve the foregoing objects, according to one aspect of this invention, there is provided an apparatus equipped with a lock mechanism for locking an axle, supported swingable up and down on a body of a runnable and loading industrial vehicle, for a purpose of ensuring stable running of the vehicle, which apparatus comprises a plurality of sensors for detecting at least one of a running state and a load state of the vehicle; control means for activating the lock mechanism when a determination value to be determined from detection values of at least two of the plurality of sensors satisfies a predetermined condition; and diagnosis means for diagnosing a failure of at least one sensor, whereby the lock mechanism is caused not to be activated when a determination value to be determined from the detection value of the sensor that has been diagnosed as failing by the diagnosis means takes a value within a normal detection range of that sensor, which is most likely to satisfy the predetermined condition.

According to another aspect of this invention, there is provided an apparatus equipped with a lock mechanism for locking an axle, supported swingable up and down on a body of a runnable and loading industrial vehicle, for a purpose of ensuring stable running of the vehicle, which apparatus comprises tire angle detection means for detecting a tire angle of the industrial vehicle; steering angle detection means for detecting a steering angle of the industrial vehicle; vehicle speed detection means for detecting a running speed of the industrial vehicle; first detection means for providing a determination value based on the tire angle detected by the tire angle detection means and the running speed detected by the vehicle speed detection means, when the tire angle detection means is normal; second detection means for providing a determination value based on the steering angle detected by the steering angle detection means and the running speed detected by the vehicle speed detection means, when the tire angle detection means fails; and control means for activating the lock mechanism when the determination value provided by any of the first and second detection means satisfies a preset predetermined condition.

According to yet another aspect of this invention, there is provided an apparatus equipped with a lock mechanism for locking an axle, supported swingable up and down on a body of a runnable and loading industrial vehicle, for a purpose of ensuring stable running of the vehicle, which apparatus comprises detection means for detecting a running state of the vehicle; prediction means for predicting a centrifugal acceleration to be applied to the vehicle based on a result of detection by the detection means; determination means for determining if the centrifugal acceleration predicted by the prediction means becomes greater than a reference value, when the lock mechanism is locking the axle; and control means for outputting a centrifugal acceleration countermeasure signal based on determination by the determination means.

According to a further aspect of this invention, there is provided an apparatus equipped with a lock mechanism for locking an axle, supported swingable up and down on a body of a runnable and loading industrial vehicle, when a running state of the vehicle satisfies a preset running condition, which apparatus comprises control means for outputting a display signal when the lock mechanism is activated; and display means for displaying the axle being locked, based on the display signal.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

First Embodiment

The first embodiment of the present invention will now be described referring to FIGS. 1 through 14.

Figure 1:
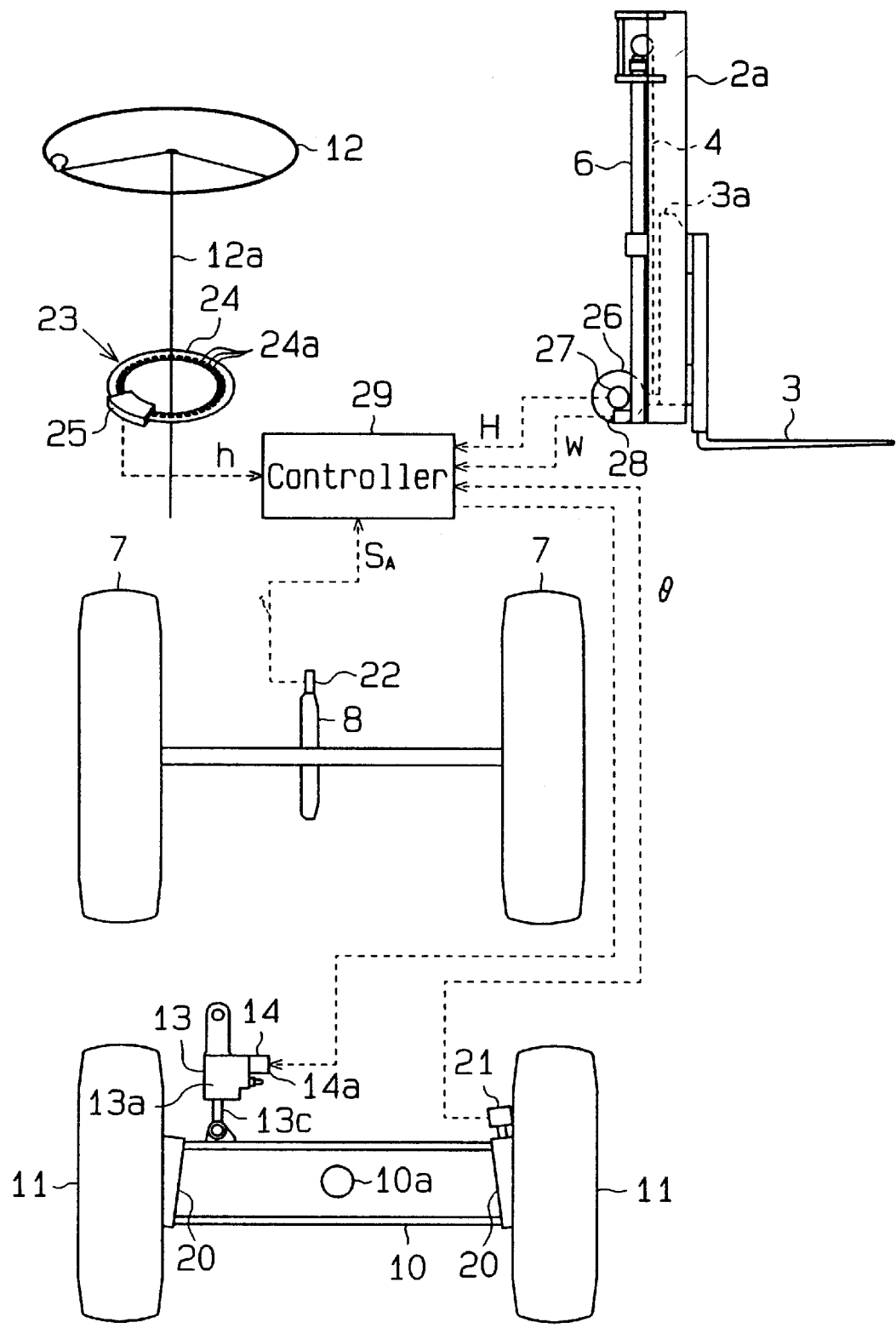
FIG. 1 is an exemplary diagram illustrating a body swing control apparatus according to a first embodiment of this invention.
Figure 3:
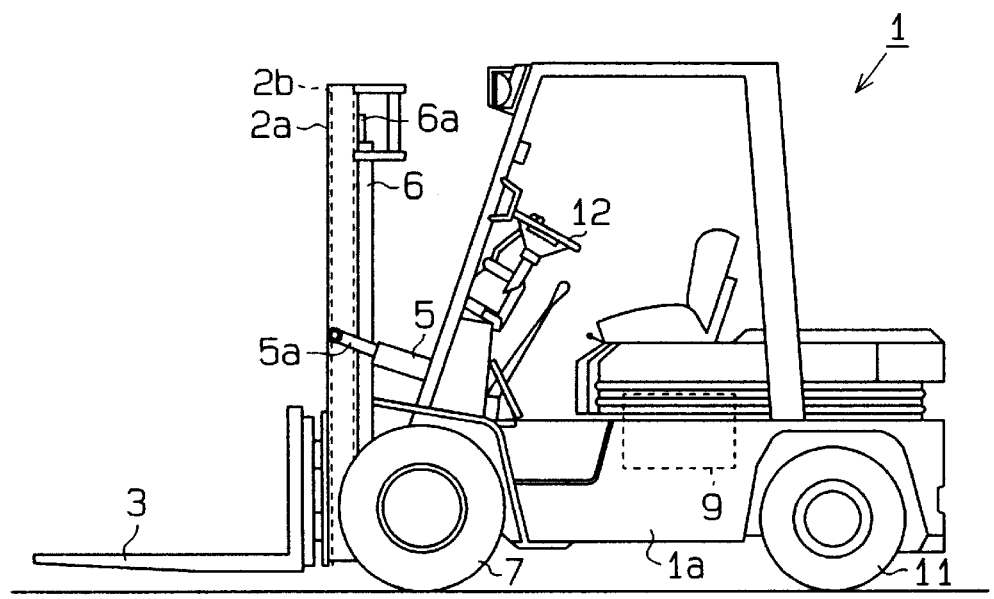
FIG. 3 is a side view of a forklift.

A forklift 1 shown in FIGS. 1 and 3 is a 4-wheel, front-drive and rear-steering type vehicle. As shown in FIG. 3, an inner mast 2b is provided in an elevatable manner between a pair of right and left outer masts 2a (only one shown) that stand upright at the front portion of the base of the forklift 1. A fork 3 hangs in a liftable manner from the inner mast 2b by means of a chain 4 (shown in FIG. 1). Each of outer masts 2a is coupled to a body frame 1a via a tilt cylinder 5. The outer mast 2a tilts as a piston rod 5a protracts from, and retracts in, the tilt cylinder 5. A lift cylinder 6 provided at the rear side of the outer mast 2a has a piston rod 6a coupled to the upper end portion of the inner mast 2b. As the piston rods 6a protracts from, and retracts in, the associated lift cylinders 6, the fork 3 moves up and down. Right and left front wheels 7 are driven by the power from an engine 9 (shown in FIG. 3) via differential gear 8 (shown in FIG. 1) and a transmission system (not shown).

Figure 2:
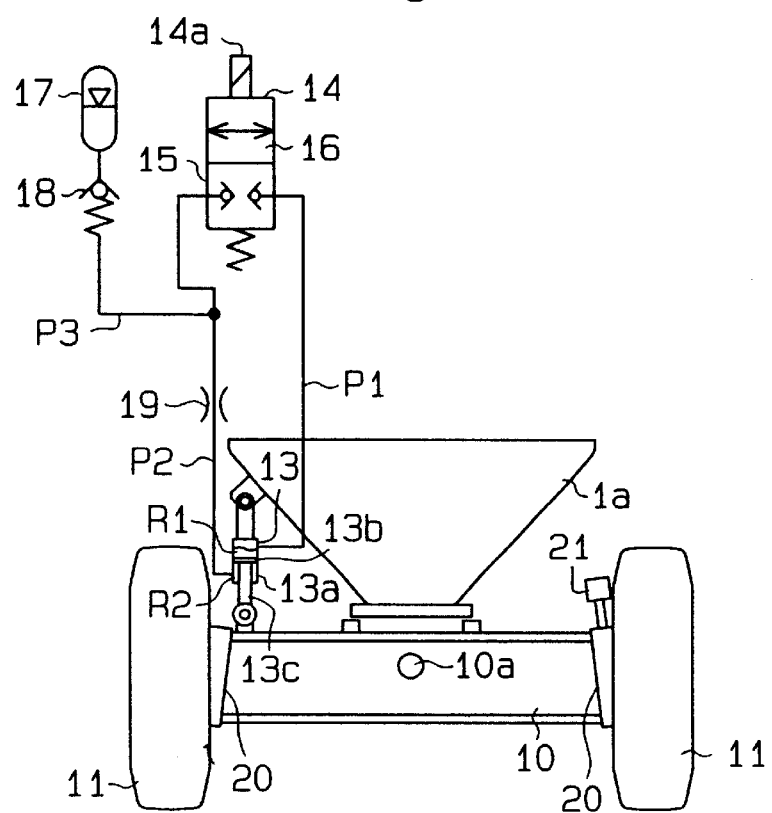
FIG. 2 is an exemplary diagram showing an axle restricting mechanism.

As shown in FIGS. 1 and 2, a rear axle 10 extends across the frame 1a under the rear portion of the frame 1a. The rear axle 10 is supported to be swingable (rotatable) in the up and down direction around a center pin 10a. Right and left wheels 11 swing together with the rear axle 10. The rear wheels 11 are steered based on the manipulation of a steering wheel 12.

The frame 1a and the rear axle 10 are coupled together by means of a single hydraulic dumper (hereinafter simply called "dumper") 13, which is of a double acting type. The dumper 13 has a cylinder 13a connected to the frame 1a, with a piston 13b retained in the cylinder 13a. The distal end of a piston rod 13c which extends from the piston 13b is connected to rear axle 10.

The dumper 13 is separated into a first room R1 and a second room R2 by the piston 13b. Connected to the first room R1 and the second room R2 respectively are a first pipe P1 and a second pipe P2, which are both connected to an electromagnetic changeover valve 14. The changeover valve 14, when deexcited, is closed and is switched between two positions by two ports. A stop valve portion 15 and a flow valve portion 16 are formed on the spool of the changeover valve 14. An accumulator (reservoir) 17, which retains the hydraulic fluid, is connected to the second pipe P2 via a third pipe P3 and a check valve 18.

When the spool of the changeover valve 14 is placed at a block position shown in FIG. 2, the dumper 13 comes to a locked state which disables the flow-in and flow-out of the hydraulic fluid between both rooms R1 and R2. As a result, the rear axle 10 is locked. When the spool of the changeover valve 14 is placed at a communication position (the spool position changes to the opposite side to the one shown in FIG. 2), the dumper 13 becomes free to permit the flow-in and flow-out of the hydraulic fluid between both rooms P1 and R2. Therefore, the rear axle 10 swings. A restrictor 19 is provided on the passage of the second pipe P2.

As shown in FIGS. 1 and 2, the rear wheels 11 are supported rotatable by a king pin 20. On one side (the right side) of the king pin 20 is provided a tire angle sensor 21, which detects the amount of rotation of the pin 20 to detect the steering angle (tire angle) of the rear wheels 11. The tire angle sensor 21, which is constituted of a potentiometer, outputs a detection value (voltage value) θ according to the tire angle.

Figure 6:
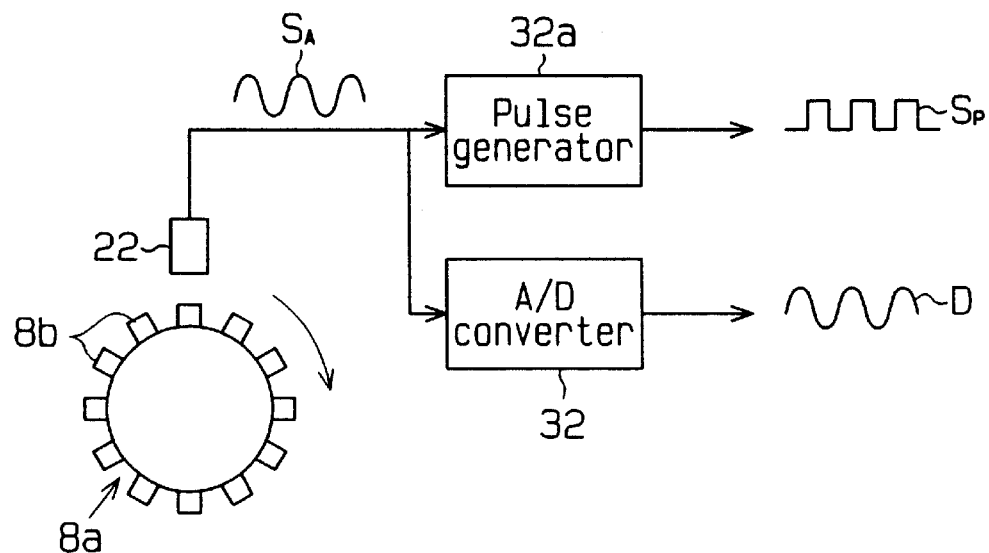
FIG. 6 is an exemplary diagram for explaining the principle of detection by a vehicle speed sensor.

As shown in FIG. 1, the differential gear 8 is provided with a vehicle speed sensor 22 for detecting the rotation of the differential gear 8 to thereby detect the vehicle speed of the forklift 1. The sensor 22 is arranged at a predetermined position facing multiple teeth 8b of a magnetic material, which protrudes at equal intervals from the outer surface of the output shaft, 8a, of the differential gear 8, as shown in FIG. 6. The vehicle speed sensor 22, which is an induction type sensor, for example, outputs an analog signal $S_A$ of a sine wave having a frequency according to the number of the teeth 8b that pass the detection zone per unit time (i.e., according to the vehicle speed).

A steering shaft 12a for supporting the steering wheel 12 is provided with a rotary encoder 23 for detecting the steering angle. The rotary encoder 23 comprises a disk 24 provided on the steering shaft 12a to be rotatable together with the shaft 12a, and a steering angle sensor 25 having plural sets of photocouplers arranged at predetermined positions with respect to the disk 24 in such a way as to be able to sense the light that passes through multiple slits 24a formed in the disk 24 at equal intervals in the circumferential direction thereof to detect the rotation of the disk 24. The sensor 25 outputs a pulse signal h according to the rotation of the steering wheel 12 that is detected by phototransistors which constitute the photocouplers.

As shown in FIG. 1, provided at the lower portion of each of outer masts 2a is a reel 26 which takes up a wire (not shown) having one end coupled to a lift bracket 3a to which the fork 3 is attached. The reel 26 is provided with a rotary detection type height sensor 27, which can detect the rotation of reel 26. The height sensor 27 detects the take-up amount of the wire from the rotation of the reel 26 to thereby detect the height of the fork 3, and outputs a detection value H according to the height.

Provided in the lift cylinder 6 is a pressure sensor 28 for detecting the hydraulic pressure in the cylinder. The pressure sensor 28 outputs a detection value w according to the load on the fork 3. As shown in FIG. 1, a solenoid 14a provided in the changeover valve 14 and various sensors 21, 22, 25, 27 and 28 are electrically connected to a controller 29.

Figure 4:
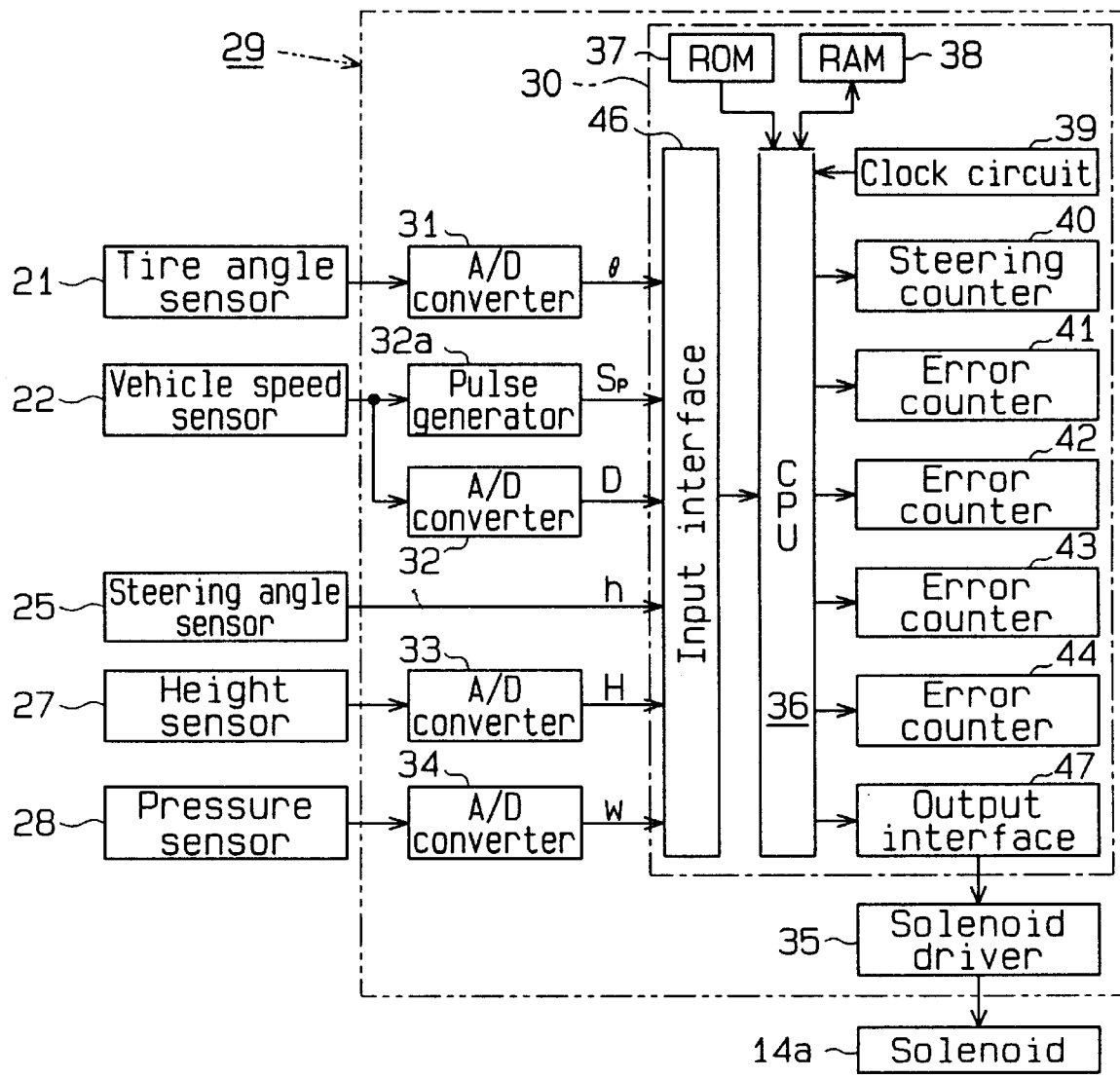
FIG. 4 is a block diagram depicting the electric constitution of the body swing control apparatus.

The electric constitution of the forklift 1 will now be explained with reference to FIG. 4.

The controller 29 incorporates a microcomputer 30, A/D converters 31 to 34, a pulse generator 32a, a solenoid driver 35, etc. The microcomputer 30 has a CPU 36, ROM 37, RAM 38, clock circuit 39, steering counter 40, error counters 41 to 44, an input interface 46 and an output interface 47.

The CPU 36 receives various detection values θ, H and w from the sensors 21, 27 and 28 via the A/D converters 31, 33 and 34, respectively, and receives the pulse signal h directly from the steering angle sensor 25. The CPU 36 further receives a pulse signal $S_P$ of a frequency according to the vehicle speed from the pulse generator 32a and a detected voltage D resulting from the digitization of the signal $S_A$ from the A/D converter 32.

Figure 7:
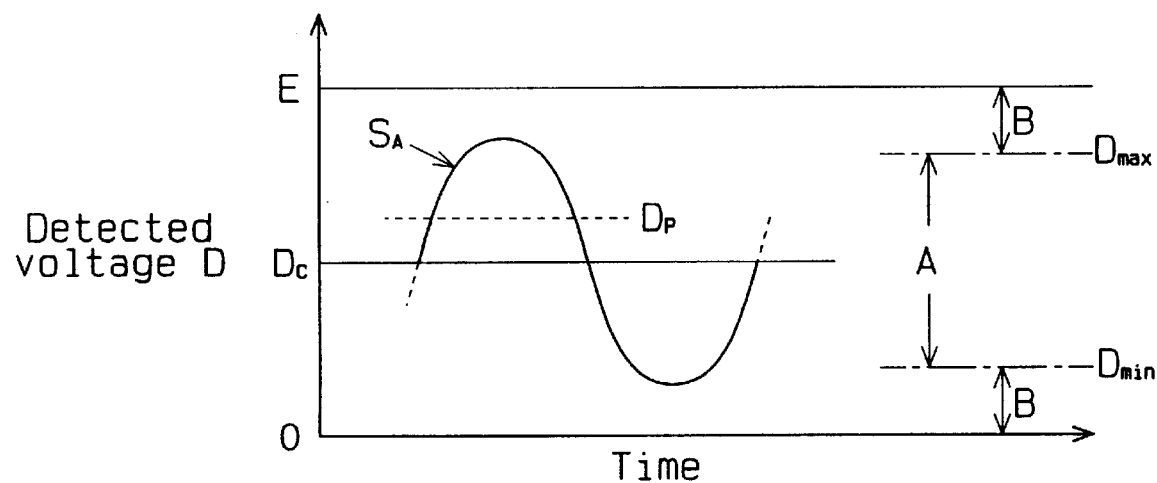
FIG. 7 is a graph showing a detection signal of the vehicle speed sensor.

The analog signal $S_A$ output from the vehicle speed sensor 22, as shown in FIG. 7, takes the form of a sine wave which goes up and down around a center voltage $D_C$ in a detected voltage range from "0" to "E" at a frequency proportional to the vehicle speed and with an amplitude according to the vehicle speed. When the vehicle speed becomes greater than a specific speed, the amplitude of the detected voltage D goes beyond the detection voltage range. With the forklift 1 stopped, the signal $S_A$ becomes constant at the center voltage $D_C$.

The pulse generator 32a generates the pulse signal $S_P$ having pulses (rectangular waves) of a frequency proportional to the vehicle speed by outputting an H-level pulse when the analog signal $S_A$ is equal to or greater than a reference voltage $D_P$ and outputting an L-level pulse when the analog signal $S_A$ is less than the reference voltage $D_P$. The CPU 36 acquires a value V equivalent to the vehicle speed by counting the number of pulses of the pulse signal $S_P$ input from the pulse generator 36a per unit time. The detected voltage D is used in failure diagnosis of the vehicle speed sensor 22, which will be discussed later. The individual detection values θ, H, w and D are input as digital values (e.g., of 8-bit values) to the CPU 36.

The solenoid 14a is excited or deexcited based on a control instruction signal the CPU 36 sends to the driver 35. The electromagnetic changeover valve 14 is excited so that the spool is set to the communication position when an unlock signal is output from the CPU 36, and is deexcited so that the spool is set to the block position when no unlock signal is output from the CPU 36.

Figure 11:
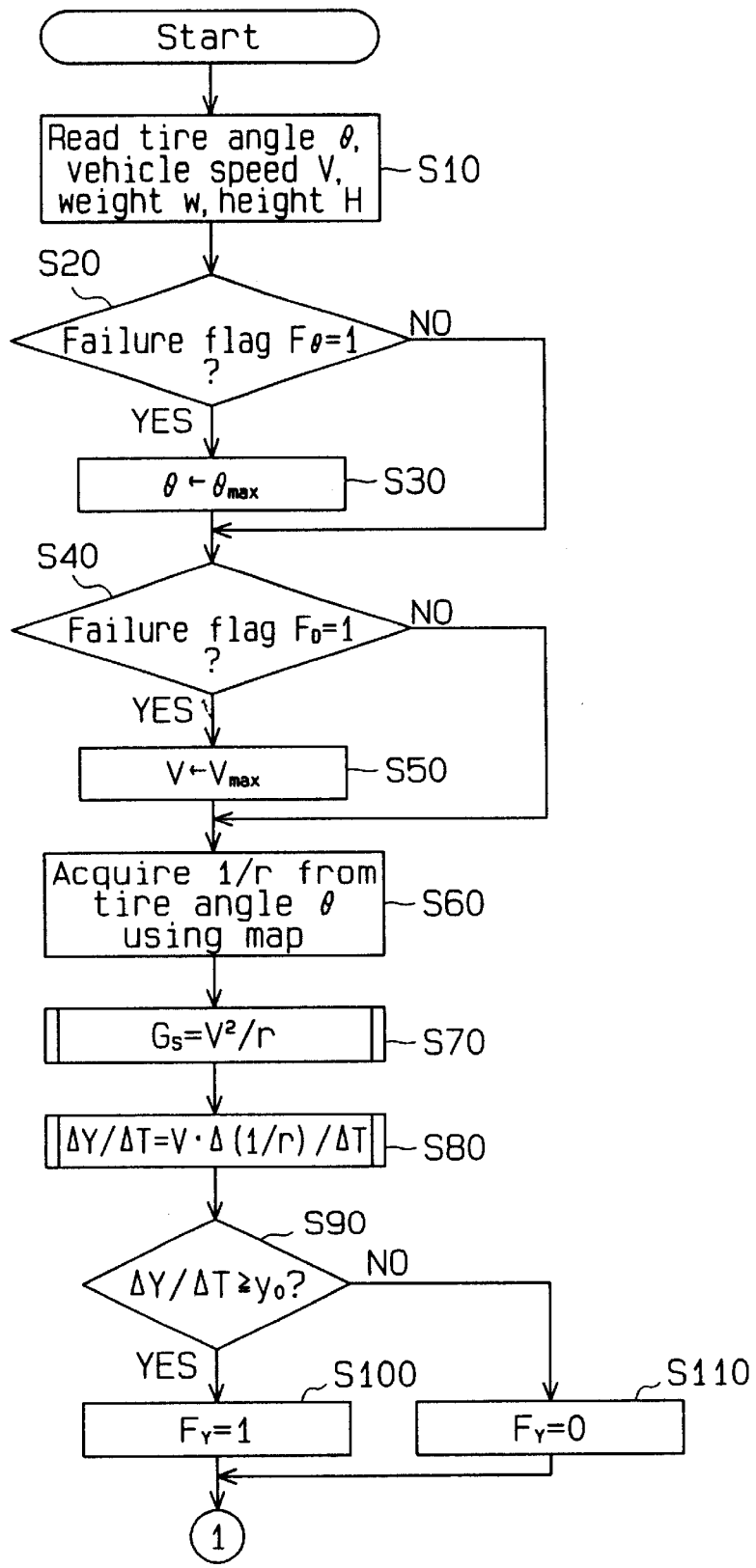
FIG. 11 is a flowchart of a swing control process a CPU executes.
Figure 12:
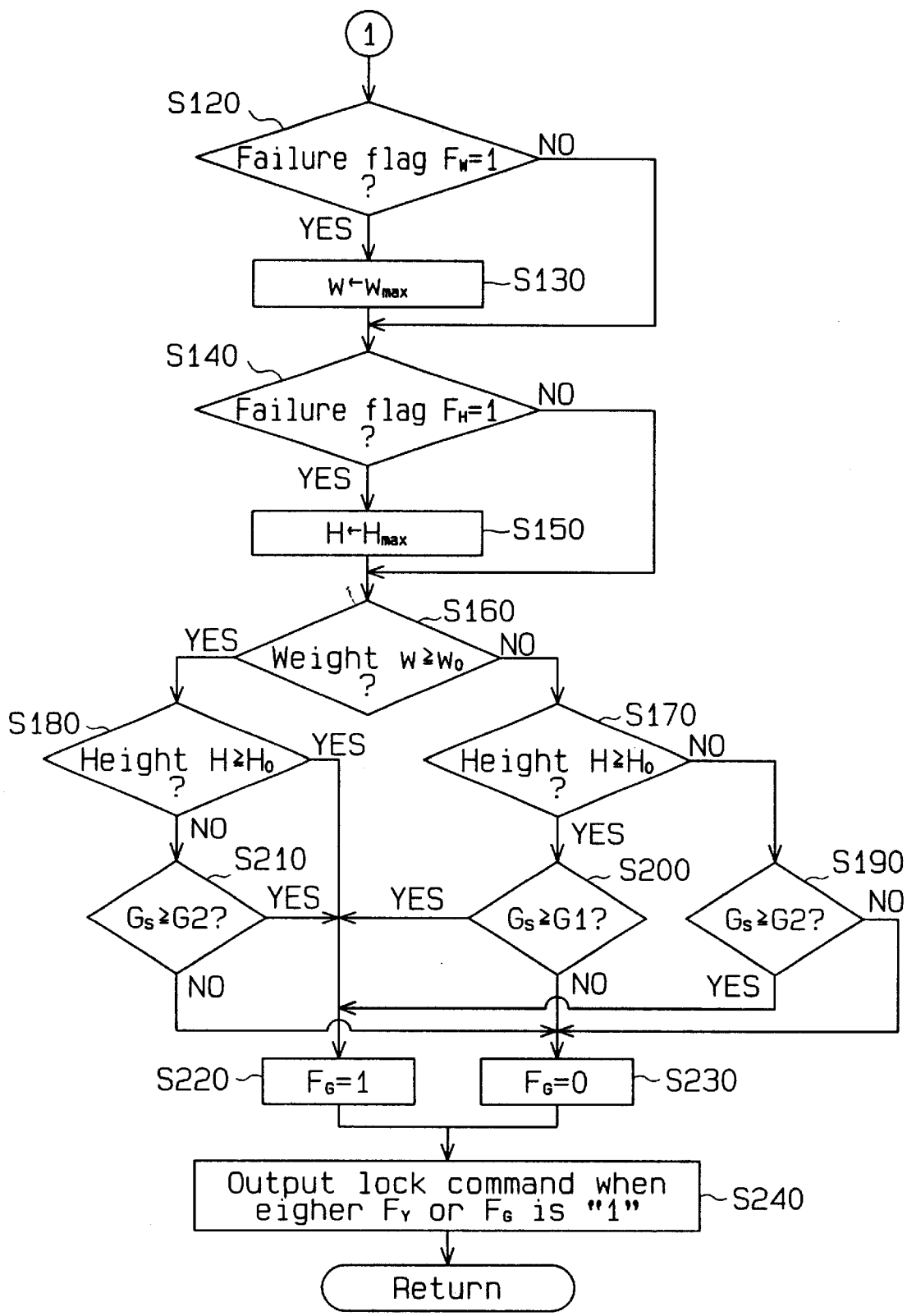
FIG. 12 is a flowchart for explaining the continual process of the flowchart in FIG. 11.
Figure 13:
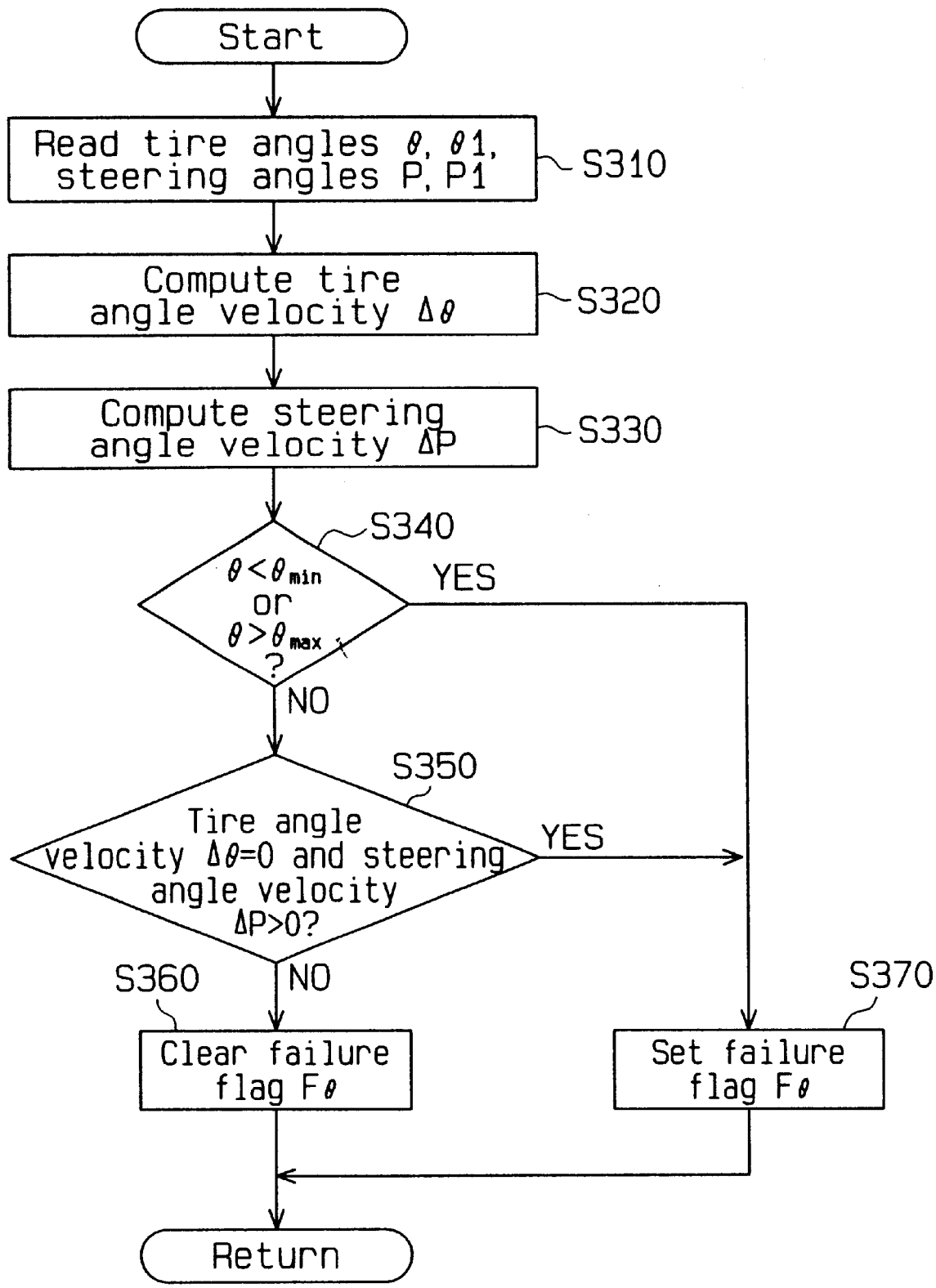
FIG. 13 is a flowchart of a sensor failure diagnosis process the CPU executes.
Figure 14:
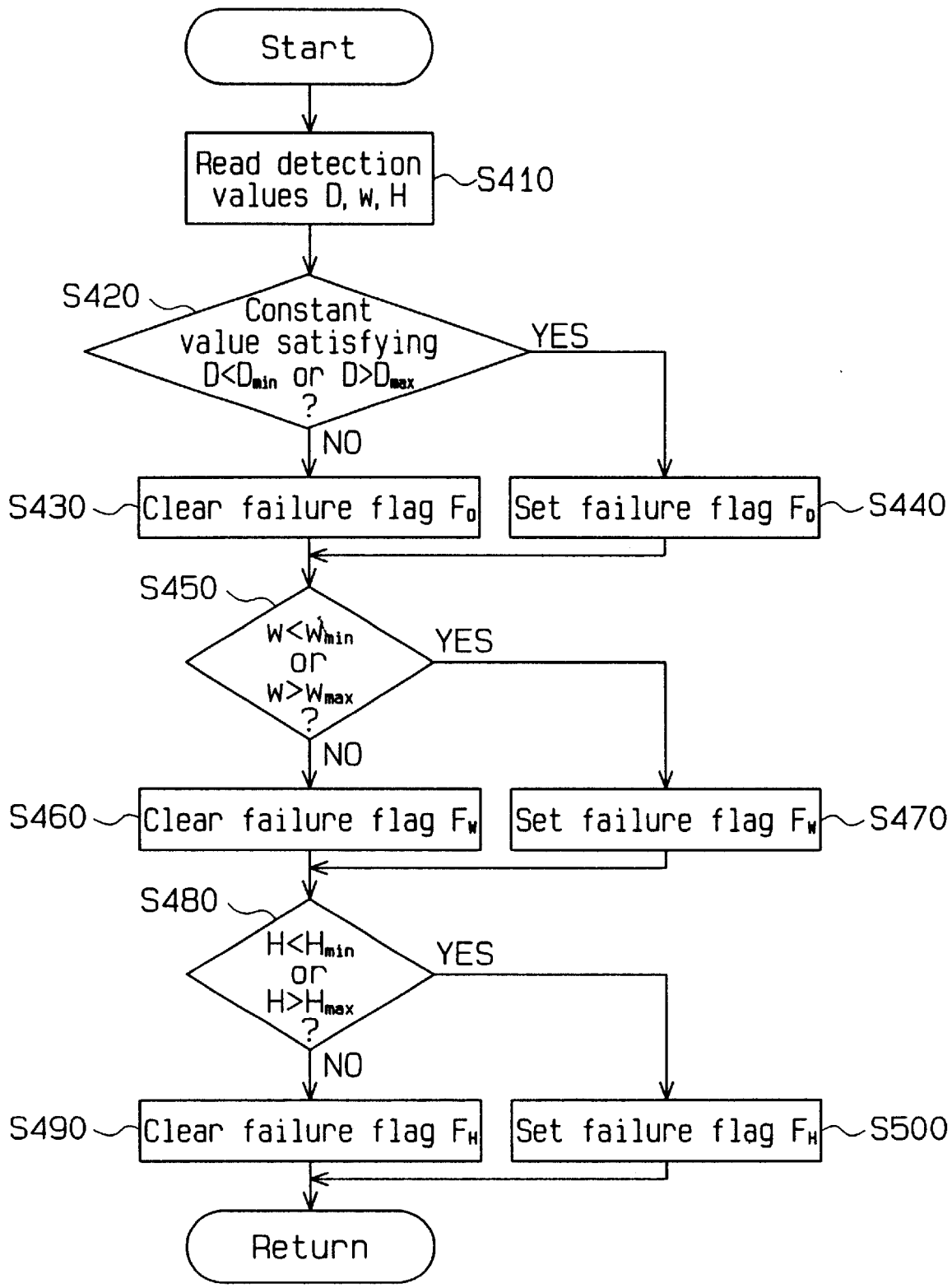
FIG. 14 is a flowchart for explaining the continual process of the flowchart in FIG. 13.

The ROM 37 is holding various sorts of program data, such as program data for a swing control process illustrated in flowcharts in FIGS. 11 and 12, and program data for a sensor failure diagnosis process illustrated in FIGS. 13 and 14. The "swing control" serves to suppress the lateral tilting of the body as low as possible by locking the rear axle 10 at a predetermined timing at which, it is determined from the running state and load state or the like of the vehicle, running is likely to become unstable.

As the running state, the centrifugal acceleration Gs that acts on the body in the lateral direction when the vehicle turns, and the rate of change, $\Delta Y/\Delta T$, in yaw rate Y (angular velocity at the turning time) of the body with respect to time (i.e., the rate of change in yaw rate) are detected as the time passes. Further, the weight, w, of a load on the fork 3 and the height H of the fork 3 are detected as the load state as the time passes. In other words, the height of gravitational center of the vehicle is detected. When either the value Gs or $\Delta Y/\Delta T$ becomes equal to or greater than its associated preset value as a predetermined condition, the rear axle 10 is locked. The set value of the centrifugal acceleration Gs is so set as to decrease step by step as the height of gravitational center of the vehicle becomes higher in accordance with the load state. More specifically, as shown in FIGS. 8A and 8B, the individual set values "0", "G1" and "G2" are set in accordance with the combination of the values of the weight w and the height H or the height of gravitational center of the vehicle.

Figure 8A:
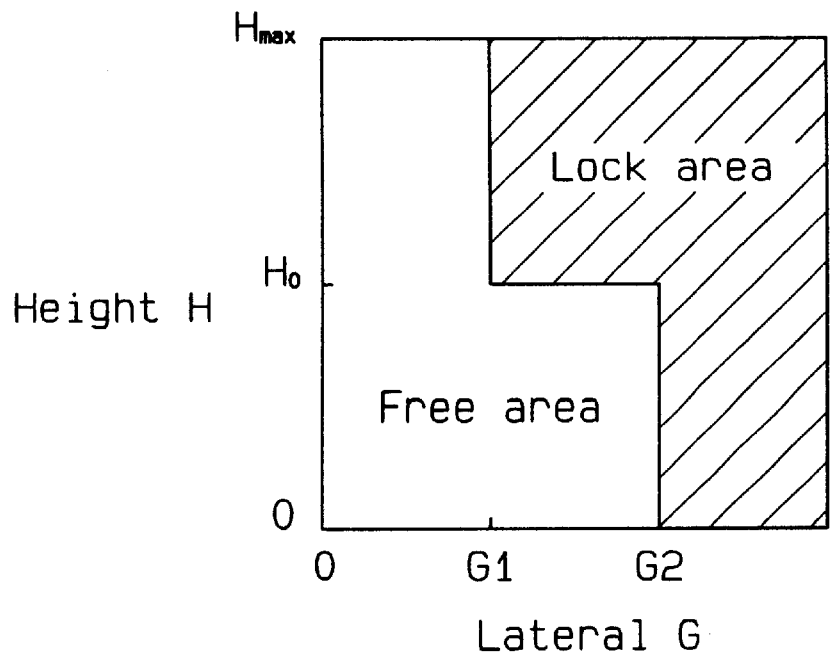
FIG. 8 presents maps showing set values of the centrifugal acceleration with respect to the weight of a load on, and the height of, the forklift.
Figure 8B:
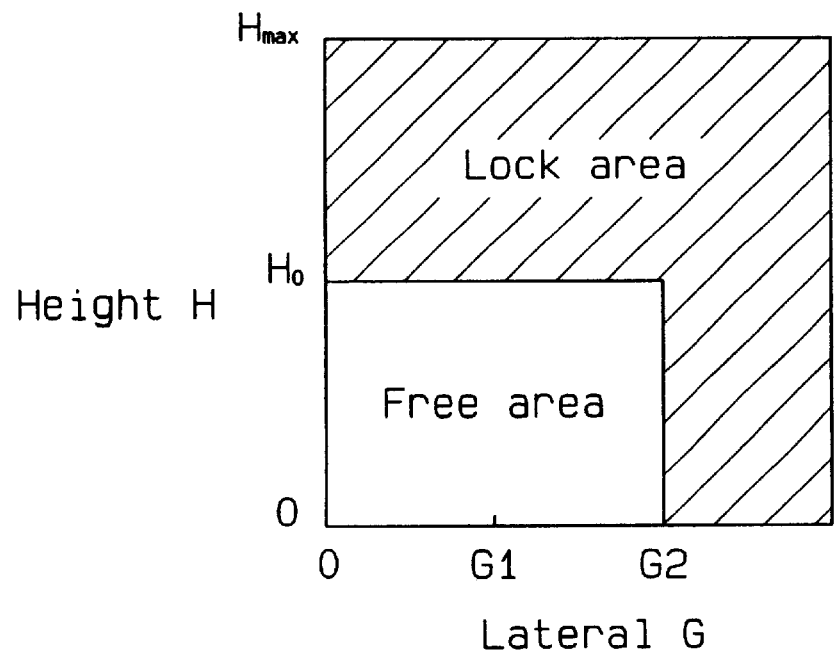

Specifically, with the weight w being light and less than the set value w0, "G2" is set as the set value of the centrifugal acceleration for the low height H less than a predetermined value HO (e.g., HO is a half of the maximum height Hmax) and "G1" (G1=G2/2) is set as the set value of the centrifugal acceleration for the high height H equal to or greater than the predetermined value HO as shown in FIG. 8A. With the weight w being heavy and equal to or greater than the set value w0, "G2" is set as the set value of the centrifugal acceleration for the low height H less than the predetermined value HO and "0" is set as the set value of the centrifugal acceleration when the high height H equal to or greater than the predetermined value HO as shown in FIG. 8B. That is, for a heavy load and the fork lifted high to a predetermined value or higher, which satisfy the weight w≧w0 and the height H≧HO, the rear axle 10 is always locked.

The set value of the rate of change in yaw rate ΔY/ΔT is set to "y0". The individual set values G1, G2 and y0 have been derived from the running tests or theoretical computation and are so set as to lock the rear axle 10 at the proper timing for ensuring running stability. The CPU 36 has two flags Fg and Fy. The flag Fg is set when the centrifugal acceleration Gs is equal to or greater than the set value G1 or C2 which is determined according to the then-load state, and is cleared when Gs is less than the set value. The flag Fy is set when the rate of change in yaw rate ΔY/ΔT is equal to or greater than the set value y0, and is cleared when it is less than the set value y0.

The clock circuit 39 sends a clock signal to the CPU 36. Based on the clock signal, the CPU 36 executes a swing control process and a sensor failure diagnosis process every given time (e.g., several scores of milliseconds). Note however that the sensor failure diagnosis process is carried out every time the swing control process is performed a predetermined number of times.

The steering counter 40 counts a count value P according to the steering angle. The CPU 36, which has received two pulse signals h, phase-shifted by ¼ wavelength, from the steering angle sensor 25, checks the correlation between the edges and levels of the two pulse signals h to detect the steering direction. Every time the edge of the pulse signal h is detected, the count value P of the steering counter 40 is decremented when the steering direction is counterclockwise, and the count value P is incremented when the steering direction is clockwise.

The four error counters 41–44 count count values equivalent to the sustain times at which predetermined failure conditions previously set for the respective sensors 21, 22, 27 and 28, when the associated sensors 21, 22, 27 and 28 are diagnosed for any failure. In the failure diagnosis process that is carried out every given time, each of the count values of the error counters 41–44 is incremented within a range with a maximum predetermined time of, for example, "10" every time the failure condition is met, and the count value is decremented within a range with a minimum value of "0" every time the failure condition is unsatisfactory. In this process, the individual sensors 21, 22, 27 and 28 undergo the disconnection/short-circuiting originated failure diagnosis and the tire angle sensor 21 undergoes a fall-off failure diagnosis. The CPU 36 has four failure flags $F_\theta$, $F_D$, $F_H$ and $F_W$ for failure diagnosis. Those failure flags $F_\theta$, $F_D$, $F_H$ and $F_W$ are set when the count values of the associated error counters 41–44 are "10", and are cleared when the count values are "0".

Figure 5:
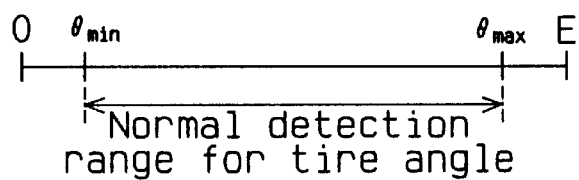
FIG. 5 is an explanatory diagram for explaining voltages detected by a tire angle sensor.

The short-circuiting originated failure and disconnection originated failure of the sensors 21, 22, 27 and 28 are diagnosed by determining if the detection values (voltage values) θ, D, H and w fall their normal detection ranges. With regard to the tire angle sensor 21, as shown in FIG. 5, the input value θ falls within a range of θmin ≧θ≧θmax in the entire range from 0 volt to a supply voltage E in the normal case, θ<θmin is satisfied in the case of disconnection, and θ>θmax is satisfied in the short-circuited case. Using those conditions, the sensors 27 and 28 are diagnosed as a disconnection originated failure when θ<θmin, H<Hmin and w<wmin are satisfied, and are diagnosed as a short-circuiting originated failure when θ>θmax, H>Hmax and w>wmax are satisfied, where θmin, Hmin and wmin are the lower limits detectable when the sensors 21, 27 and 28 are normal and θmax, Hmax and wmax are the upper limits detectable when the sensors 21, 27 and 28 are normal. Hence, θmax indicates the detection value of the maximum tire angle, Hmax indicates the detection value of the maximum height, and wmax indicates the detection value of the maximum load weight.

As shown in FIG. 7, when the vehicle speed sensor 22 is normal, the voltage value (detected voltage) of the output signal $S_A$ from the sensor 22 fluctuates around the center voltage $D_C$ in such a way that the frequency and amplitude become greater as the vehicle speed gets faster, and the voltage value becomes constant at the center voltage $D_C$ when the vehicle is stopped. When the vehicle speed sensor 22 fails, a constant voltage is output off the set range A (i.e., in the range B in FIG. 7) although the pulse wave is not output. The CPU 36 determines as the sensor 22 failing because the constant voltage, if the vehicle is stopped (the vehicle speed is "0"), lies in the range B while it should be $D_C$. That is, the voltage value D is constant in the range of D>Dmax when the vehicle speed sensor 22 has a disconnection originated failure or a failure originated from the short-circuited power supply, while the voltage value D is constant in the range of D<Dmin when the sensor 22 has a failure originated from ground short-circuiting. Therefore, the CPU 36 diagnoses the vehicle speed sensor 22 as having a disconnection/short-circuiting originated failure if the detection value D of the sensor 22 is a constant one which satisfying D<Dmin or D>Dmax.

When the tire angle sensor 21 has a fall-off failure, the rotation of the king pin 20 will no longer be input to the input shaft of the potentiometer. Consequently, a constant voltage in the normal detection range is input so that the failure cannot be found by simply monitoring the input value θ. A fall-off failure is diagnosed by acquiring deviations Δθ and ΔP of the tire angle θ and the steering angle P per a given time ΔT and then checking whether or not a fall-off failure condition (ΔP>0 and Δθ=0) where the tire angle velocity Δθ becomes "0" even though the steering angle velocity ΔP is positive is satisfied.

The centrifugal acceleration (Gs) and the rate of change in yaw rate ΔY/ΔT are indirectly estimated through computation using the detection values θ and V of the two sensors 21 and 22. The estimated value Gs of the centrifugal acceleration is calculated from an equation (1) below by using the reciprocal of the turning radius 1/r that is determined from the tire angle θ as acquired from the associated map previously stored in the ROM 37.

$$Gs=V^2/r \qquad (1)$$

The rate of change in yaw rate $\Delta Y/\Delta T$ is computed from the following equation (2).

$$\Delta Y/\Delta T = V \cdot \Delta(1/r)/\Delta T \qquad (2)$$

where $\Delta(1/r)$ is a change in $1/r$, the reciprocal of the turning radius, per given time $\Delta T$ (e.g., several scores of milliseconds). The reciprocal of the turning radius, $1/r$, takes a negative value when the tire angle $\theta$ is directed counterclockwise and takes a positive value when the tire angle $\theta$ is directed clockwise. The equation (2) is an approximation equation of $\Delta Y/\Delta T = V \cdot \Delta(l/r)/\Delta T + \Delta V/\Delta T \cdot (1/r)$, derived from differentiation of the yaw rate $\omega = V/r$, by taking the vehicle speed V of the forklift 1 during turning as nearly constant ($\Delta V/\Delta T=0$) and thus ignoring the term containing that factor.

Once the rear axle 10 is locked, the rear axle 10 is not unlocked unless the determination value which has been the basis for the locking action becomes smaller than the set value at the locking time by a predetermined value or a greater value. This prevents frequent switching between locking and unlocking which may otherwise occur if the detection values w, H $\Delta Y/\Delta T$ lie near the respective set values w0, h0 and y0.

Now, the swing control process and sensor failure diagnosis process for the forklift 1 will be discussed with reference to flowcharts in FIGS. 11 through 14. While the ignition key is on, the detection signals $\theta$, Sp, D, h, H and w from the sensors 21, 22, 25, 27 and 28 are input to the CPU 36. The CPU 36 executes the swing control process every given time (e.g., several scores of milliseconds) and carries out the sensor failure diagnosis process once every time it performs the swing control process a predetermined number of times. The CPU 36 causes the steering counter 40 to count the steering angle P.

The sensor failure diagnosis process will be discussed below. To begin with, the failure diagnosis process for the tire angle sensor 21 will be explained referring to FIG. 13. In step 310, the CPU 36 reads the tire angles $\theta$ and $\theta 1$ and the steering angles P and P1. $\theta 1$ and P1 are the tire angle data and the steering angle data which have been detected a given time earlier and stored in the RAM 38. The CPU 36 calculates the tire angle velocity $\Delta\theta=|\theta-\theta 1|$ in step 320 and calculates the steering angle velocity $\Delta P=|P-P1|$ in step 330.

In step 340, the CPU 36 determines if the disconnection/short-circuiting originated failure condition "$\theta<\theta min$ or $\theta>\theta max$" is met. When the input value $\theta$ satisfies $\theta min<\theta<\theta max$, the CPU 36 diagnoses that the tire angle sensor 21 has no disconnection/short-circuiting originated failure and proceeds to step 350. When the input value $\theta$ satisfies the failure condition $\theta<\theta min$ or $\theta>\theta max$, on the other hand, the CPU 36 diagnoses that the tire angle sensor 21 suffers a disconnection/short-circuiting originated failure and sets the failure flag $F_\theta$ ($F_\theta=1$) in step 370.

In step 350, the CPU 36 determines if the fall-off failure condition "the tire angle velocity $\Delta\theta=0$ and the steering angle velocity $\Delta P>0$" is met. When this fall-off failure condition is not satisfied, the CPU 36 diagnoses that the tire angle sensor 21 has no fall-off failure and clears the failure flag $F_\theta$($F_\theta=0$) in step 360. When the failure condition $\Delta\theta=0$ and $\Delta P>0$ is satisfied, on the other hand, the CPU 36 diagnoses that the tire angle sensor 21 suffers a fall-off failure and sets the failure flag $F_\theta$ in step 370.

Next, the failure diagnosis process for the sensors 22, 27 and 28 will be explained with reference to FIG. 14.

In step 410, the CPU 36 reads the detection values (detected voltages) D, w and H. In step 420, the CPU 36 determines if the disconnection/short-circuiting originated failure condition for the vehicle speed sensor 22, "a given value satisfying D<Dmin or D>Dmax", is satisfied. When the value obtained as the detection value D has taken a given value satisfying D<Dmin or D>Dmax, some number of times in succession, the CPU determines that the failure condition is met. When this failure condition is not satisfied, the CPU 36 diagnoses that the vehicle speed sensor 22 is normal and clears the failure flag $F_D(E_D=0)$ in step 430. When the failure condition such that the given value satisfying D<Dmin or D>Dmax is met, however, the CPU 36 diagnoses that the vehicle speed sensor 22 has a disconnection/short-circuiting originated failure and sets the failure flag $E_D$ ($F_D=1$) in step 440.

In step 450, the CPU 36 determines if the failure condition for the pressure sensor 28, "w<wmin or w>wmax", is satisfied. That is, it is determined whether or not the detection value takes the value of the voltage w, which is never possible in the normal state however heavy the load on the fork is. When this failure condition is not satisfied, the CPU 36 diagnoses that the pressure sensor 28 is normal and clears the failure flag $F_w$ ($F_w=0$) in step 460. When the failure condition w<wmin or w>wmax is met, on the other hand, the CPU 36 diagnoses that the pressure sensor 28 has a disconnection/short-circuiting originated failure, and sets the failure flag $F_w$ ($F_w=1$) in step 470.

In step 480, the CPU 36 determines if the failure condition for the height sensor 27, "H<Hmin or H>Hmax", is met. That is, it is determined whether or not the detection value takes the value of the voltage H, which is never possible in the normal state however high the fork is positioned. When this failure condition is not satisfied, the CPU 36 diagnoses that the height sensor 27 is normal and clears the failure flag $F_H$ ($F_H=0$) in step 490. When the failure condition H<Hmin or H >Hmax is met, on the other hand, the CPU 36 diagnoses that the height sensor 27 has a disconnection/short-circuiting originated failure, and sets the failure flag $F_H$ ($F_H=1$) in step 500.

When the sensors 21, 22, 27 and 28 are all normal, therefore, their failure flags $F_{74}$, $E_D$, $F_H$ and $F_W$ are all cleared, whereas when any of the sensors fails, the failure flag corresponding to that failing sensor is set. It is to be noted that when a failure condition is met, the CPU 36 sets the associated failure flag $F_\theta$, $F_D$, $F_H$ or $F_W$ not immediately but when and only when the failure condition is continuously satisfied for a predetermined time (e.g., less than one second) until the count value of the associated one of the error counters 41–44 reaches "10". Even if a disconnection/short-circuiting originated failure is accidentally satisfied due to a transient chance in the input voltage $\theta$, D, H or w at the time of ignition of the engine or the like, the failure flag $F_\theta$, $F_D$, $F_E$ or $F_W$ is not set because the event occurs only a very short period of time. Even if the fall-off failure condition of $\Delta P>0$ and $\Delta\theta=0$ is satisfied due to a delay of the steering response of the rear wheels to the manipulation of the steering wheel, for example, the failure flag $F_\theta$ is not set because the event takes a significantly short period of time.

The swing control process will now be discussed with reference to FIGS. 11 and 12.

The CPU 36 executes the swing control process every given time (e.g., several scores of milliseconds). The CPU 36 reads the individual detection values of the tire angle $\theta$, the vehicle speed V, the weight w and the height H first in step 10. The vehicle speed V is acquired from a frequency-equivalent count value which is the number of pulses of the pulse signal $S_P$ counted per unit time. In step 20, the CPU 36 determines if the failure flag $F_\theta=1$. When the failure flag $F_\theta=0$, the CPU 36 determines that the tire angle sensor 21 is normal and proceeds to step 40. When the failure flag $F_\theta=1$ as a result of the tire angle sensor 21 having been diagnosed as having a disconnection/short-circuiting originated failure or a fall-off failure, the CPU 36 goes to step 30 to replace the tire angle θ with the maximum tire angle θmax as a predetermined value.

In step 40, the CPU 36 determines if the failure flag $F_D=1$. When the failure flag $F_D=0$, the CPU 36 determines that the vehicle speed sensor 22 is normal and proceeds to step 60. When the failure flag $F_D=1$ as a result of the vehicle speed sensor 22 having been diagnosed as suffering a disconnection/short-circuiting originated failure, the CPU 36 moves to step 50 to replace the vehicle speed V with the maximum vehicle speed Vmax as a predetermined value.

In step 60, the CPU 36 acquires the reciprocal of the turning radius, 1/r, from the tire angle θ using the associated map stored in the ROM 37.

In step 70, the estimated centrifugal acceleration Gs is calculated from the equation (1) using the vehicle speed V and the reciprocal of the turning radius 1/r. In the subsequent step 80, the CPU 36 calculates the rate of change in yaw rate $\Delta Y/\Delta T$. More specifically, the CPU 36 reads the tire angle data θ1 older by a given time AT from a predetermined memory area in the RAM 38, and calculates $\Delta Y/\Delta T=V\cdot\Delta(1/r)/\Delta T$ ($\Delta(1/r)=|1/r-1/r1|$) from the equation (2) using the reciprocal of the turning radius 1/r that is determined from the data θ1.

In step 90, the C-J 36 determines if the rate of change in yaw rate $\Delta Y/\Delta T \geq y0$, equal to or greater than the set value y0. When $\Delta Y/\Delta T > y0$, the CPU 36 proceeds to step 100 to set the flag $F_Y$ ($F_Y=1$). When $\Delta Y/\Delta T < y0$, the CPU 36 proceeds to step 110 to clear the flag $F_Y$ ($F_Y=0$).

The process from step 120 to step 230 is for determining whether or not the rear axle 10 should be locked based on the centrifugal acceleration (Gs). The CPU 36 first determines in step 120 if the failure flag $F_W=1$. When the failure flag $F_W=0$, the CPU 36 determines that the pressure sensor 28 is normal and proceeds to step 140. When the failure flag $F_W=1$, the CPU 36 determines that the pressure sensor 28 has a disconnection/short-circuiting originated failure, and the CPU 36 goes to step 130. In step 130, the CPU 36 replaces the weight w with the allowable maximum weight wmax.

In step 140, the CPU 36 determines if the failure flag $F_H=1$. When the failure flag $F_H=0$, the CPU 36 determines that the height sensor 27 is normal and proceeds to step 160. When the failure flag $F_H=1$, the CPU 36 determines that the height sensor 28 has a disconnection/short-circuiting originated failure, and the CPU 36 moves to step 150 to replace the height H with the maximum height Hmax.

The set value for the centrifugal acceleration (Gs) according to the combination of the weight w and height H replaced in the process from step 120 to step 150 as needed is determined from preset set values based on those values w and H as shown in FIGS. 8A and 8B. First, the CPU 36 determines in step 160 if the weight w is equal to or greater than the set value w0. When the weight w is light and is smaller than the set value w0, the CPU 36 proceeds to step 170 to determine if the height H is equal to or greater than the set value HO. When the weight w is heavy and is equal to or larger than the set value w0, the CPU 36 proceeds to step 180 to determine if the height H is equal to or greater than the set value H0.

When the weight w<w0 and the height H<HO as shown in FIG. 8A, the CPU 36 uses the set value "G2" and determines in step 190 if Gs>G2. When the weight w<w0 and the height H≧H0, the CPU 36 uses the set value "G1" and determines in step 200 if Gs≧G1. When the lock condition Gs≧G2 or Gs≧G1 is met in each step (S190 or S200), the CPU 36 proceeds to step 220 to set the flag $F_G$ ($F_G=1$) in either case. When the lock condition Gs≧G2 or Gs≧G1 is not satisfied in each mentioned step, on the other hand, the CPU 36 proceeds to step 230 to clear the flag $F_G$ ($F_G=0$).

When the weight w≧w0 and the height H<H0 as shown in FIG. 8B, the CPU 36 uses the set value "G2" and determines in step 210 if Gs≧G2. When the lock condition Gs≧G2 is met, the CPU 36 sets the flag $F_G$ in step 220. When the lock condition Gs≧G2 is not satisfied, the CPU 36 clears the flag $F_G$ in step 230.

When the weight w≧w0 and the height H≧H0, the CPU 36 sets the flag $F_G$($F_G=1$) in step 220. That is, under the load state where the load weight on the fork and the height are large and the height of gravitational center of the forklift 1 is high, the flag $F_G$ is set to always lock the rear axle 10.

In step 240, if either one of the flags $F_Y$ and $F_G$ is "1", the CPU 36 outputs a lock command. At the timing at which the body is likely to be unstable in the lateral direction in view of the occasionally detected running state and load state, therefore, the electromagnetic changeover valve 14 is switched to the block position, thus locking the rear axle 10. When the tire angle sensor 21 fails, the tire angle becomes the given value θmax and the turning radius r =rmin takes a constant value, the difference becomes $\Delta(1/r)=0$ so that the rate of change in yaw rate $\Delta Y/\Delta T$ always becomes "0". The flags $F_Y$ and $F_G$ temporarily set are not cleared until unsatisfactoriness of the lock condition continues for a predetermined time, providing a delay of a predetermined time in unlocking the rear axle 10.

When, of the tire angle sensor 21 and the vehicle speed sensor 22 both for detecting the running state, the sensor 21 fails, the maximum tire angle θmax is used and the estimated value Gs of the centrifugal acceleration is computed as Gs=$V^2$/rmin (rmin: minimum turning radius) in accordance with the then-vehicle speed V. At this time, the rear axle 10 is not locked as long as the forklift 1 runs at the vehicle speed V at which the lock condition Gs≧G (G=G1 or G2) is not met.

Figure 9:
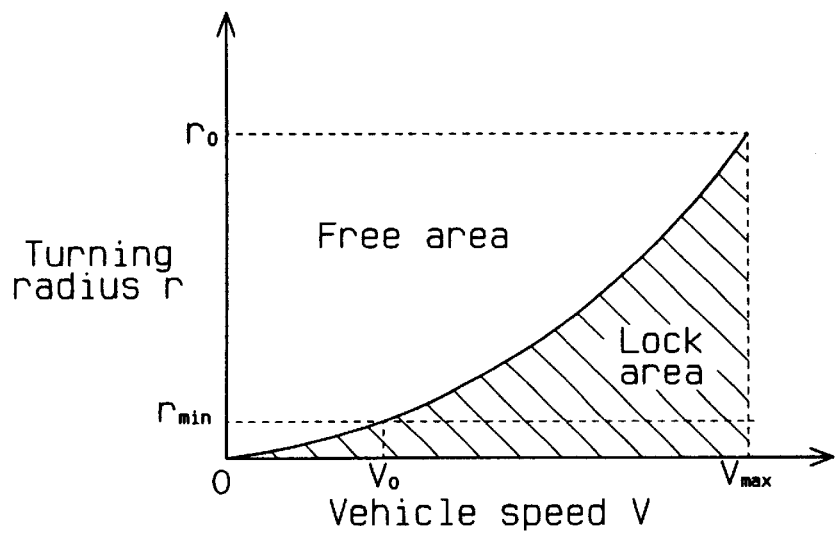
FIG. 9 is a graph showing a lock area with respect to the turning radius and the vehicle speed of the forklift.

FIG. 9 is a graph showing the relationship between the turning radius r and the vehicle speed V which allows the lock condition to be met. When the tire angle sensor 21 fails, it is assumed that the forklift 1 always turning with the minimum turning radius rmin. When the forklift 1 is running at a low speed less than the vehicle speed V0 (=√(G·rmin) where G=G1 or G2), however, the lock condition is not met (Gs <G) and the rear axle 10 is not locked. That is, even when the tire angle sensor 21 fails, the rear axle 10 becomes free to be swingable (except for the case of a heavy load and a high lift-up position) if the forklift 1 runs at a low speed (V<V0). Even when the forklift 1 is running on a rough road with the vehicle's weight acting on the rear wheels 11, therefore, the rear axle 10 is free to be swingable so that the two front drive wheels are in firm contact with the road's surface, if the forklift 1 runs at a low speed (V<V0). Accordingly, slipping due to the front wheels not in contact with the ground hardly occurs.

When the vehicle speed sensor 22 fails, the maximum vehicle speed Vmax is used and the estimated value Gs of the centrifugal acceleration is computed as Gs=$Vmax^2$/r in accordance with the turning radius r that is determined by the then-tire angle θ. At this time, the rear axle 10 is not locked as long as the forklift 1 runs at the tire angle θ at which the lock condition Gs≧G (G=G1 or G2) and $\Delta Y/\Delta T \geq y0$ is not met (i.e., the value 0 greater than the turning radius r0 (=Vmax²/G) ) and at the tire angle velocity Δθ less than the predetermined value (i.e., the value Δθ that satisfies Δ(1/r)<y0·ΔT/Vmax).

When the tire angle sensor 21 and the vehicle speed sensor 22 both fail, the lock condition Gs≧G is always satisfied, so that the rear axle 10 is forcibly locked.

When, of the height sensor 27 and the pressure sensor 28 both for detecting the load state, the sensor 27 fails, the maximum height Hmax is used. When the weight w of the load on the fork 3 is equal to or greater than w0, therefore, the rear axle 10 is forcibly locked, whereas the weight w is less than w0, the rear axle 10 is not locked as long as the forklift 1 runs in the running state (tire angle θ, vehicle speed V) where the lock condition Cs≧G1 and ΔY/ΔT≧y0 is not met.

When the pressure sensor 28 fails, the allowable maximum weight wmax is used. When the height H of the fork 3 is equal to or greater than H0, therefore, the rear axle 10 is forcibly locked, whereas with the height H being less than H0, the rear axle O is not locked as long as the foeklift 1 runs in the running state (tire angle θ, vehicle speed V) where the lock condition Gs≧G2 and ΔY/ΔT≧y0 is not met.

When the height sensor 27 and the pressure sensor 28 both fail, the maximum height Hmax and the maximum weight wmax are used and he condition w≧w0 and H≧H0 is satisfied, so that the rear axle 10 is always locked.

When any one of the sensors 21, 22, 27 and 28 fails, as apparent from the above, the rear axle 10 is not locked so long as the forklift 1 runs moderately in a predetermined running state or load state. Even when the forklift 1 runs on a rough road with the vehicle's weight acting on the rear wheels 11, therefore, the rear axle 10 is free to be swingable so that the two front drive wheels are firmly on the ground. This hardly causes slipping.

Figure 10:
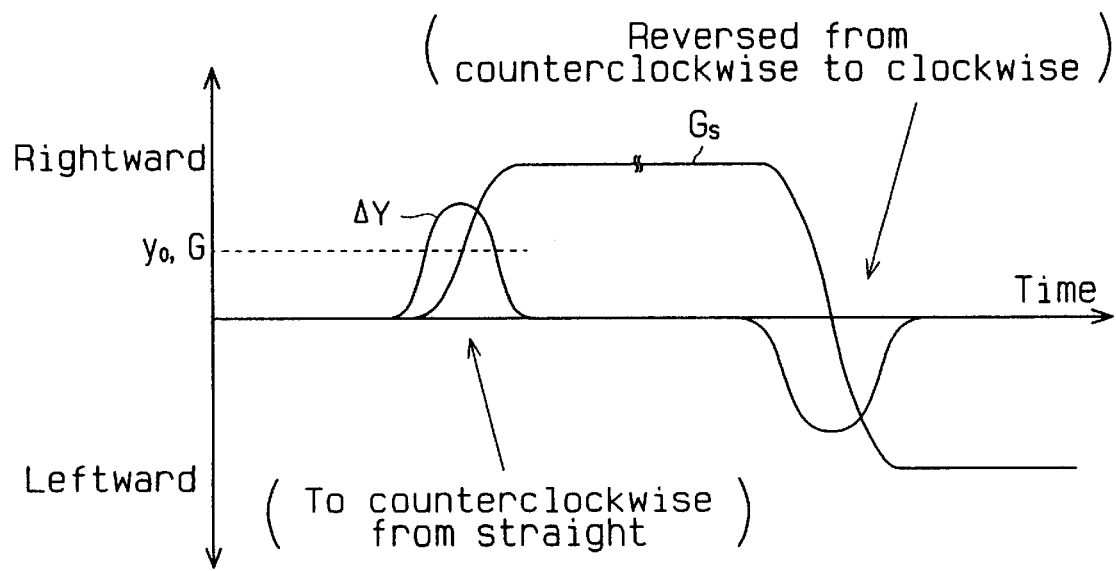
FIG. 10 is a graph showing changes in centrifugal acceleration and a rate of change in yaw rate at the time the forklift turns.

FIG. 10 is a graph showing charges in centrifugal acceleration (Gs) and the rate of change in yaw rate with respect to time at the time the forklift 1 turns. When the forklift 1 makes a left turn while running straight, the rate of change in yaw rate ΔY/ΔT exceeds the set value y0 so that the rear axle 10 will be locked quickly. The tire angle θ comes to a constant angle and the centrifugal acceleration (Gs) goes to and above the set value C (=G1, G2) before the rate of change in yaw rate ΔY/ΔT becomes less than the set value y0, so that the forklift 1 turns with the rear axle 10 kept locked.

At the time the steering wheel 12 which has been manipulated counterclockwise is manipulated in the reverse, clockwise direction, there can be a zone where the value or Cs temporarily becomes less than the set value G when the direction of the centrifugal acceleration acting on the vehicle's body is reversed to the leftward direction from the rightward direction. Since the rate of change in yaw rate ΔY/ΔT is equal to or greater than the set value y0 in this zone during the reverse steering, however, the vehicle is turned in the reverse direction with the rear axle 10 held locked.

In computing the rate of change in yaw rate ΔY/ΔT, the above-described embodiment employs a scheme of obtaining the difference (differentiation) of 1/r acquired from the detection value θ of the tire angle sensor 21 which is hardly affected by the vibration or the like of the base. This eliminates undesirable amplification of noise which may be caused by a differential process and can thus provide a highly reliable estimated value ΔY/ΔT. With the structure which differentiating the detection value of the acceleration sensor which is susceptible to the vibration or the like of the base, by contrast, noise mostly included in the detection value is amplified, reducing the reliability of the resultant estimated value of the rate of change in yaw rate ΔY/ΔT.

Second Embodiment

The second embodiment of this invention will now be described with reference to FIGS. 15 through 18.

This embodiment differs from the first embodiment in that the centrifugal acceleration (Gs) and the rate of change in yaw rate ΔY/ΔT are computed by using the detection values of the individual sensors which respectively detect the yaw rate and the vehicle speed.

Figure 15:
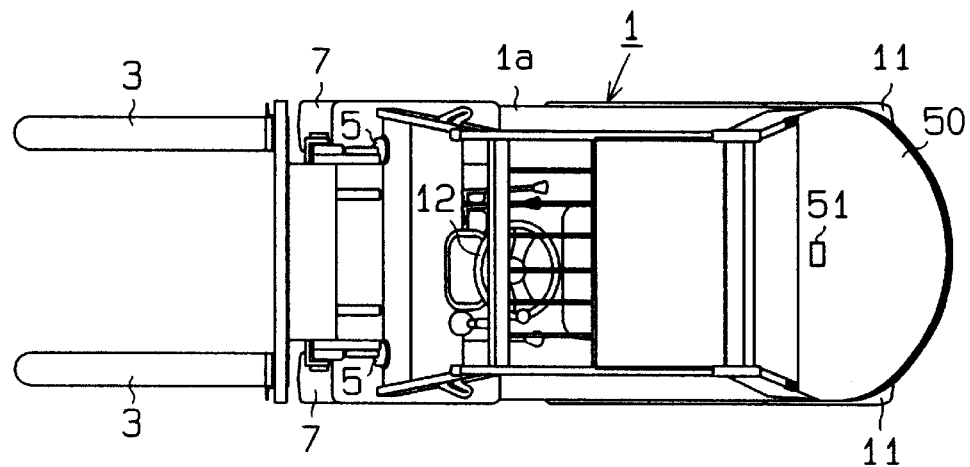
FIG. 15 is a plan view of a forklift according to a second embodiment of this invention.

As shown in FIG. 15, a gyroscope 51 is attached to a balance weight 50 located at the rear portion of the forklift 1. In this embodiment, a piezoelectric gyroscope comprised of a piezoelectric element is used as the gyroscope 51. Other types of gyroscopes such as a gas rate type and an optical type may be used as well.

Figure 16:
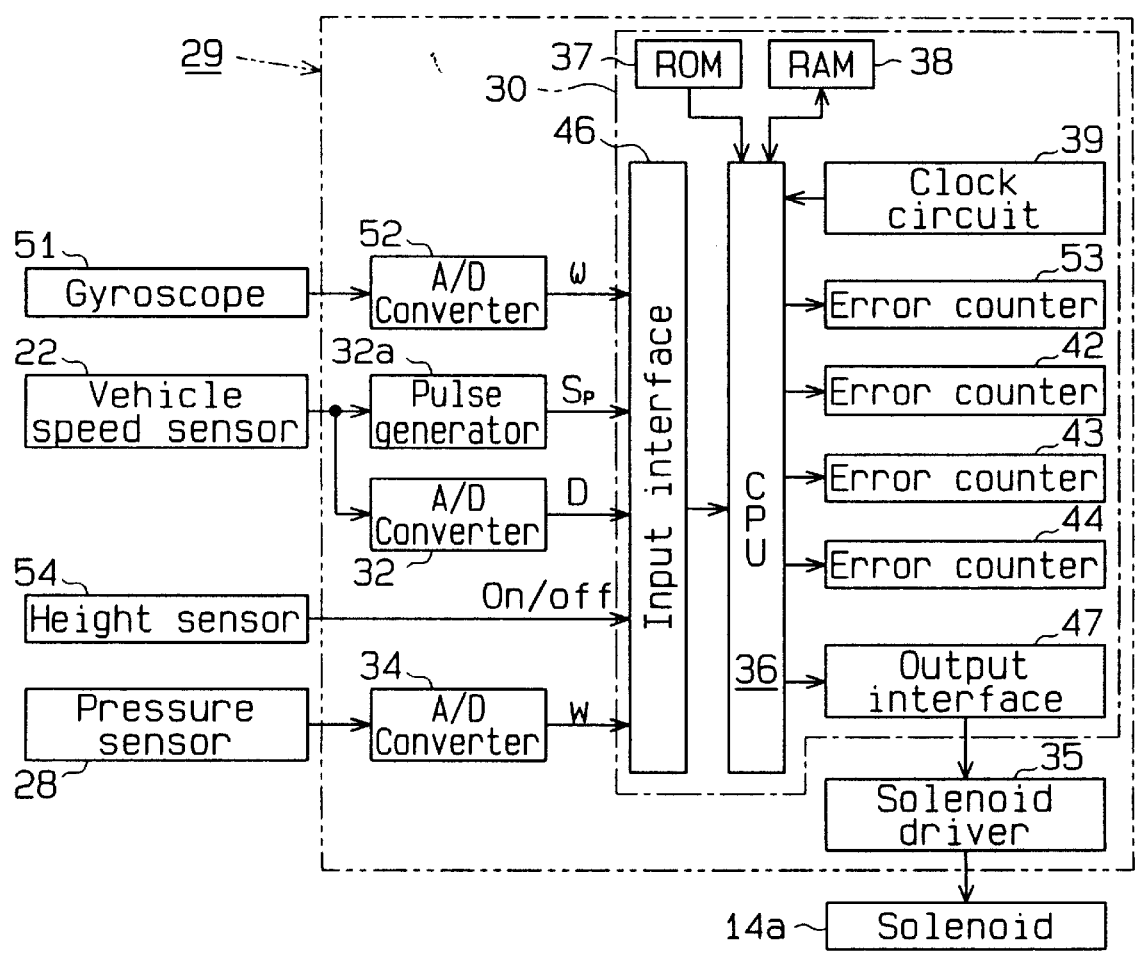
FIG. 16 is a block diagram depicting the electric constitution of the second embodiment.

As shown in FIG. 16, the gyroscope 51, connected to an input interface 46 via an A/D converter 52, detects the yaw rate (angular velocity) ω (rad/sec) at the time the forklift 1 turns, and sends a detection value ω corresponding to the yaw rate to the CPU 36. This embodiment uses the gyroscope 51 as a sensor in place of the tire angle sensor 21 which is used in the first embodiment. This embodiment does not therefore have the steering angle sensor 25 and the steering counter 40, which are needed to diagnose a failure in the tire angle sensor 21. An error counter 53 is provided to diagnose a failure in the gyroscope 51. Because a height sensor 54 has only to check the height at two stages, a high position and a low position (see FIG. 8), a proximity switch is used which is switched on when the height H of the fork is equal to or greater than the set value HO and is switched off when the height H is less than the set value HO. The other structure is the same as that of the first embodiment except for part of the program data stored in the ROM 37.

In this embodiment, the centrifugal acceleration and the rate of change in yaw rate ΔY/ΔT are computed by using the detection value Y of the gyroscope 51 and the vehicle speed V which has been obtained based on the detection signal from the vehicle speed sensor 22. Therefore, an equation Gs=V·Y for computing the centrifugal acceleration (Gs) and an equation ΔY/ΔT=|Y- Y1| (where Y1 is yaw rate data older by a given time ΔT) for computing the rate of change in yaw rate ΔY/ΔT are set in the program data for swing control which is stored in the ROM 37.

Figure 17:
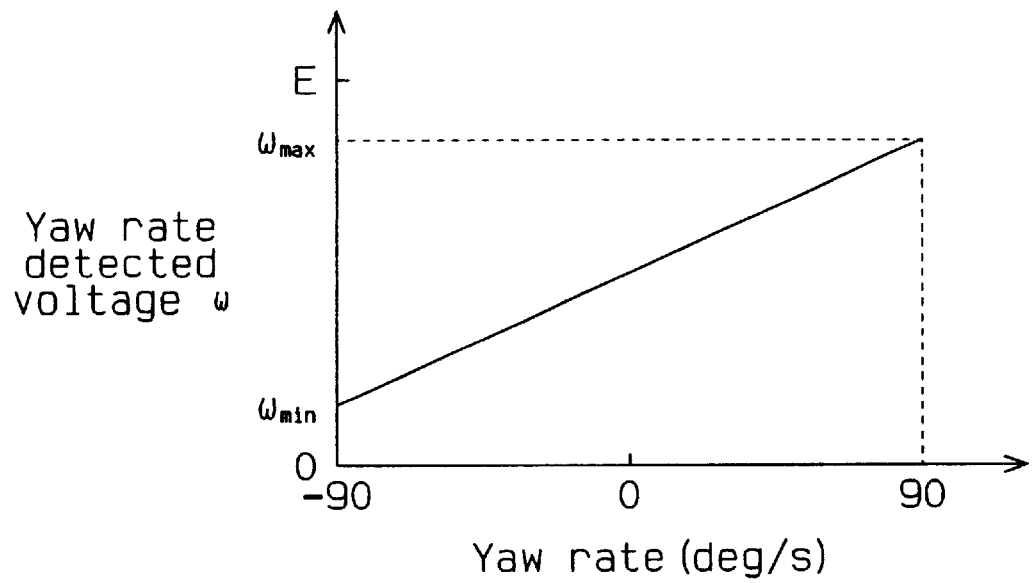
FIG. 17 is a graph for explaining detected voltages of a gyroscope.

As shown in FIG. 17, the gyroscope 51 detects the yaw rate Y in the range from −90 deg/sec to +90 deg/sec, and its detection value (voltage value) ω in the normal state lies in a range of ωmin≦ω≦ωmax in the range from 0 to E (supply voltage). Thus, when ω<ωmin or ω>ωmax, it is diagnosed that a disconnection/short-circuiting originated failure has occurred. With the height sensor 54 being normal, its output value H becomes Hmin (>0) when the sensor 54 is on, and becomes Hmax (<E) when the sensor 54 is off. Thus, when H<Hmin or H>Hmax, it is diagnosed that a disconnection/short-circuiting originated failure has occurred.

When the gyroscope 51 is diagnosed as failing, ωmax which is the maximum yaw rate (90 deg/sec) is set as the detection value ω. Of course, the minimum yaw rate, ωmin (a value equivalent to −90 deg/sec), can be set. When the height sensor 54 is diagnosed as failing, it is assumed that the fork is positioned at or above a predetermined height and the sensor 54 is on, and a height flag for checking if the height of the fork is equal to or greater, or less than the predetermined height is set at the time the map shown in FIG. 8 is used. Note that the method of diagnosing a failure in the pressure sensor 28 as well as the vehicle speed sensor 22 is the same as the one employed in the first embodiment, and values which are set as detection values when those sensors fail are set in a manner similar to that used in the first embodiment.

The CPU 36 performs control as follows. First, the CPU 36 reads the individual detection values, like the yaw rate Y, the vehicle speed V and the weight w. Then, the rate of change in yaw rate ΔY/ΔT is computed by using the equation ΔY/ΔT=|Y- Y1| (where Y1 is yaw rate data older by a given time ΔT) and the centrifugal acceleration is computed as Gs=V·Y.

The height flag is set when the output signal of the height sensor 54 is enabled, and the height flag is cleared when the output signal is disabled. Then, the set value of the centrifugal acceleration is determined from the detection value w from the pressure sensor 28 and the status of the height flag by using the map shown in FIG. 8. When Gs is equal to or greater than the set value or the rate of change in yaw rate ΔY/ΔT is equal to or greater than the set value y0, the lock signal is output to lock the rear axle 10.

With a sensor failing, control is carried out as follows. The CPU 36 performs failure diagnosis using the detection values D, w, ω and H from the sensors 22, 28, 51 and 54. When any of the detection values D, w, ω and H satisfies the associated failure condition, the CPU 36 increments the count value of the associated error counter. When the count value becomes a predetermined "10" which has been preset as a predetermined time, the CPU 36 diagnoses that sensor as failing. As the detection value of the sensor diagnosed as failing, the CPU 36 sets the largest value (Vmax, wmax, ωmax or the like) in the preset detection values in the normal state.

When the CPU 36 diagnoses the gyroscope 51 as failing, for example, ωmax equivalent to the maximum yaw rate Ymax (=90 deg/sec) is set as the detection value. As a result, the centrifugal acceleration is computed as Gs=V·Ymax, and the rear axle 10 is locked when the centrifugal acceleration at the time this value Gs is determined from the detection values w and H in accordance with the load state becomes equal to or greater than the set value. As the yaw rate ω becomes the constant value ωmax, the rate of change in yaw rate ΔY/ΔT always becomes "0" when this failure is diagnosed, so that locking the rear axle 10 based on the lock condition for ΔY/ΔT is not carried out.

Figure 18:
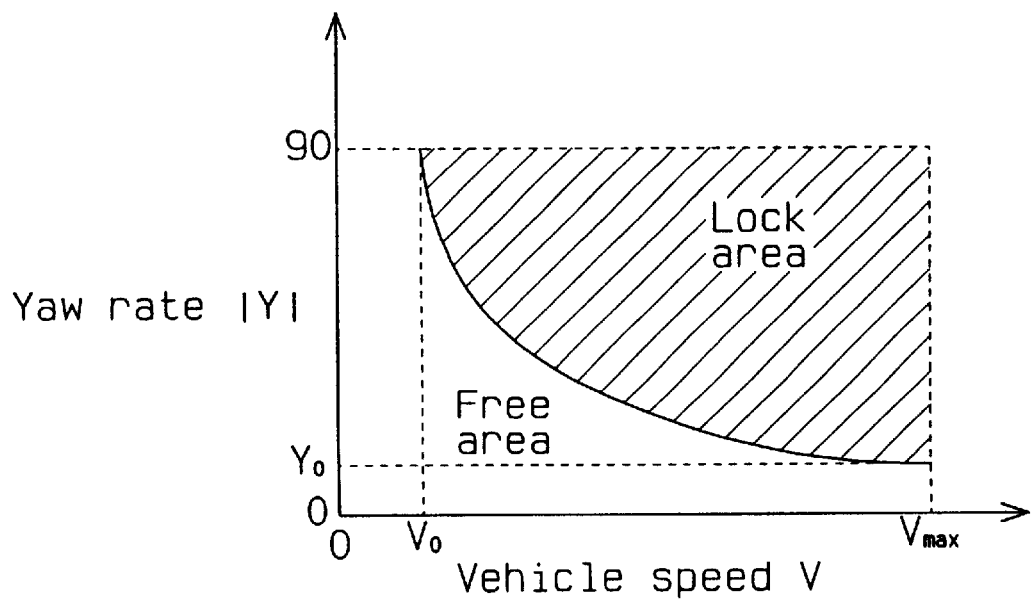
FIG. 18 is a graph showing a lock area with respect to the yaw rate and the vehicle speed.

FIG. 18 presents a map showing the relationship between the yaw rate |Y| and the vehicle speed V for the lock condition to be met. When the gyroscope 51 fails, it is assumed that the forklift 1 is turning at the maximum yaw rate Ymax (=90 deg/sec), but the lock condition is not satisfied (Gs<G) as long as the forklift 1 runs at a low speed less than the vehicle speed V0=G/Ymax (G=G1, G2, Therefore, the rear axle 10 is not locked (except for the case of a heavy load and high lift-up position). Even when the forklift 1 runs on a rough road with the vehicle's weight acting on the rear wheels 11 but at a low speed (V<V0), therefore, the rear axle 10 is free to be swingable so that the two front drive wheels firmly contact the ground. Accordingly, slipping which otherwise results from the front wheels not in contact with the ground hardly occurs.

Third Embodiment

The third embodiment of this invention will now be discussed with reference to FIGS. 19 through 23. In this embodiment, importance is given on the process of the CPU 36 when the tire angle sensor 21 fails.

Figure 20:
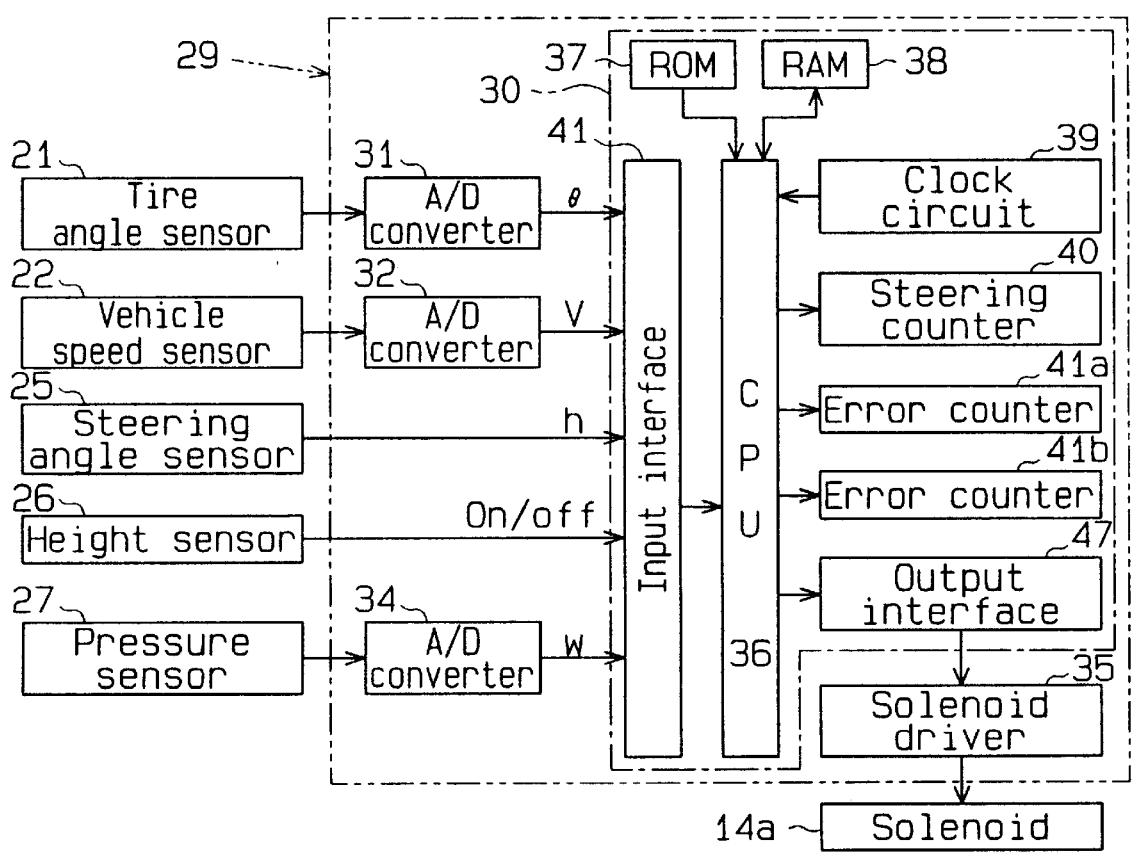
FIG. 20 is a block diagram depicting the electric constitution of the third embodiment.

This embodiment uses two error counters 41a and 41b as shown in FIG. 20 when the tire angle sensor 21 is diagnosed as failing. The count values, CK1 and CK2, of the error counters 41a and 41b are incremented within the range with "10" as the maximum value every time the failure condition preset for determining a failure in the tire angle sensor 21 is satisfied, and are decremented within the range with "0" as the minimum value every time the failure condition is not met. It is to be noted that the maximum value and the minim values of the count values are not limited to the mentioned ones, but may take other values.

A fall-off failure, which indicates that the tire angle sensor 21 has come off the king pin 20 so that the rotation of the king pin 20 is not input, is determined by checking that the tire angle θ does not change even though the steering wheel 12 is manipulated (the steering angle is changing). In this embodiment, several pieces of old tire angle data θ and steering angle data P are saved in the RAM 38, and the fall-off failure condition (ΔP>0 and Δθ=0) is set as the tire angle Δθ(=|θ−θ1|) being "0" even though the steering angle velocity ΔP (=|P- P1|) is positive where θ1 and P1 are data older by a given time.

When the tire angle sensor 21 is not failing (normal), the centrifugal acceleration (Gs) and the rate of change in yaw rate ΔY/ΔT are predicted through computation using two detection values, the tire angle θ and the vehicle speed V. When the tire angle sensor 21 fails (abnormal), the centrifugal acceleration (Gs) and the rate of change in yaw rate ΔY/ΔT are estimated through computation using two detection values, the vehicle speed V and the steering angle P, detected by the steering angle sensor 25, instead of the tire angle θ. That is, the centrifugal acceleration (Gs) and the rate of change in yaw rate ΔY/ΔT are estimated using the steering angle P instead of the tire angle θ in the flowchart in FIG. 8 which will be discussed later.

Figure 22:
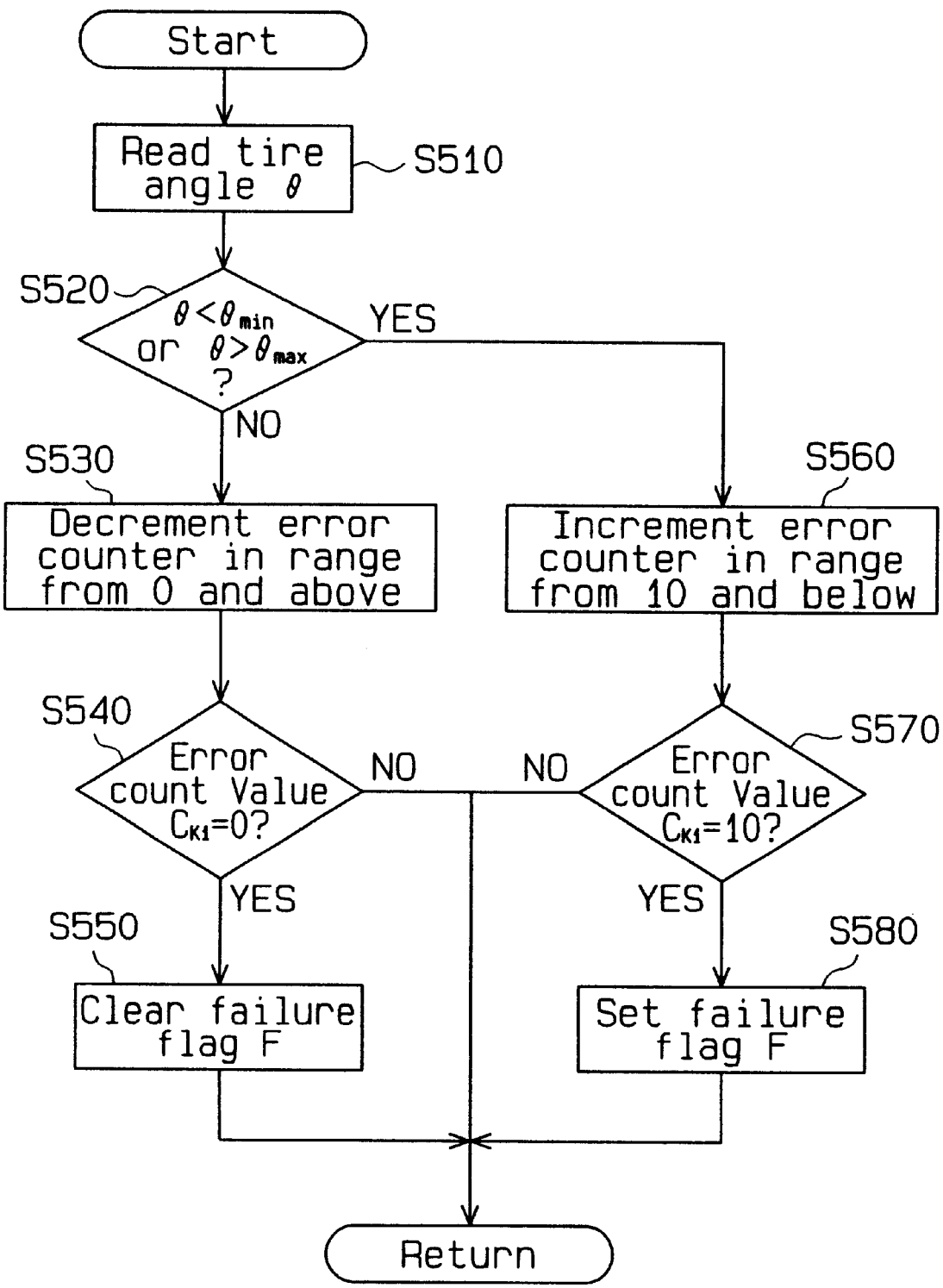
FIG. 22 is a flowchart of a disconnection/short-circuiting originated failure diagnosis process the CPU executes.

The diagnosis process for a disconnection/short-circuiting originated failure, illustrated in FIG. 22, will be discussed. The CPU 36 reads the tire angle θ first in step 510. In step 520, the CPU 36 determines if the disconnection/short-circuiting originated failure condition of θ<θmin or θ>θmax is satisfied. When the tire angle sensor 21 is normal and the tire angle θ lies in the range of θmin<θ<θmax, the CPU 36 proceeds to step 530 to decrement the count value CK1 of the error counter 41a within the range from "0" and above. When the tire angle sensor 21 is normal, therefore, the count value CK1 of the error counter 41a always becomes substantially "0". In step 540, the CPU 36 determines if the count value CK1=0. When CK1=0, the CPU 36 clears the failure flag F in step 550.

When the tire angle sensor 21 has a disconnection originated failure, the tire angle θ takes a value of θ<θmin, and when the tire angle sensor 21 has a short-circuiting originated failure, the tire angle θ takes a value of θ>θmax. When θ<θmin or θ>θmax is satisfied in step 520, the CPU 36 proceeds to step 560 to increment the count value CK1 of the error counter 41a within the range from "10" and below. When the count value CK-1 is less than "10", the CPU 36 terminates this process without changing the failure flag F. When the count value CK1 is "10", the CPU 36 sets "1" to the failure flag F in step 580.

If the detected voltage θ becomes temporarily unstable at the time the engine starts, for example, and the failure condition of θ<θmin or θ>θmax is thus satisfied, this temporary event takes place only in such a very short period of time that the count value CK1 does not reach "10". As a result, the failure flag F is not set. When the tire angle sensor 21 has a disconnection originated failure or a short-circuiting originated failure, on the other hand, the count value CK1 keeps "10" and the failure flag F is held set.

Figure 23:
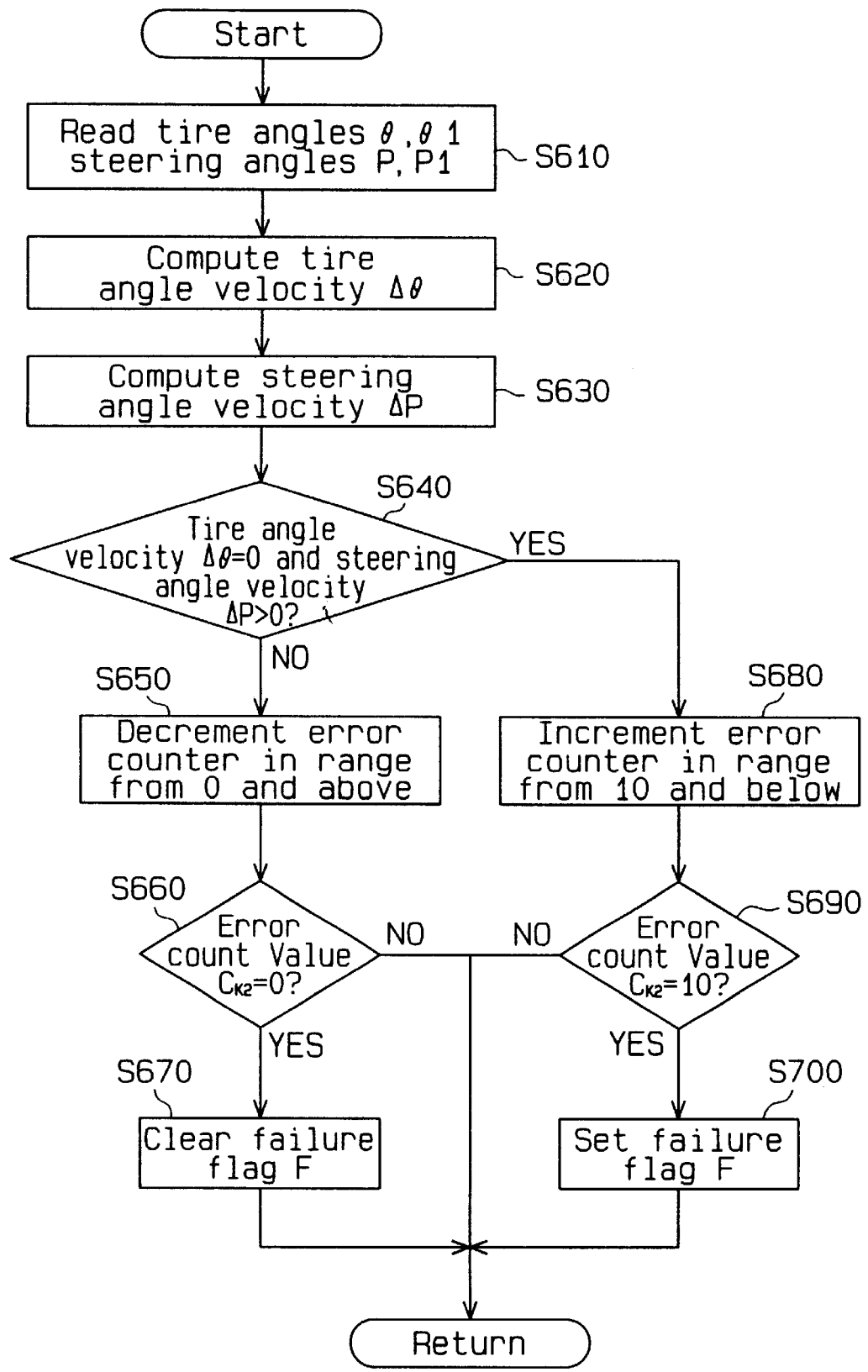
FIG. 23 is a flowchart of a disconnection originated failure diagnosis process the CPU executes.

The fall-off failure diagnosis process illustrated in FIG. 23 will now be discussed. The CPU 36 reads the tire angles θ and θ1, and the steering angles P and P1 first in step 610. In step 620, the CPU 36 computes the tire angle velocity Δθ=|θ−θ1|. The CPU 36 computes the steering angle velocity ΔHθ=|Hθ− Hθ1| in step 630.

In step 640, the CPU 36 determines if the fall-off failure condition of the tire angle velocity Δθ=0 and the steering angle velocity ΔP>0 is satisfied. When the tire angle sensor 21 is normal and the steering angle velocity ΔP >0, the tire angle velocity always becomes Δθ>0 so that the fall-off failure condition is not met. In this case, the CPU 36 proceeds to step 650 to decrement the count value CK2 of the error counter 41b within the range from "0" and above.

When the tire angle sensor 21 is normal, therefore, the count value CK2 of the error counter 41b always becomes substantially "0". In step 660, the CPU 36 determines if the count value CK2 =0. When CK2=0, the CPU 36 clears the failure flag F in step 670.

When the tire angle sensor 21 has a fall-off failure, the rotation of the king pin 20 is not transmitted to the input shaft even if the steering wheel 12 is manipulated to steer the rear wheels 11, so that the input value θ from the tire angle sensor 21 becomes constant. In this case, the fall-off failure condition of ΔHθ>0 and Δθ=0 is satisfied in step 640, the CPU 36 proceeds to step 680 to increment the count value CK2 of the error counter 41b within the range from "10" and below. In the next step 690, when the count value CK2 is smaller than "10", the CPU 36 terminates this process without changing the failure flag F. When the count value CK2 is "10", the CPU 36 proceeds to step 700 and sets "1" to the failure flag F.

Even if the failure condition of ΔHθ>0 and Δθ=0 is satisfied when the tire angle sensor 21 is normal due to the delayed response of the rear wheels 11 to the manipulation of the steering wheel 12, this temporary event takes place only in such a very short period of time that the count value CK2 hardly reaches "10", leaving the failure flag F at "0". When the tire angle sensor 21 has come off the king pin 20 and has a fall-off failure, on the other hand, the count value CK2 reaches and keeps "10", so that the failure flag F is held set.

Next, the swing control process will be explained with reference to FIG. 21.

The CPU 36 outputs the unlock signal to the solenoid driver 35 in order to hold the rear axle 10 free, except for a specific case to be discussed later, where the rear axle 10 need be locked. At this time, the driver 35 supplies an excitation current to the electromagnetic changeover valve 14.

When the height sensor 27 is enabled while the input value w from the pressure sensor 28 is equal to or greater than the set value w0, the CPU 36 outputs the lock command signal based on which the driver 35 deexcites the electromagnetic changeover valve 14. As a result, the changeover valve 14 is switched to the block position from the communication position, locking the dumper 13. That is, when the fork 3 with a load equal to or heavier than the weight w0 thereon is lifted to or above the set value D0 so that the height of gravitational center of the vehicle gets high, the rear axle 10 is always locked. It is thus possible to secure stable running when the load is heavy and the fork's position is high to make the height of gravitational center of the vehicle high.

Figure 21:
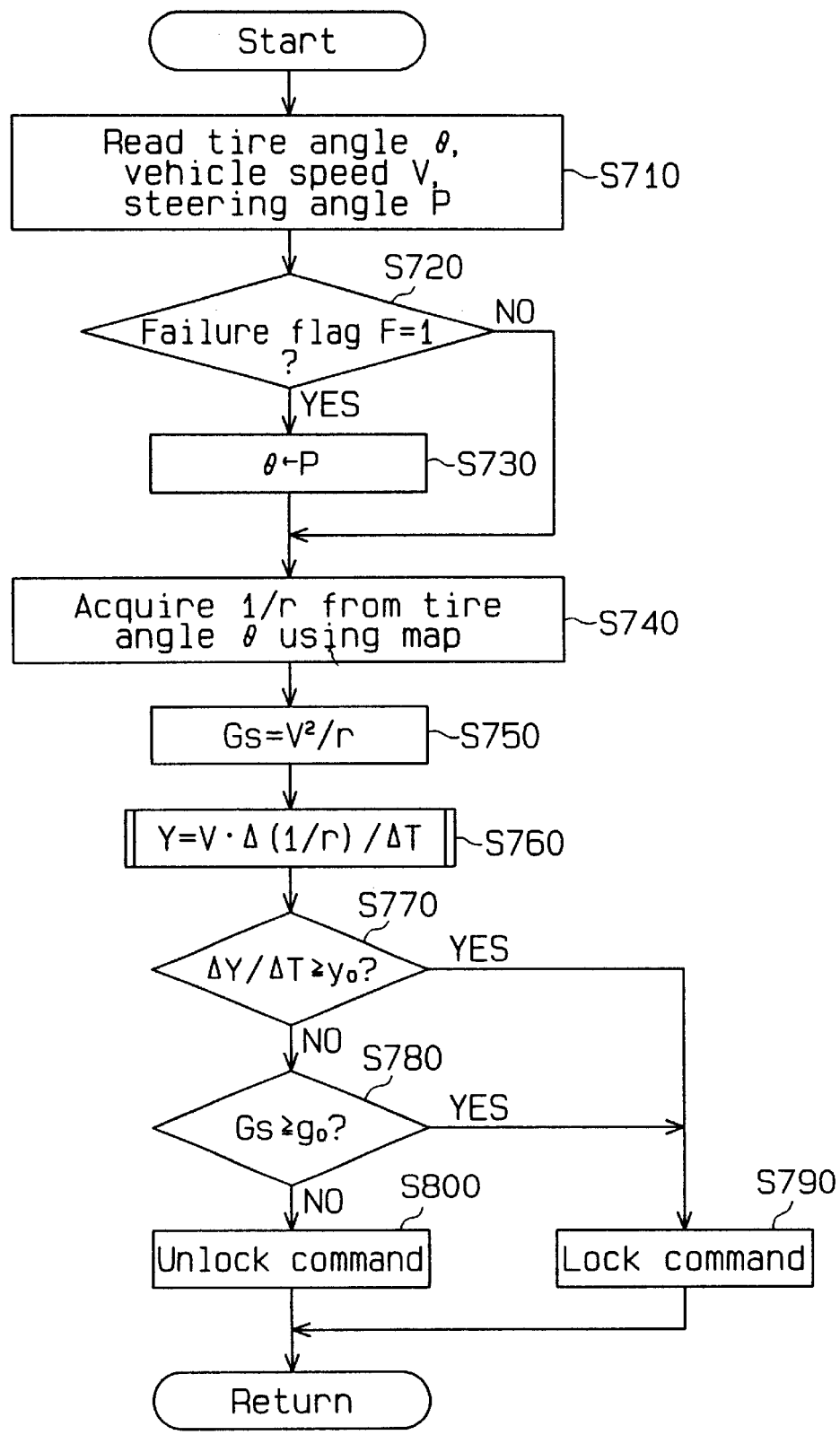
FIG. 21 is a flowchart of a swing process a CPU performs.

Then, the process illustrated in FIG. 21 is executed, except when the condition of w≧w0 and D>D0 is satisfied. First, the CPU 36 reads the tire angle θ, the steering angle P and the vehicle speed V in step 710. In step 720, the CPU 36 determines if the failure flag F =1. When the tire angle sensor 21 is normal and the failure flag F=0, the CPU 36 proceeds to step 740.

When the tire angle sensor 21 has a disconnection/short-circuiting originated failure or a fall-off failure and the failure flag F=1, the CPU 36 proceeds to step 730 to replace the tire angle θ with the steering angle P, read in step 710.

When the tire angle sensor 21 has a disconnection/short-circuiting originated failure or a fall-off failure and the failure flag F=1, therefore, the steering angle P is used in place of the tire angle at and following step 740.

When the tire angle sensor 21 has neither a disconnection/short-circuiting originated failure nor a fall-off failure and the failure flag F=0, the tire angle θ is directly used for the tire angle in the processing at and after step 740.

For the sake of descriptive convenience, even when the steering angle P is used in the processing at and after step 740, the term "tire angle θ" is used in the description of such processing.

Figure 19:
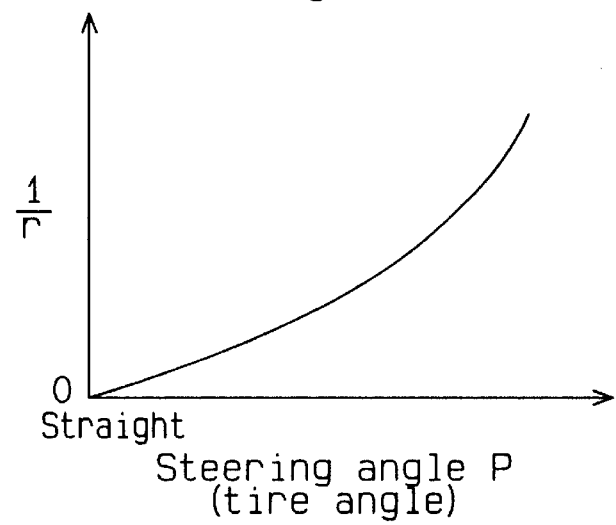
FIG. 19 is a map illustrating the relationship between the steering angle and the reciprocal of the turning radius according to a third embodiment.

In step 740, the CPU 36 acquires the reciprocal of the turning radius 1/r from the tire angle θ using the map stored in the ROM 37. FIG. 19 presents the map which shows the relationship between the steering angle P (tire angle θ) and the reciprocal of the turning radius 1/r.

In step 750, the CPU 36 computes the estimated value Gs of the centrifugal acceleration from the equation (1) using the vehicle speed V and the reciprocal of the turning radius 1/r. Then, the CPU 36 computes the rate of change in yaw rate ΔY/ΔT in step 760. Specifically, the CPU 36 reads the tire angle data θ1 older by a predetermined time ΔT from a predetermined memory area in the RAM 38, acquires the reciprocal of the turning radius 1/r corresponding to this value θ1, then calculates ΔY/ΔT from the equation (2).

In step 770, the CPU 36 determines if the rate of change in yaw rate ΔY/ΔT is equal to or greater than the set value y0. When ΔY/ΔT≧y0, the CPU 36 proceeds to step 790 and sends the lock command signal to the driver 33 to position the spool of the changeover valve 14 at the block position. Consequently, the solenoid 14a is deexcited, moving the spool to the block position. This locks the dumper 13. That is, the rear axle 10 is held unswingable.

When ΔY/ΔT<y0 in step 770, the CPU 36 determines in step 780 if the estimated value Gs is equal to or greater than the set value g0. When Gs≧g0, the CPU 36 sends the lock command signal to the driver 33 in step 790 to position the spool of the changeover valve 14 at the block position. Accordingly, the rear axle 10 is locked in step 790 as mentioned above.

When Gs<g0 in step 780, the CPU 36 sends the unlock signal to the driver 33 in step 780 to position the spool of the changeover valve 14 at the communication position. As a result, the driver 33 supplies the excitation current to the changeover valve 14 to hold the rear axle 10 free.

If either the rate of change in yaw rate ΔY/ΔT or the estimated value Gs of the centrifugal acceleration becomes equal to or greater than y0 or g0, the changeover valve 14 is closed to lock the rear axle 10.

As discussed above specifically, in diagnosing a failure in the tire angle sensor 21, the steering angle sensor 25 which can detect the steering angle P that varies in synchronous with the tire angle θ is used and it is determined if the correlation between the steering angle velocity ΔP and the tire angle velocity Δθ holds the failure relation (ΔP>0 and Δθ=0). It is thus possible to find the fall-off failure of the tire angle sensor 21.

The detected voltage θ from the tire angle sensor 21 is monitored and it is determined whether or not the input voltage θ is off the normal detection range of the tire angle sensor 21. This can allow any disconnection/short-circuiting originated failure of the tire angle sensor 21 to be detected.

When the tire angle sensor 21 fails, the steering angle P is used in place of the tire angle θ. Even when the tire angle sensor 21 fails, similar control to the one performed when the tire angle sensor 21 is normal can be carried out.

When the rate of change in yaw rate ΔY/ΔT becomes equal to or greater than the set value y0, the rear axle 10 is also locked. Thus, the rear axle 10 is locked promptly after the manipulation of the steering wheel 12 for a turning action is started. Further, it is possible to prevent the rear axle 10 from being unlocked during the reverse manipulation of the steering wheel 12, which would otherwise result in unstable running.

The steering angle sensor 25, originally provided on the forklift 1 for the diagnose and control or the like the name infers, is utilized as an alternative sensor in diagnosing a failure in any sensor for swing control and when the tire angle sensor 21 fails. This feature allows sharing of the sensors, which results in cost reduction of the apparatus.

Fourth Embodiment

The fourth embodiment of this invention will now be discussed referring to FIG. 24. As this embodiment is the same as the third embodiment in the hardware structure, like or same reference numerals or symbols are given to those components which are the same as the corresponding components of the third embodiment, and the following description will be focused on the differences.

In this embodiment, the rate of change in centrifugal acceleration η is used as a determination value instead of the rate of change in yaw rate ΔY/ΔT.

Figure 24:
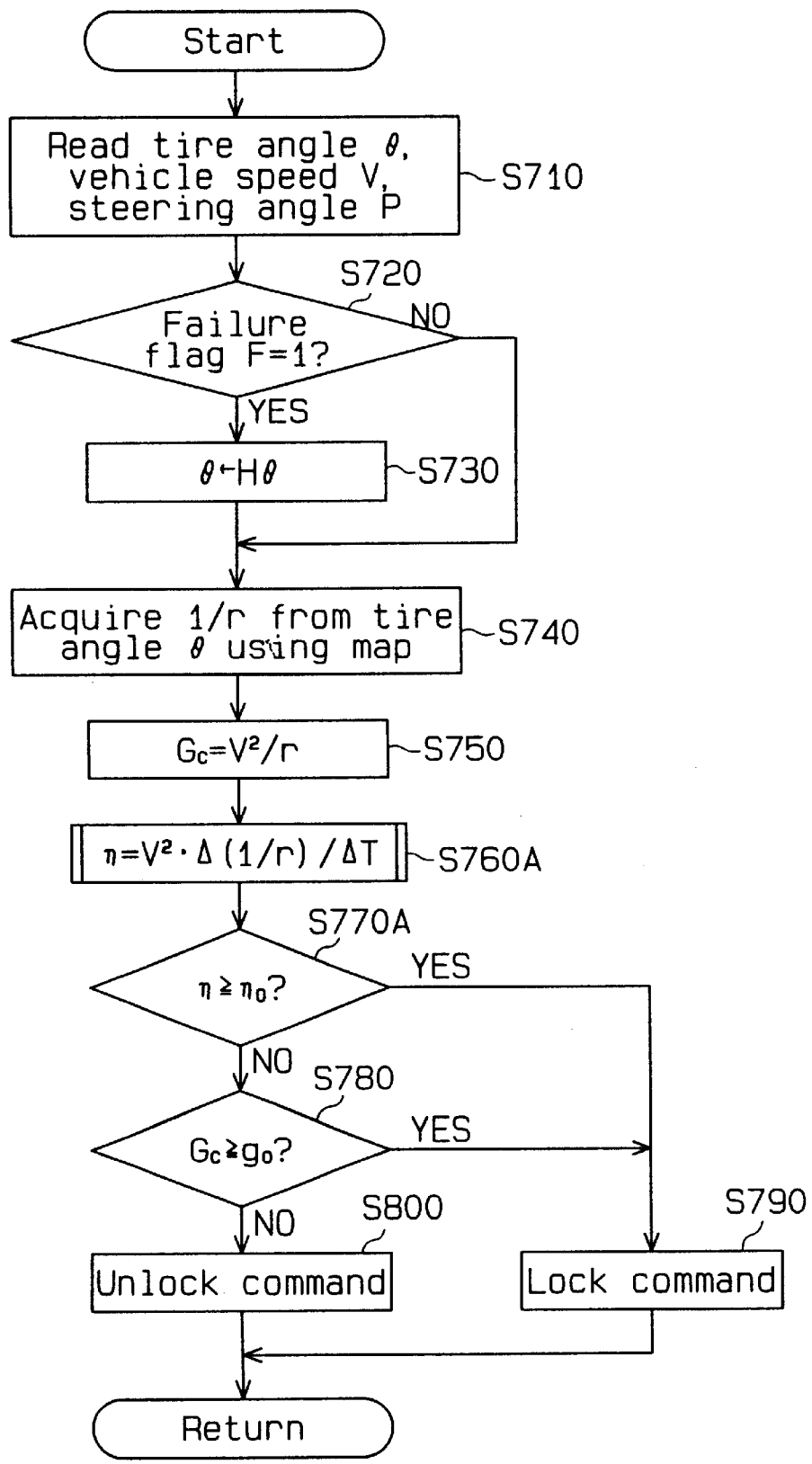
FIG. 24 is a flowchart of a swing process a CPU executes according to a fourth embodiment of this invention.

The ROM 37 is holding various kinds of program data one of which is the program data for the swing control process illustrated in the flowchart in FIG. 24. In this embodiment, the measured values of the centrifugal acceleration Gs acting on the vehicle (the centrifugal acceleration Gs acting across the base of the vehicle at the time of turning) and the time-dependent rate of change in centrifugal acceleration η are used as determination values, and when either Gs or η becomes equal to or larger than the associated set value, the rear axle 10 is locked.

Further stored in the ROM 37 is the set value η0 of the rate of change in centrifugal acceleration η. The individual set values g0 and η0 have been derived from the running tests or theoretical computation and are so set as to lock the rear axle 10 at the proper timing to ensure running stability.

The change in centrifugal acceleration with respect to time, ΔG/ΔT, or the rate of charge in centrifugal acceleration η is given by the following equation (3).

$$\eta = \Delta G/\Delta T = V^2 \cdot \Delta(1/r)/\Delta T \qquad (3)$$

In this embodiment, the rate of change in centrifugal acceleration η is computed from the following equation using two detection values θ (or P) and V based on the relationship given in the equation (3).

$$\eta = \Delta G/\Delta T = V^2 \cdot |1/r - 1/r1|$$

where η is a change in centrifugal acceleration per predetermined time ΔT (e.g., several scores of milliseconds), and 1/r and 1/r1 are respectively the reciprocals of the turning radius before and after the predetermined time ΔT passes.

The rate of change in centrifugal acceleration η is equivalent to the derivate of the equation (1) in the first embodiment with respect to time and is given by $$\eta = V^2 \cdot \Delta(1/r)/\Delta T + (1/r) \cdot 2V \cdot \Delta V/\Delta T \qquad (4)$$

In the equation (4), since the last term ΔV/ΔT indicates a time-dependent change in vehicle speed V, which can be considered as substantially constant for the forklift 1 during turning, ΔV/ΔT becomes sufficiently smaller than Δ(1/r)/ΔT in the preceding term. This embodiment therefore employs the aforementioned equation (3), which is an approximation of the equation (4) with the last term ignored, to predict η.

The flowchart in FIG. 24 will be explained below.

This flowchart is similar to the one in FIG. 21. Except for steps 760 and 770 in FIG. 21 respectively changed to steps 760A and 770A, the other steps in the swing control process are the same as those in FIG. 21.

When the flowchart in FIG. 24 is executed to carry out the swing control process, therefore, the CPU 36 proceeds to step 760A after finishing the process of step 750. The CPU 36 computes the rate of change in centrifugal acceleration η in step 760A. Specifically, the CPU 36 reads the tire angle data θ1 older by the predetermined time ΔT from a predetermined memory area in the RAM 38, acquires the reciprocal of the turning radius 1/r corresponding to this value θ1, and then computes η from the equation (3). Then, the CPU 36 proceeds to step 770A.

The CPU 36 determines in step 770A if the rate of change in centrifugal acceleration η is equal to or greater than the set value η0. When η≧η0, the CPU 36 goes to step 790 and sends the lock command signal to the driver 33 to set the spool of the changeover valve 14 to the block position. When η<η0, the CPU 36 goes to step 780.

According to the fourth embodiment, as apparent from the above, it is determined whether or not to lock the dumper based on the rate of change in centrifugal acceleration η instead of the rate of change in yaw rate ΔY/ΔT. The rate of change in centrifugal acceleration η has $V^2$ as a factor as apparent from the equation (3), while the rate of change in yaw rate ΔY/ΔT has V as a factor as apparent from the equation (2). As indicated by the graph in FIG. 25, the rate of change in centrifugal acceleration η significantly differs between fast running and slow running (in FIG. 25, ηH indicates the rate in fast running mode and ηL indicates the rate in slow running mode). The rate of change in yaw rate ΔY/ΔT, by contrast, is not varied by the vehicle speed as much as the rate of change in centrifugal acceleration ((ΔY/ΔT)H indicates the rate in fast running mode and (ΔY/ΔT)L indicates the rate in slow running mode). When the rate of change in yaw rate ΔY/ΔT is used, therefore, the set value y0 should have been set relatively low in the light of the rate in fast running mode.

Figure 25:
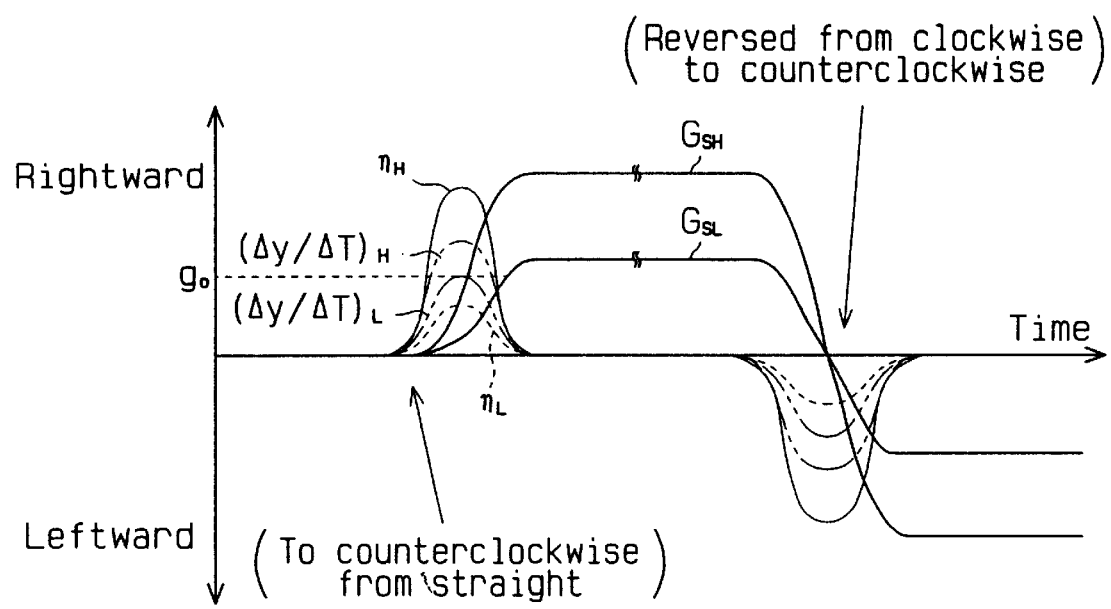
FIG. 25 is a graph showing the centrifugal acceleration, the rate of change in centrifugal acceleration and the rate of change in yaw rate at the time the forklift turns.

Because this embodiment uses the rate of change in centrifugal acceleration η in view of the influence of the vehicle speed, however, it is possible to set the proper set value η0 which is designed to cope with a change in vehicle speed too. As shown in FIG. 25, for example, even with a change in tire angle by which the rate of change in centrifugal acceleration ηH becomes equal to or greater than the set value η in fast running mode to thereby lock the rear axle 10, the rate of change in centrifugal acceleration ηL becomes less than the set value η0 in slow running mode so that the rear axle 10 will not be locked.

As compared with the case of using the rate of change in yaw rate ΔY/ΔT in determination in the lock control, therefore, wasteful locking is suppressed in slow running mode. This suppresses slipping which may otherwise be caused as locking of the swing of the rear axle 10 while the height of gravitational center of the vehicle is on the rear wheel side reduces the ground contact pressure of one of the front drive wheels 7 or causes that wheel to be lifted above the road surface. "$G_{SH}$" and "$G_{SL}$" in FIG. 25 respectively represent the centrifugal accelerations in fast running mode and slow running mode.

Fifth Embodiment

The fifth embodiment will now be discussed. In the previous fourth embodiment, the rate of change in centrifugal acceleration η is computed from $\eta = \Delta G/\Delta T = V^2 \cdot \Delta(1/r)/\Delta T$ with the vehicle speed V treated as constant. The fifth embodiment, by contrast, considers a change in vehicle speed V. The structure of this embodiment is the same as that of the second embodiment, except for the equation of computing the rate of change in centrifugal acceleration η.

With the structure of the fourth embodiment equipped with the tire angle sensor 21, the steering angle sensor 25 and the vehicle speed sensor 22, in consideration of the influence of a time-dependent change in vehicle speed V on the rate of change in centrifugal acceleration $\eta (=\Delta G/\Delta T)$, η is computed based on the aforementioned equation (4) which considers the time-dependent change in vehicle speed V, in place of the equation (3).

$$\eta = V^2 \cdot \Delta(1/r)/\Delta T + (1/r) \cdot 2V \cdot \Delta V/\Delta T \tag{4}$$

The following equation is stored in the ROM 37 as an equation to compute the rate of change in centrifugal acceleration n based on the equation (4).

$$\eta = V^2 \cdot |1/r - 1/r1| + (1/r) \cdot 2V \cdot |V - V1|$$

where V1 and V2 are the vehicle speeds before and after the predetermined time $\Delta T (=n \cdot \Delta T0)$ passes. 1/r and 1/r1 respectively denote the reciprocals of the turning radius which are acquired from the tire angles θ1 and θ before and after the predetermined time $\Delta T (=n \cdot \Delta T0)$ passes, by using the map. In this embodiment, the CPU 36 saves several pieces of old tire angle data θ and vehicle speed data V in the RAM 38.

The following equation (5) may be used in place of the equation (4) in calculating the rate of change in centrifugal acceleration η.

$$\eta = \Delta G/\Delta T = \Delta(V^2/r)/\Delta T \tag{5}$$

The following equation is stored in the ROM 37 as an equation to compute the rate of change in centrifugal acceleration η based on the equation (5).

$$\eta = |Gs - Gs1| (= |V^2/r - V1^2/r1|)$$

where Gs1 and Gs are the centrifugal acceleration data before and after the predetermined time ←T passes, and $Gs1 = V1^2/r1$ and $Gs = V^2/r$. Note that V1, r1, V and R respectively denote the vehicle speeds and the reciprocals of the turning radius before and after the passage of the predetermined time ΔT. The CPU 36 saves several pieces of old centrifugal acceleration data Gs in the RAM 38. As differentiating the detection value V of the vehicle speed increases noise, filtering to remove noise is performed by software to suppress an increase in noise as much as possible in this embodiment.

The CPU 36 computes η from the equation that is based on the equation (4) or (5) using the current data V and 1/r and the old data V1 and 1/r1 older by the predetermined time ΔT. As this embodiment uses the rate of change in centrifugal acceleration η which reflects a time-dependent change in vehicle speed that is computed based on the equation (4) or (5), the accurate value of η can be obtained even when the time-dependent change in vehicle speed V cannot be ignored like the time of acceleration or the time of deceleration (e.g., when braking is applied). Even with the vehicle speed changing, the rear axle 10 is locked only when really needed, so that unnecessary locking can be avoided as much as possible.

Sixth Embodiment

The sixth embodiment will be discussed below. In the fourth embodiment, the rate of change in yaw rate ΔY/ΔT is computed from the equation (2), $\Delta Y/\Delta T = V \cdot \Delta(1/r)/\Delta T$ with the vehicle speed V treated as constant. By contrast, the sixth embodiment considers a change in vehicle speed V. The structure of this embodiment is the same as that of the first embodiment, except for the equation of computing the rate of change in yaw rate ΔY/ΔT.

With the structure of the fourth embodiment equipped with the tire angle sensor 21, the steering angle sensor 25 and the vehicle speed sensor 22, in consideration of the influence of a time-dependent change in vehicle speed V on the rate of change in yaw rate $\Delta Y/\Delta T (=\Delta L/\Delta T)$, ΔY/ΔT is computed based on the equation (3) used in the first embodiment, which considers the time-dependent change in vehicle speed V, instead of the equation (2).

$$\Delta Y/\Delta T = V \cdot \Delta(1/r)/\Delta T + \Delta V/+\Delta T \cdot (1/r)$$

The following equation is stored in the ROM 37 as an equation to compute the rate of change in yaw rate ΔY/ΔT based on the equation (3).

$$\Delta Y/\Delta T = V \cdot |1/r - 1/r1| + (1/r) \cdot |V - V1|$$

where V1 and V are the vehicle speeds before and after the predetermined time $\Delta T = n \cdot \Delta T0$ passes. 1/r1 and 1/r respectively denote the reciprocals of the turning radius which are acquired from, the tire angles θ1 and θ before and after the predetermined time $\Delta T (=n \cdot \Delta T0)$ passes, by using the map. In this embodiment, the CPU 36 saves several pieces of old tire angle data θ and vehicle speed data V in the RAM 38.

The following equation (6) may be used in place of the aforementioned equation of $\Delta Y/\Delta T = V \cdot |1/r - 1/r1| + (1/r) \cdot |V - V1|$ in calculating the rate of change in yaw rate ΔY/ΔT .

$$\Delta Y/\Delta T = \Delta(V/r)/\Delta T \tag{6}$$

The following equation is stored in the ROM 37 as an equation to compute the rate of change in yaw rate ΔY/ΔT based on the equation (6).

$$\Delta Y/\Delta T = |Ys - Ys1| (= |V/r - V1/r1|)$$

where Ys1 and Ys are the yaw rate data before and after the predetermined time ΔT passes, and $Ys1 = V1/r1$ and $Ys = V/r$. Note that V1, r1, V and r respectively denote the vehicle speeds and the reciprocals of the turning radius before and after the passage of the predetermined time ΔT. The CPU 36 saves several pieces of old centrifugal acceleration data Gs in the RAM 38. As differentiating the detection value V of the vehicle speed increases noise, filtering to remove noise is carried out by software to suppress an increase in noise as much as possible in this embodiment.

The CPU 36 computes ΔY/ΔT from the equation that is based on the aforementioned equation using the current data V and 1/r and the old data V1 and 1/r1 older by the predetermined time ΔT. As this embodiment uses the rate of change in yaw rate ΔY/ΔT which reflects a time-dependent change in vehicle speed, the accurate rate of change in yaw rate can be acquired even when the time-dependent change in vehicle speed V cannot be ignored like the time of acceleration or the time of deceleration (e.g., when braking is applied). Even with the vehicle speed varying, the rear axle 10 is locked only when really needed, so that unnecessary locking can be avoided as much as possible.

Seventh Embodiment

The seventh embodiment of this invention will now be discussed with reference to FIGS. 26 to 29.

Figure 26:
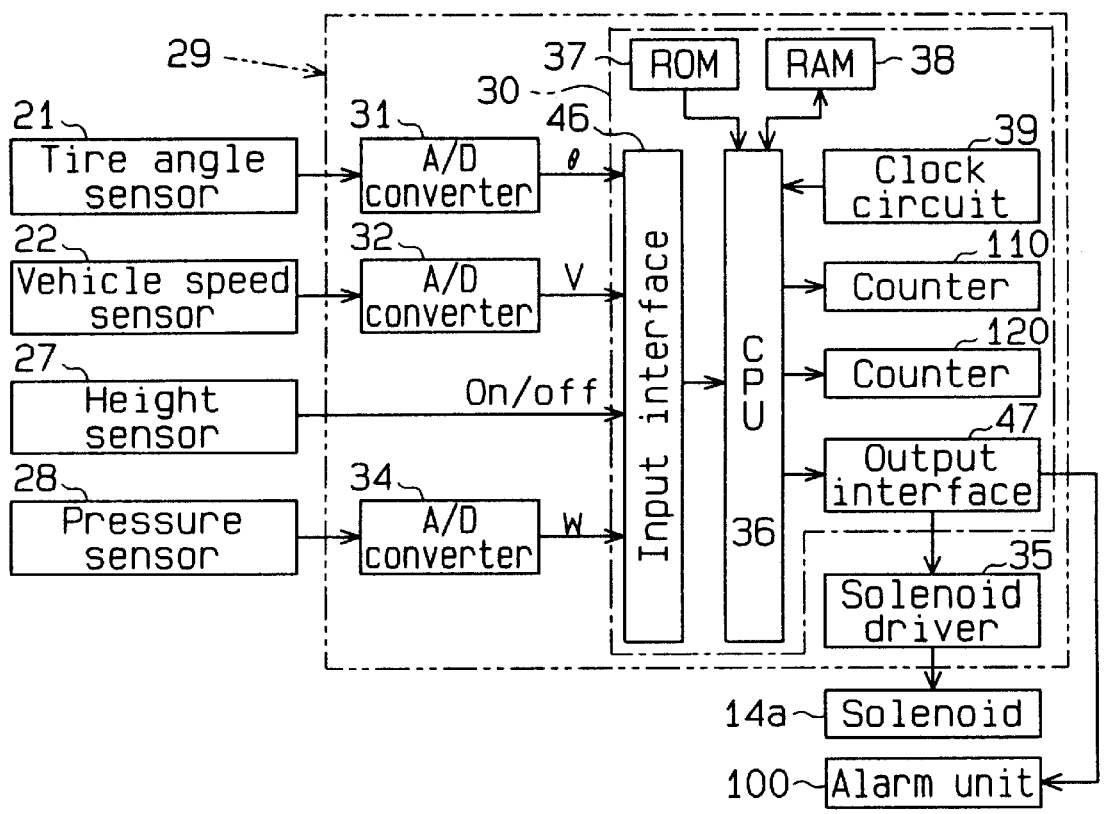
FIG. 26 is a block diagram depicting the electric constitution of a seventh embodiment of this invention.

As shown in FIG. 26, this embodiment is equipped with an alarm unit 100 which generates an alarm when it is expected that the vehicle's state becomes unstable during turning. It is an aim of this invention to permit the driver to cope with an expected problem based on this alarm. In this embodiment, the set value of the centrifugal acceleration (Gs) is also set in accordance with the weight w and height H of the fork as indicated by the map in FIGS. 8A and 8B.

The set values G1, G2 and g0 of the rate of change in centrifugal acceleration η stored in the ROM 37 are so set as to lock the rear axle 10 at the proper timing to ensure running stability of the forklift as per the above-described embodiments. The CPU 36 has two flags Fg and Fgv, the former flag Fg being set when the estimated value Gs of the centrifugal acceleration becomes equal to or greater than the set value C1 or G2 while the latter flag Fgv is set when the rate of change in centrifugal acceleration η becomes equal to or greater than the set value g0.

The ROM 37 retains the map for obtaining the reciprocal of the turning radius 1/r of the vehicle from the tire angle θ, and the centrifugal acceleration (Gs) is predicted through computing using the two detection values θ and V from the tire angle sensor 21 and the vehicle speed sensor 22. The estimated value Gs of the centrifugal acceleration is computed from the equation Gs = $V^2/r$ using the reciprocal of the turning radius 1/r that is determined from the tire angle θ. The derivative of the centrifugal acceleration with respect to time, ΔG/ΔT, or the rate of change in centrifugal acceleration η is given from $$\eta = \Delta G/\Delta T = V^2 \cdot \Delta(1/r)/\Delta T, \text{ namely}$$

$$\eta = \Delta G/\Delta T = V^2 \cdot |1/r - 1/r1|$$

The aforementioned rate of change in centrifugal acceleration η is equivalent to the derivate of the equation η=ΔG/ΔT=$V^2$·1/r)/ΔT with respect to time and is expressed as $$\eta = V^2 \cdot \Delta(1/r)/\Delta T + (1/r) \cdot 2V \cdot \Delta V/\Delta T \quad (7)$$

In the equation (7), the last term ΔV/ΔT indicates a time-dependent chance in vehicle speed V, which can be considered as substantially constant for the forklift 1 during turning, ΔL/ΔT becomes sufficiently smaller than Δ(1/r)/ΔT in the preceding term. This embodiment therefore employs the equation η=ΔG/ΔT=$V^2$·1/r−1/r1|, which is an approximation of the equation (7) with the last term ignored.

In addition, there is a countermeasure for preventing frequency switching between the locked state and the unlocked state which results from the weight w, the height H and the rate of change in centrifugal acceleration η taking values close to their set values. Specifically, when the flag Fgv is "1", a set value "α·g0" (e.g., 0.5<α<1) smaller than "g0" is used as the set value for η, and when the flag Fgv "1", set values "α·g0" and "α·h0" smaller than "w0" and "h0" are used as the set values for Gs.

Two counters 110 and 120 count a predetermined sustain time T based on the clock signal from the clock circuit 39; the sustain time is when the centrifugal acceleration (Gs and η take the values at which the rear axle 10 should be unlocked (i.e., the determination values Gs and η less than the associated set values G1 or G2 and g0, respectively) or the unlock condition is satisfied. Unlocking is carried out after the unlock condition being satisfied continues for the predetermined sustain time T, and the two counters 110 and 120 serve to count that sustain time.

The swing control on the forklift 1 will now be discussed with reference to the flowcharts in FIGS. 27A and 27B. While the ignition key is on, the detection signals θ, V, w and so forth from the individual sensors 21–24 are input to the CPU 36, which in turn executes the swing control process at predetermined time intervals ΔT0 (e.g., 10 to 50 milliseconds).

First, the CPU 36 reads the detection values of the tire angle θ, the vehicle speed V and the weight w in step 910. In step 920, the CPU 36 acquires the reciprocal of the turning radius 1/r from the tire angle θ using the map stored in the RCM 37.

In step 930, the CPU 36 computes the estimated value Gs of the centrifugal acceleration using the vehicle speed V and the reciprocal of the turning radius 1/r. The CPU 36 computes the rate of change in centrifugal acceleration η in step 940. Specifically, the CPU 36 reads the tire angle data θ1 older by the predetermined time ΔT from a predetermined memory area in the RAM 38, then calculates η=$V^2$·|1/r−1/r1| based on the equation (2) by using the reciprocal of the turning radius 1/r1 older by the predetermined ΔT, acquired from the value θ1, the current 1/r, and the vehicle speed V.

In step 950, the CPU 36 determines if η is equal to or greater than the set value g0. When η is equal to or greater than the set value g0, the CPU 36 sets "1" in the flag Fgv in step 960. When η is smaller than the set value g0, the CPU 36 determines in step 970 if the unlock condition (η<g0 when Fgv=0 or η<α·g0 when Fgv=1) has been kept satisfied for the predetermined sustain time T. The counter 110 counts the predetermined sustain time T, and the counter 110 is reset every time η≧g0 is met and starts counting every time η<g0 or η<α·g0 is met.

When the counter 110 has not been counting for the predetermined sustain time T in step 970, the CPU 36 proceeds to step 990 and does not change the flag Fgv. When the unlock condition has been met for the predetermined sustain time T, the CPU 36 proceeds to step 980 to set "0" in the flag Fgv. That is, the rear axle 10 is not unlocked immediately when the unlock condition is met, but with a delay of the predetermined sustain time T.

The subsequent processing from step 990 to step 1070 is for the CPU 36 to determine based on the centrifugal acceleration (Gs) whether the rear axle 10 should be set free or locked. In this embodiment, the free/lock determination on the rear axle 10 based on the centrifugal acceleration (Gs) is carried out based on the set values G1, G2, etc. which are set according to the weight w and the height H of the fork as illustrated in the maps in FIGS. 8A and 8B.

In step 990, the CPU 36 determines if the weight w of the fork is equal to or greater than the set value w0. When the weight w is smaller than the set value w0, the CPU 36 determines in step 1000 if the height H is equal to or greater than the set value h0. When the height H is smaller than the set value h0, the CPU 36 determines in step 1020 if Gs≧G2 is met. When the height H is equal to or greater than the set value h0, the CPU 36 determines in step 1030 if Gs≧G1 is met. When Gs≧G2 or Gs≧G1 is met in each step 1020 or 1030, the CPU 36 proceeds to step 1050 to set "1" in the flag Fg.

When Gs≧G2 or Gs≧G1 is not met (i.e., Gs<G2 or Gs<G1) in step 1020 or 1030, the CPU 36 determines in step 1060 if the unlock condition (Gs<G2 or Gs<G1) has been kept satisfied for the predetermined sustain time T. The counter 120 counts the predetermined sustain time T, and the counter 120 is reset every time Gs≧G2 or Gs≧G1 is met and starts counting every time Gs<G2 or Gs<G1 is met.

When the counter 120 has not been counting for the predetermined sustain time T (the unlock condition has not continued for the predetermined sustain time T) in step 1060, the CPU 36 proceeds to step 1080 and does not change the flag Fg. When the unlock condition has been met for the predetermined sustain time T, the CPU 36 proceeds to step 1070 to set "0" in the flag Fg. That is, likewise, the rear axle 10 is not unlocked immediately when the unlock condition is met, but with a delay of the predetermined sustain time T.

When the weight w is equal to or greater than the set value w0 in step 990, the CPU 36 determines in step 1010 if the height H is equal to or greater than the set value h0. When the height H is equal to or greater than the set value h0, the CPU 36 sets "1" in the flag Fg in step 1050. When the height H is smaller than the set value h0, the CPU 36 goes to step 1040 to determine if Gs≧G2 is met. When Gs≧C2 is met, the CPU 36 sets "1" in the flag Fg in step 1050. When Gs≧G2 is unsatisfied (i.e., Gs<G2), the CPU 36 determines in step 1060 if the unlock condition (i.e., Gs<G2) has been kept satisfied for the predetermined sustain time T. When the unlock condition is met, the CPU 36 sets "0" in the flag Pg in step 1070. If the unlock condition is unmet, the CPU 36 moves to the next step 1080.

In step 1080, the CPU 36 outputs the lock command (lock signal) when one of the flags Fgv and Fg is "1". As a result, if either the centrifugal acceleration (Gs) or the rate of change in centrifugal acceleration η gets equal to or higher than the associated set value, the electromagnetic changeover valve 14 is set to the block position to lock the rear axle 10.

Once the rear axle 10 is locked, it is not unlocked unless each determination value falls below a set value which is slightly smaller than the then-set value by α (e.g., 0<α<1). This prevents frequent switching between the locked state and the unlocked state which would otherwise take place as the individual determination values accidentally come close to their set values g0, h0 and w0.

Figure 27A:
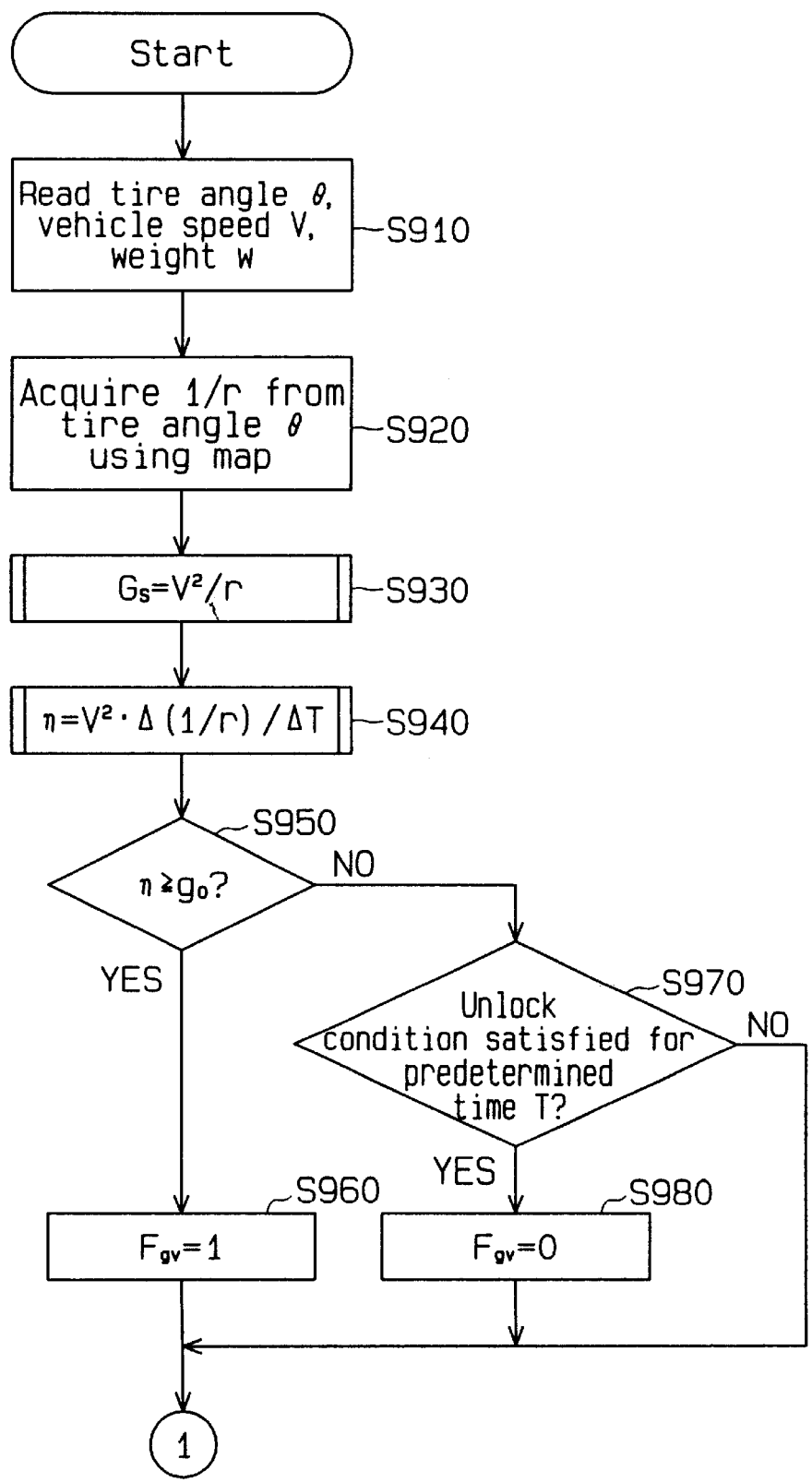
FIG. 27 is a flowchart of a swing process a CPU executes.
FIG. 27B is a flowchart for explaining the continual process of the flowchart in FIG. 27A.
FIG. 27C is a flowchart for explaining the continual process of the flowchart in FIG. 27C.
Figure 27B:
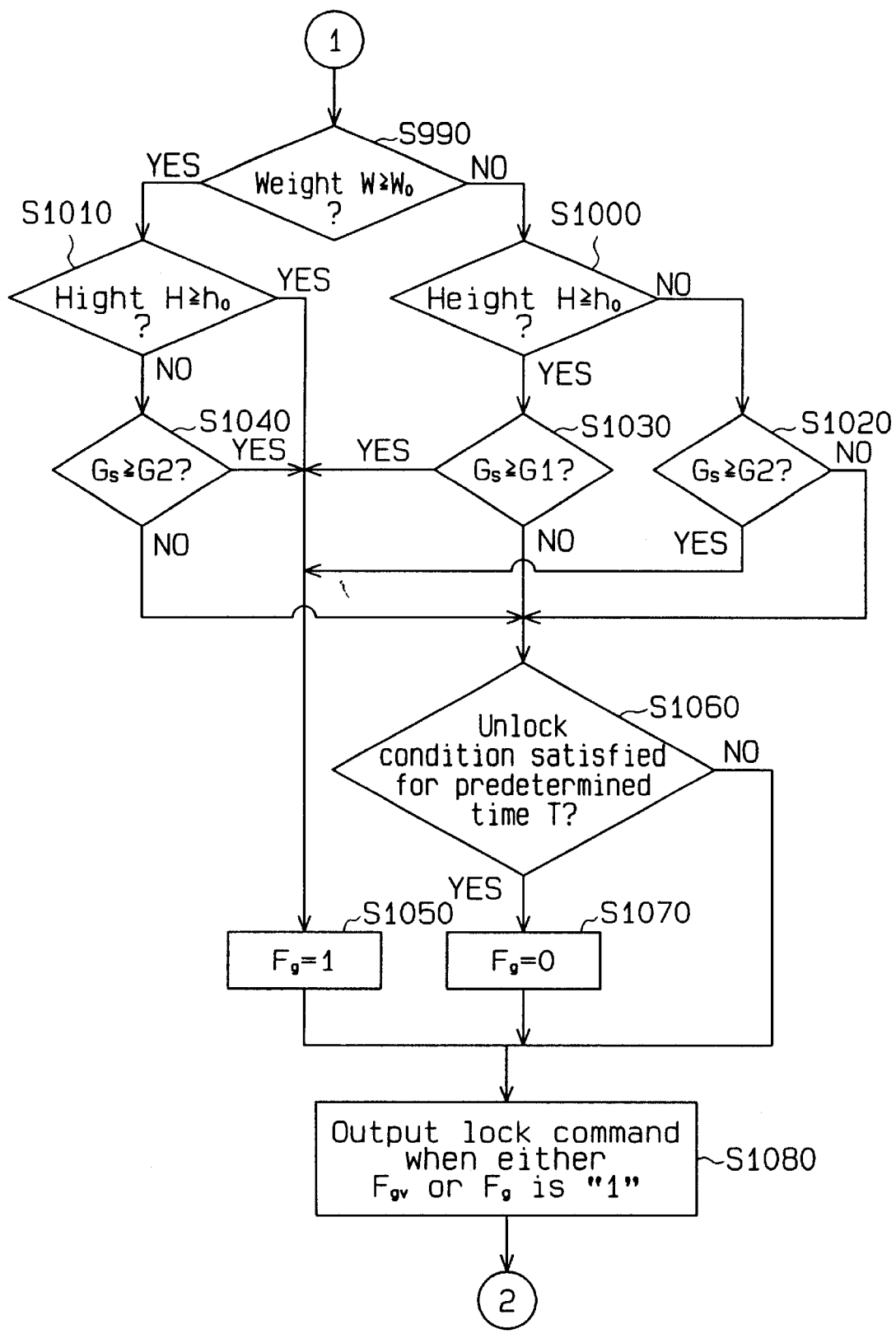
Figure 27C:
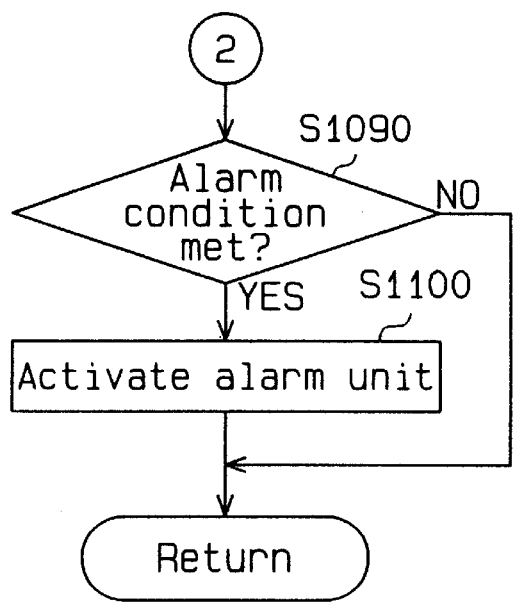

After the process of step 1080, the CPU 36 proceeds to step 1090 shown in FIG. 27C. In this step 1090, the CPU 36 determines if a condition for activating the alarm unit 40 (hereinafter called alarm condition) is met.

The following are the alarm conditions:
(a) when w≧w0 and H≧h0 are both met,
(b) when w≧w0, H≦h0 and Gs≧G3 (>G2) are met,
(c) when w<w0, H≧h0 and Gs≧G4 (>G1) are met, and
(d) when w<w0, H<h0 and Gs≧CS (>G2) are met.

In the case (a), as the weight w is equal to or greater than the set value w0 and the height is equal to or greater than the set value h0, if the forklift continues running this way, the forklift is likely to run unstably even if the rear axle 10 is locked by the axle lock mechanism. Accordingly, the CPU 36 activates the alarm unit 40 to generate an alarm.

Figure 28A:
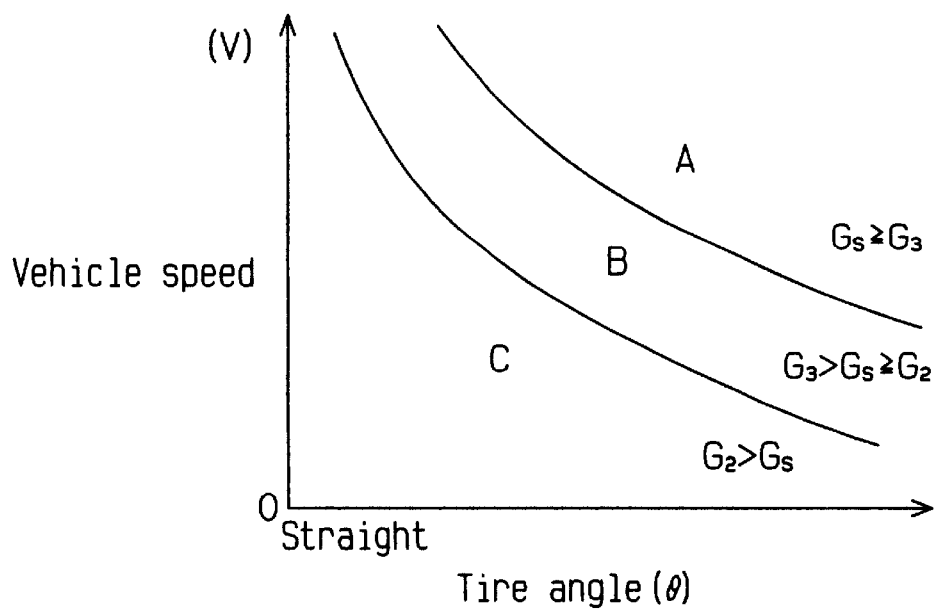
FIGS. 28A through 28C are explanatory diagrams showing alarm conditions of an alarm unit with respect to the centrifugal acceleration.

In the case (b), the weight w is equal to or greater than the set value w0, the height H is smaller than the set value h0 and the centrifugal acceleration (Gs) is equal to or greater than an alarm reference value G3. If the forklift keeps running, the forklift is likely to run unstable even if the rear axle 10 is locked by the axle lock mechanism. Accordingly, the CPU 36 activates the alarm unit 40 to generate an alarm. Gs being equal to or greater than the alarm reference value G3 means that the centrifugal acceleration (Gs) is located in the area A as shown in FIG. 28A. This area A indicates where the forklift is likely to run unstable even if the rear axle 10 is locked by the axle lock mechanism. The vertical scale represents the vehicle speed V and the horizontal scale the tire angle θ. The area B is where running of the forklift becomes stable when the rear axle 10 is locked by the axle lock mechanism. The area C indicates where stable running is ensured without locking the rear axle 10 by means of the axle lock mechanism.

Figure 28B:
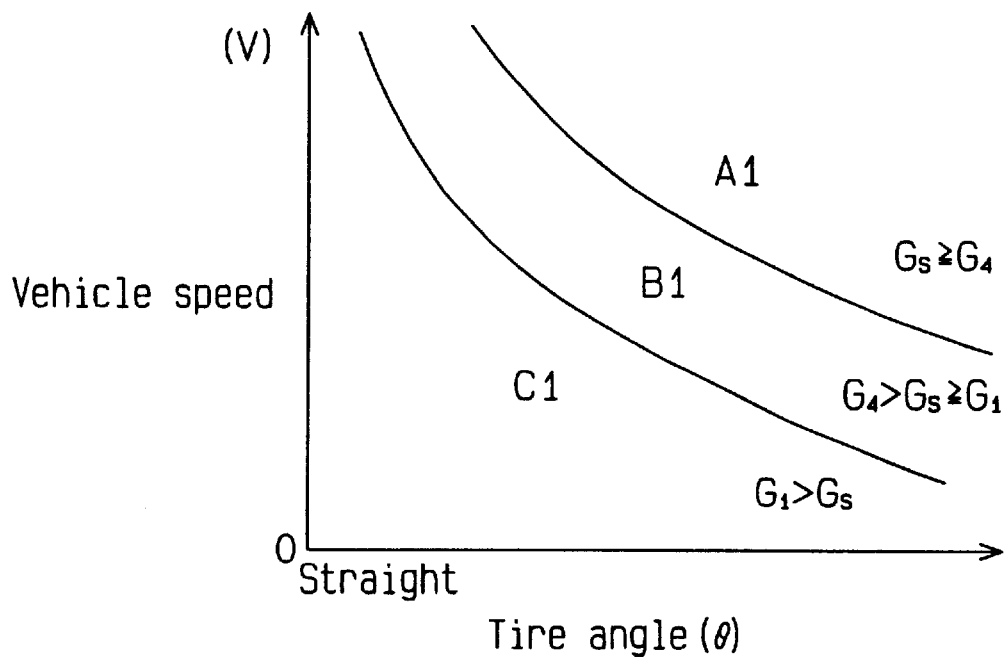

In the case (c), the weight w is smaller than the set value w0, the height H is equal to or greater than the set value h0 and the centrifugal acceleration (Gs) is equal to or greater than an alarm reference value G4. If the forklift keeps running, the forklift is likely to run unstable even if the rear axle 10 is locked by the axle lock mechanism. Accordingly, the CPU 36 activates the alarm unit 40 to generate an alarm. Gs being equal to or greater than the alarm reference value G4 means that the centrifugal acceleration (Gs) lies in the area A1 as shown in FIG. 28B. This area A1 indicates where the forklift is likely to run unstable even if the rear axle 10 is locked by the axle lock mechanism. The area B1 indicates where running of the forklift becomes stable when the rear axle 10 is locked by the axle lock mechanism. The area C1 indicates where stable running is ensured without locking the rear axle 10 by means of the axle lock mechanism.

Figure 28C:
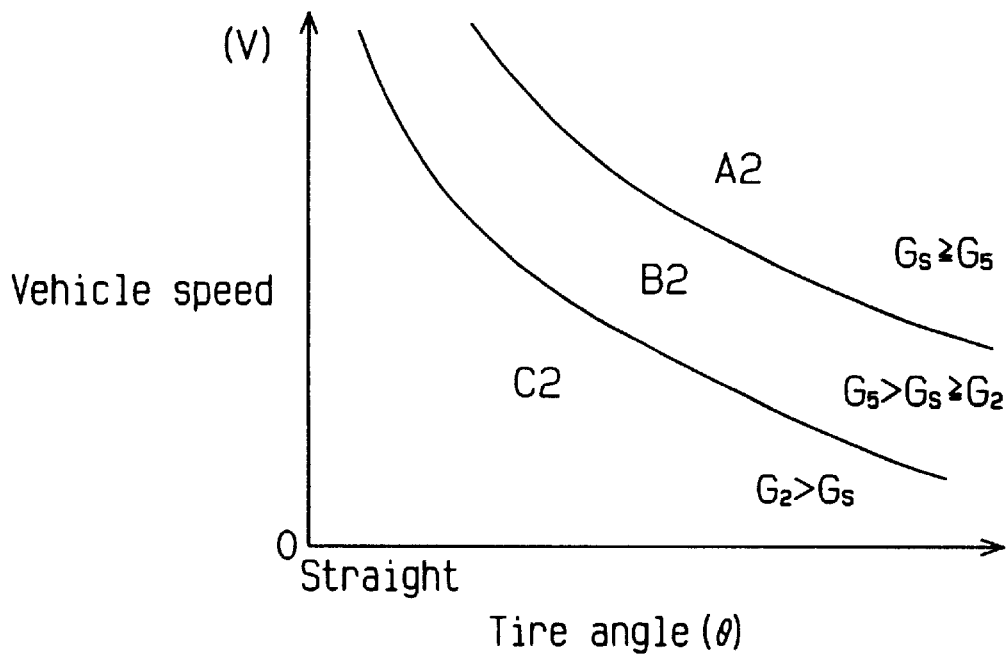

In the case (d), the weight w is smaller than the set value w0, the height H is smaller than the set value h0 and the centrifugal acceleration (Gs) is equal to or greater than an alarm reference value G5. If the forklift keeps running, the forklift is likely to run unstable even if the rear axle 10 is locked by the axle lock mechanism. Accordingly, the CPU 36 activates the alarm unit 40 to generate an alarm. Gs being equal to or greater than the alarm reference value G5 means that the centrifugal acceleration (Gs) lies in the area A2 as shown in FIG. 28C. This area A2 indicates where the forklift is likely to run unstable even if the rear axle 10 is locked by the axle lock mechanism. The area B2 indicates where stable running is ensured when the rear axle 10 is locked by the axle lock mechanism. The area C2 indicates where stable running is ensured without locking the rear axle 10 by means of the axle lock mechanism.

When any of the alarm conditions (a) to (d) is met, the CPU 36 sends a signal to cause the alarm unit 40 to generate an alarm in step 1100 before temporarily terminating this flowchart. When none of the alarm conditions (a) to (d) are met in step 1090, the CPU 36 temporarily terminates this flowchart.

As described above specifically, with the rear axle 10 locked, if the centrifugal acceleration (Gs) satisfies any alarm condition, the alarm unit 40 generates an alarm. When side slipping occurs, in general, there is a time delay from the point of steering the rear wheels, then causing side slipping, then to the point where the direction of the vehicle is changed. According to this embodiment, since the centrifugal acceleration (Gs) is predicted based on the vehicle speed V and the tire angle θ, it is not the then-centrifugal acceleration that is detected, but it is a future or subsequent centrifugal acceleration that is predicted. In step 1100 in the aforementioned flowchart, therefore, an alarm is generated before the centrifugal acceleration that will slip the forklift is actually produced. It is thus possible to alarm the driver before the event takes place, so that the driver can drive the vehicle carefully thereafter.

Eighth Embodiment

Figure 29:
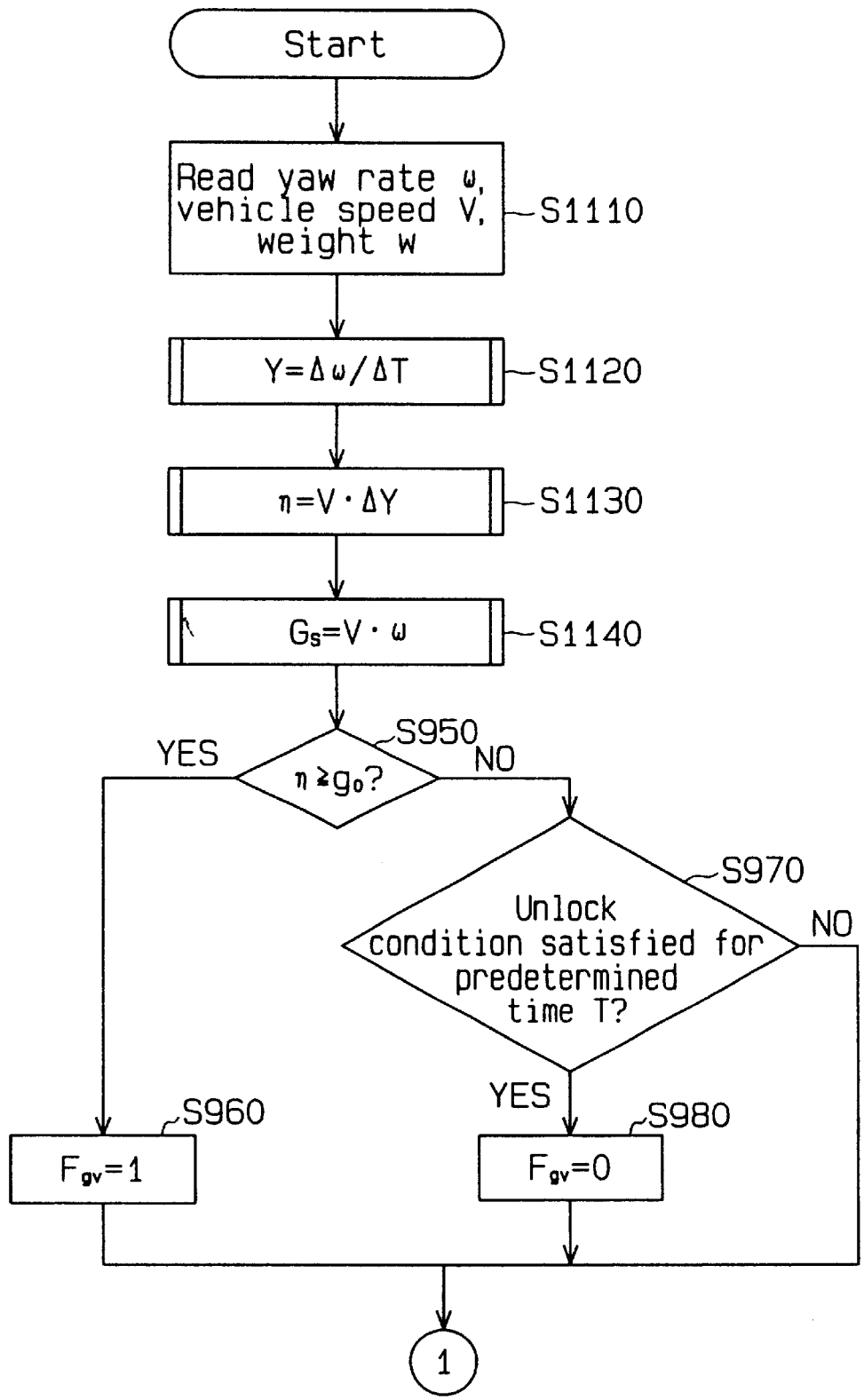
FIG. 29 is a flowchart illustrating a part of a swing process a CPU executes according to an eighth embodiment of this invention.

The eighth embodiment of this invention will now be described with reference to FIG. 29. In this embodiment, a gyroscope is attached as means for detecting the yaw rate. The gyroscope 41 detects the yaw rate (angular velocity) ω (rad/sec) when the forklift 1 turns, and sends the CPU 36 a detection value ω according to the yaw rate.

This embodiment is so designed as to use the gyroscope 41 as a sensor to replace the tire angle sensor 21, and the other structure is the same as that of the previous embodiment. Note that program data illustrated by the flowchart in FIG. 29 is stored in the ROM 37. The centrifugal acceleration is computed from the equation Ga=V·ω, the rate of change in yaw rate Y from the equation Y=Δω/ΔT, and the rate of change in centrifugal acceleration η from the equation ΔG/ΔT=V·Δω/ΔT (=V·Y), respectively.

The CPU 36 executes control as follows. First, the CPU 36 reads the individual detection values, such as the yaw rate ω, the vehicle speed V and the weight w, in step 1110. In step 1120, the CPU 36 computes the rate of change in yaw rate Y. The CPU 36, which stores plural pieces of old yaw rate data older by the predetermined time ΔT in a predetermined memory area of the RAM 38, reads the yaw rate data ω1 older by the predetermined time ΔT, and computes the rate of change in yaw rate Y=Δω/ΔT (Δω/ΔT=|ω−ω1|) using the old detection value ω1 and the current detection value ω.

In step 1130, the CPU 36 calculates the rate of change in centrifugal acceleration η=V·Y (=V·Δω/ΔT). Then, the CPU 36 computes the centrifugal acceleration Gs=V·ω in step 1140. The CPU moves to step 950 (see the sixth embodiment) from step 1140.

As the processing following the next step 950 is the same as that of the sixth embodiment, its description will not be given below.

As this embodiment employs a scheme of differentiating the detection value ω of the gyroscope 41, which is unsusceptible to the influence of the vibration or the like of the base, in computing η and Y, even the differentiation (taking a derivative of) the detection value ω, which is very unlikely to produce noise, does not produce a significant error originating from the amplification of noise. It is thus possible to acquire highly reliable estimated values ω and Y.

Ninth Embodiment

Figure 30A:
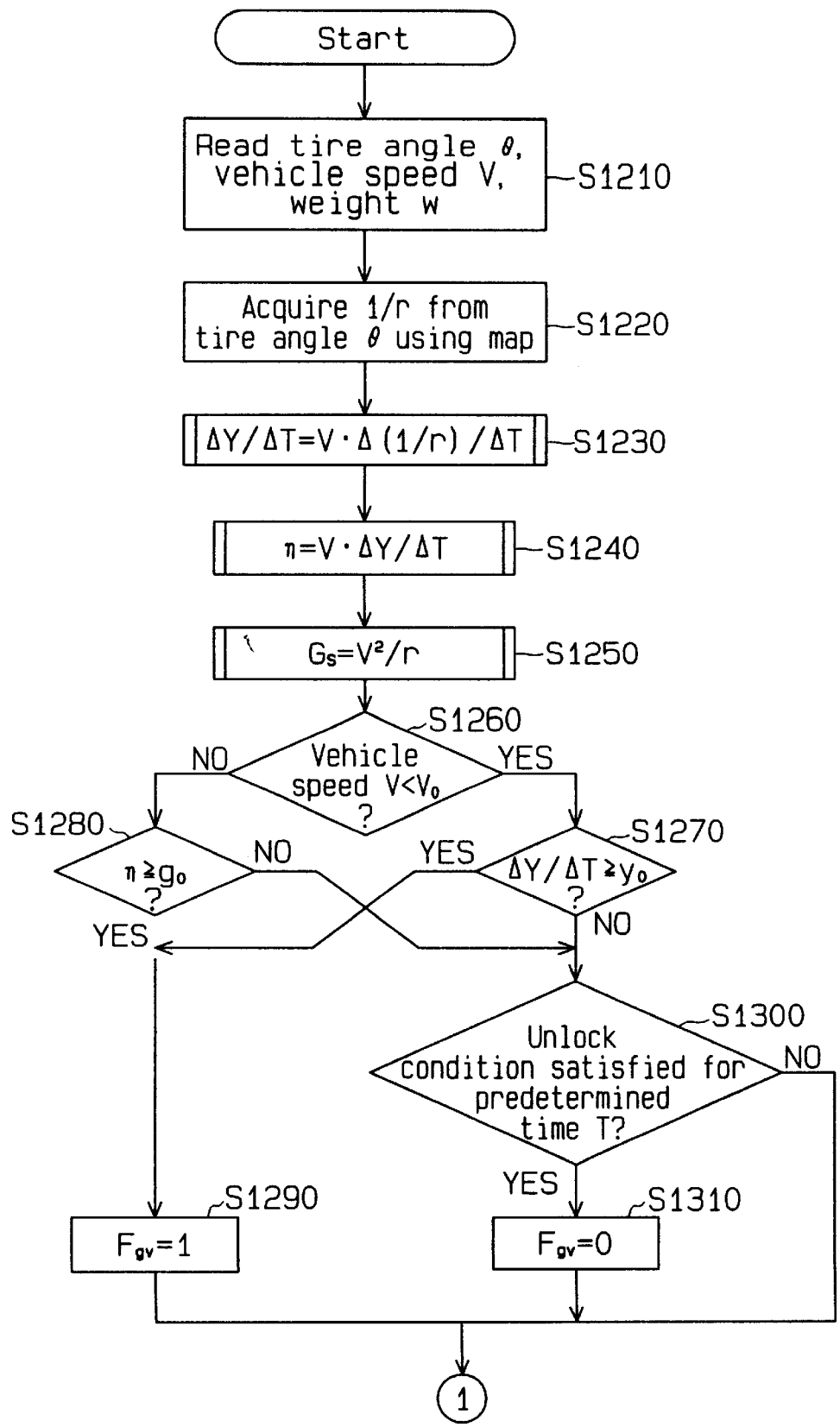
FIGS. 30A and 30B are flowcharts of a swing process a CPU executes according to a ninth embodiment of this invention.
Figure 30B:
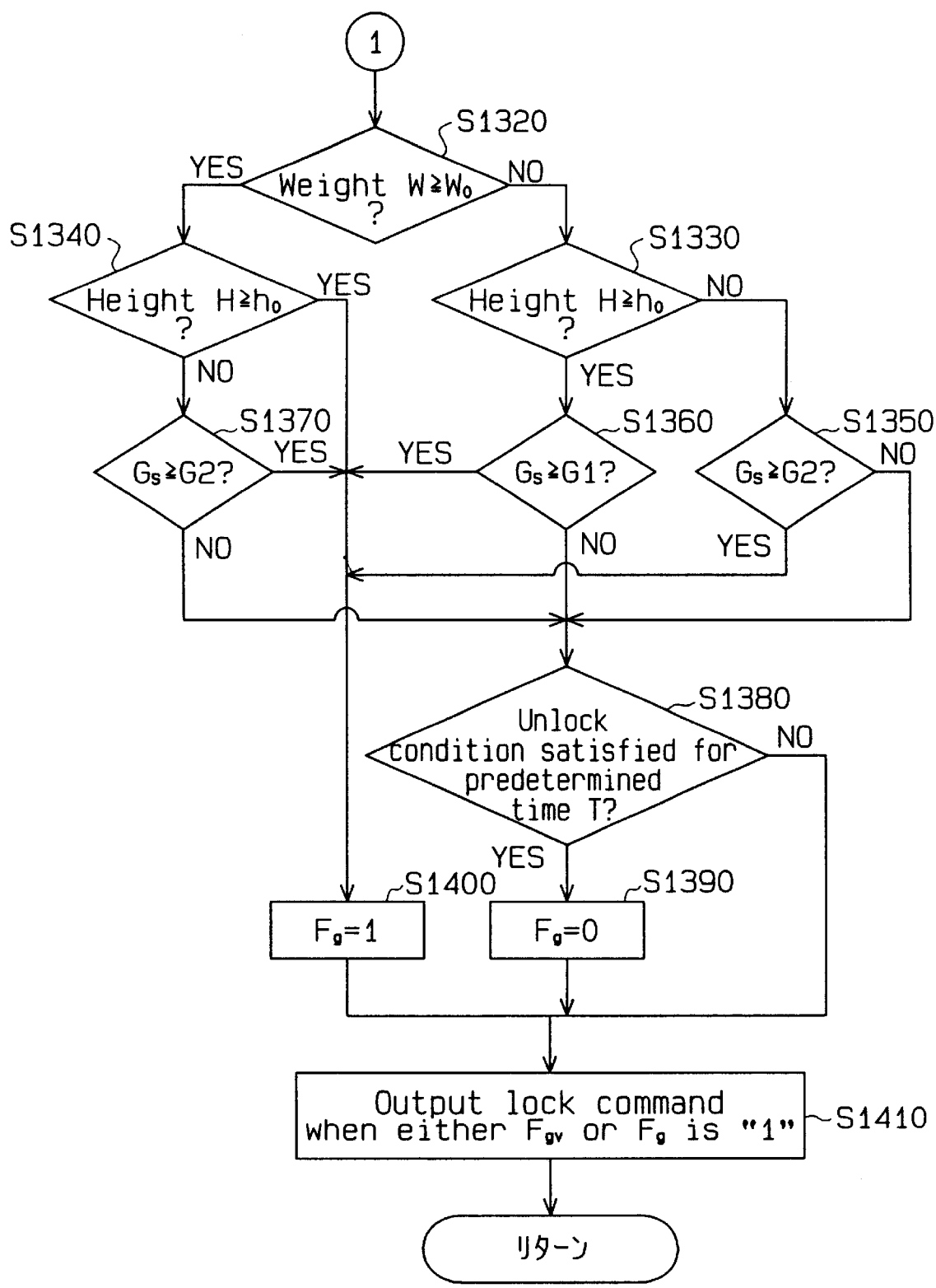
Figure 31:
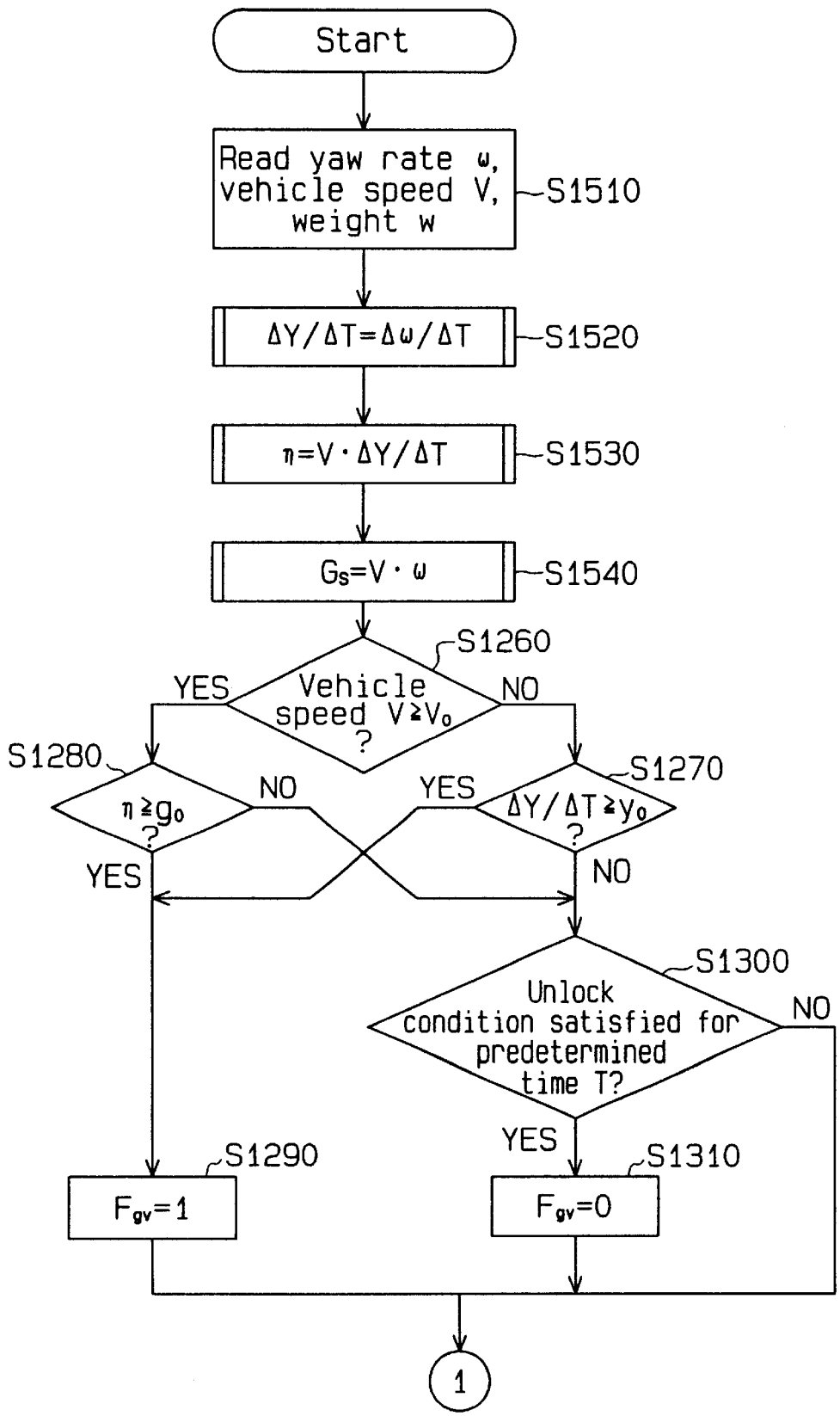
FIG. 31 is a flowchart of a swing process the CPU executes according to a modification of the ninth embodiment of this invention.

The ninth embodiment of this invention will now be discussed with reference to FIGS. 30 and 31.

The electric constitution of this embodiment takes the form of the circuitry in FIG. 26 which has already been discussed hereinabove in the section of the seventh embodiment. The control by the CPU 36 in this embodiment is characterized in the separate use of the rate of change in centrifugal acceleration η (ΔG/ΔT) and the rate of change in yaw rate ΔY/ΔT in accordance with the vehicle speed.

As the set value V0 for determining if the vehicle speed V is fast or slow, a predetermined value lying in the range from 5 km/h to 10 km/h is set. The maximum speed of the forklift 1 is about 20 km/h. The rate of change in yaw rate ΔY/ΔT (=Δω/ΔT where ω is the yaw rate) is expressed by the equation ΔY/ΔT=V·Δ(1/r)/ΔT. In this embodiment, the rate of change in yaw rate ΔY/ΔT is computed from the equation ΔY/ΔT=V·|1/r−1/r1| by using the reciprocals of the turning radius 1/r and 1/r1 before and after the predetermined time ΔT has passed, and the vehicle speed V.

The control by the CPU 36 will now be discussed referring to the flowcharts shown in FIGS. 30A and 30B. First, the CPU 36 reads the detection values θ, V, w, etc. from the individual sensors 21–24, and computes the reciprocal of the turning radius 1/r from the map based on the tire angle θ in step 1220. In step 1230, the CPU 36 computes the rate of change in yaw rate ΔY/ΔT. Specifically, the CPU 36 reads the tire angle data θ1 older by the predetermined time ΔT from a predetermined memory area in the RAM 38, and computes ΔY/ΔT from the ΔY/ΔT=V−|1/r−1/r1| using the reciprocal of the turning radius 1/r1 obtained from the map using the value θ1, and the reciprocal 1/r based on the current detection value θ.

In the next step 1240, the CPU 36 computes the rate of change in centrifugal acceleration η=V·ΔY/ΔT. Then, the CPU 36 computes the centrifugal acceleration from Gs=V²/r in step 1250.

In step 1260, the CPU 36 determines if the vehicle speed V is smaller than the set value V0. When the vehicle speed V is smaller than the set value V0, the CPU 36 determines in step 1270 if the rate of change in yaw rate ΔY/ΔT is equal to or greater than the set value y0. When the vehicle speed V lies in the fast zone equal to or greater than the set value V0, the CPU 36 determines in step 1280 if the rate of change in centrifugal acceleration η is equal to or greater than the set value g0.

When the lock condition (ΔY/ΔT>y0, η≧g0) is satisfied in step 1270 or 1280, the PU 36 sets "1" to the flag Fgv in step 1290. When the unlock condition (ΔY/ΔT<y0, η<g0) is met in step 1270 or 1280, the CPU 36 moves to step 1300 to determine if the time measured by the counter 110 is equal to or greater than the Predetermined time T. When the measured time is equal to or greater than the predetermined time T, the CPU 36 sets "0" in the flag Fgv in step 1310. When the time measured by the counter 110 is smaller than the predetermined time T, the CPU 36 proceeds to the next step 1320 without changing the flag Fgv. As the processing following step 1320 is the same as that in FIG. 27B, its description will not be repeated.

In fast running mode where the vehicle speed V is equal to or greater than the set value V0, therefore, the rear axle 10 is locked when the rate of change in centrifugal acceleration η becomes equal to or above the set value g0. In slow running mode where the vehicle speed V is less than the set value V0, therefore, the rear axle 10 is locked when the rate of change in yaw rate ΔY/ΔT becomes equal to or above the set value y0. That is, the rear axle 10 is promptly locked at the time turning starts, when η or ΔY/ΔT becomes equal to or greater than the associated set value. As η or ΔY/ΔT becomes equal to or greater than the associated set value, the rear axle 10 is kept locked when the steering wheel is manipulated in the reverse direction.

By using the rate of change in centrifugal acceleration η having V² as a factor in the fast zone where the vehicle speed V is equal to or greater than the set value V0, the set value g0 can be set high enough to be able to suppress unnecessary locking as much as possible. By using the rate of change in yaw rate ΔY/ΔT having V as a factor in the slow zone where the vehicle speed V is lower than the set value V0, the set value g0 can be set high even in the slow zone. This can suppress unnecessary locking as much as possible. That is, this embodiment can further repress unnecessary locking of the rear axle 10 in the slow zone. It is also possible to avoid an undesirable event of not locking the rear axle 10 when needed.

As this embodiment employs a scheme of differentiating the detection value θ of the tire angle sensor 21, which is unlikely to be affected by the vibration or the like of the base, in computing η and ΔY/ΔT, a highly reliable estimated value ΔY/ΔT can also be acquired for the rate of change in yaw rate ΔY/ΔT.

A modification of the ninth embodiment of this invention will now be described with reference to FIG. 31. This embodiment uses a gyroscope 51 (shown in FIG. 16) as a sensor for detecting a detection value which is used in predicting the centrifugal acceleration (Gs) and the rate of change in centrifugal acceleration η. As the gyroscope 51 has already been discussed specifically, its description will be omitted and control by the CPU 36 alone will be discussed in detail with reference to FIG. 31.

In step 1510, the CPU 36 reads the individual detection values, such as the yaw rate ω, the vehicle speed V and the weight w. In step 1520, the CPU 36 computes the rate of change in yaw rate ΔY/ΔT. The CPU 36, which stores plural pieces of old yaw rate data older by the predetermined time ΔT in a predetermined memory area of the RAM 38, reads the yaw rate data ω1 older by the predetermined time ΔT, and computes the rate of change in yaw rate ΔY/ΔT=Δω/ΔT (Δω/ΔT=|ω−ω1|) using the old detection value ω1 and the current detection value ω. In the next step 1530, the CPU 36 calculates the rate of change in centrifugal acceleration η=V·ΔY/ΔT (=V·Δω/ΔT). Then, the CPU 36 computes the centrifugal acceleration Gs=V·ω in step 1540.

As the processing following the subsequent step is the same as that of the seventh embodiment, it is determined whether or not to lock the rear axle 10 based on the rate of change in centrifugal acceleration η when the vehicle speed is equal to or greater than the set value V0, and it is determined whether or not to lock the rear axle 10 based on the rate of change in yaw rate ΔY/ΔT when the vehicle speed is lower than the set value V0.

Because the tire angle θ is used to compute the rate of change in centrifugal acceleration in the ninth embodiment, the reliability of the computed value of the rate of change in centrifugal acceleration becomes poor when the rear wheels 11 slip sideways. According to this modification, however, the use of the yaw rate ω of the vehicle in calculating the rate of change in centrifugal acceleration can allow the rate of change in centrifugal acceleration η to be computed accurately even when the rear wheels 11 slip sideways.

Further, for example, as the moving direction of the forklift 1 is changed by greatly altering the tire angle θ of the rear wheels 11 with the vehicle speed set sufficiently lower, the vehicle's body turns substantially around the front wheels 7. According to the second embodiment, as the rate of change in yaw rate ΔY/ΔT has a factor in the vehicle speed V (ΔY/ΔT=V·Δ(¼)/ΔT), at the time of changing the moving direction which is carried out with the vehicle speed set sufficiently slower, ΔY/ΔT<y0 so that the rear axle 10 may not be locked in some case.

According to this modification, however, the rate of change in yaw rate ΔY/ΔT (=Δω/ΔT) not having V as a factor in the slow zone is used. Even the vehicle speed is slow at the time the forklift 1 is turned, only a change in the vehicle's direction with respect to time (Δω/ΔT) is monitored, so that at the time of changing the direction of the forklift 1 where the vehicle's direction significantly varies, ΔY/ΔT becomes equal to or greater than the set value y0, firmly locking the rear axle 10. As a result, the direction is changed with the rear axle 10 locked. Even if the tires hit projections on the road at the time of changing the direction, for example, swinging of the rear axle 10 is restricted, thereby repressing the lateral tilting of the vehicle.

Tenth Embodiment

Figure 32:
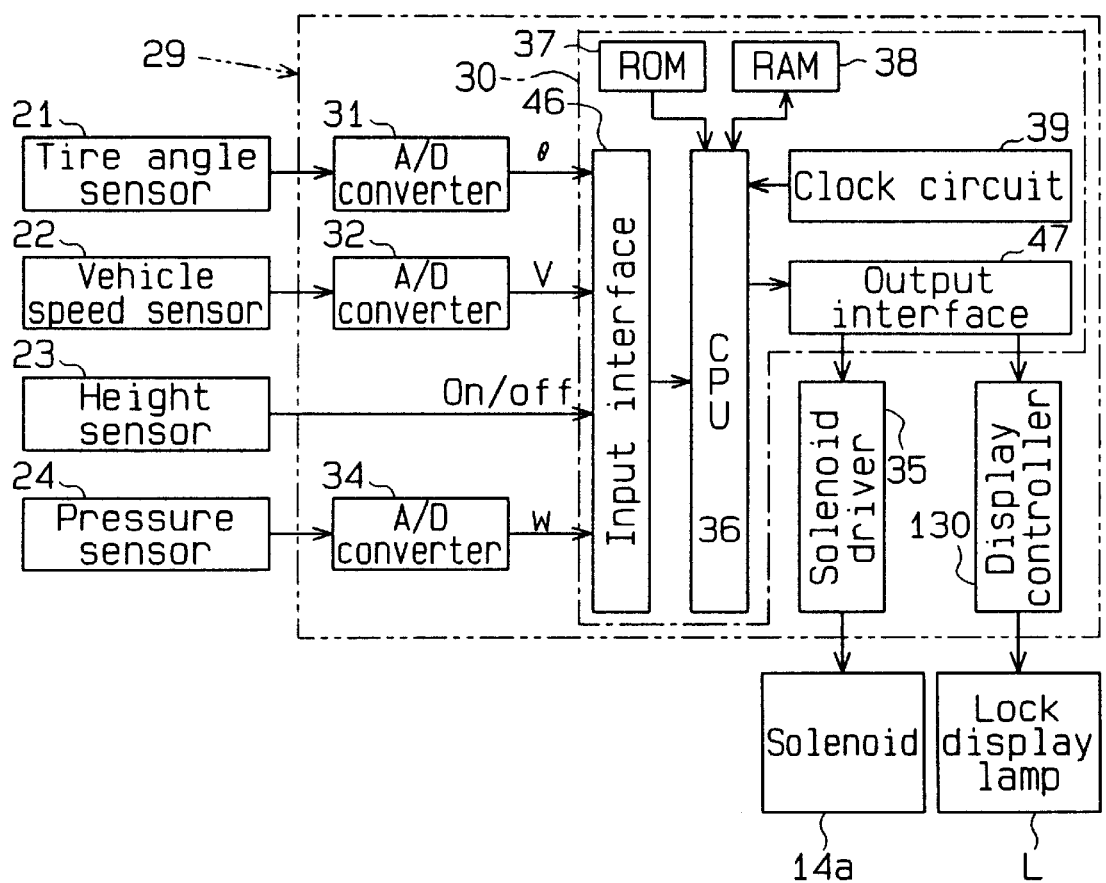
FIG. 32 is a block diagram depicting the electric constitution of a tenth embodiment of this invention.
Figure 35:
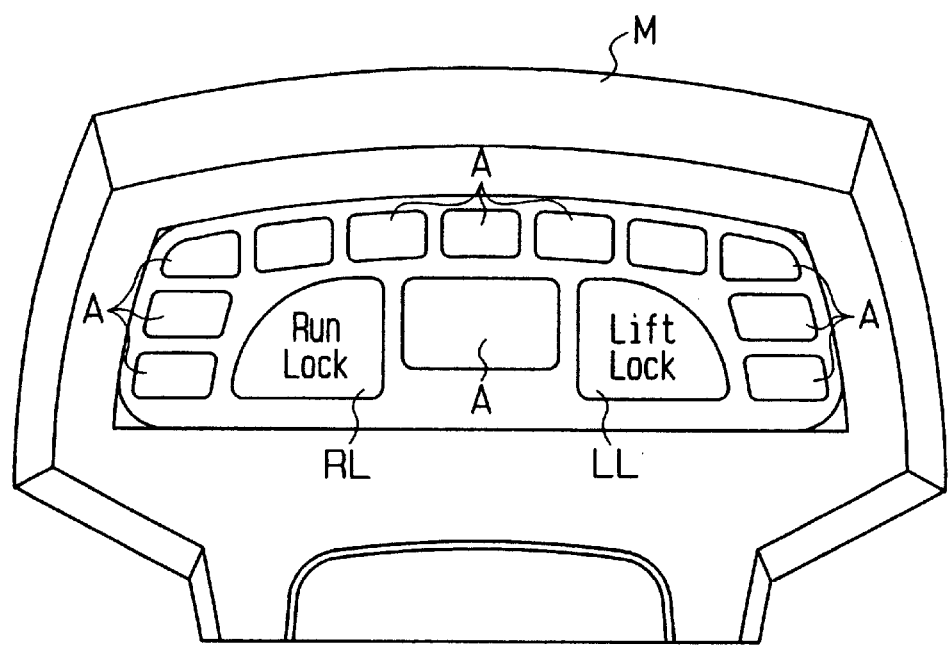
FIG. 35 is a plan view of another meter box according to the tenth embodiment.

The tenth embodiment of this invention will now be discussed with reference to FIGS. 32 and 35.

Figure 34:
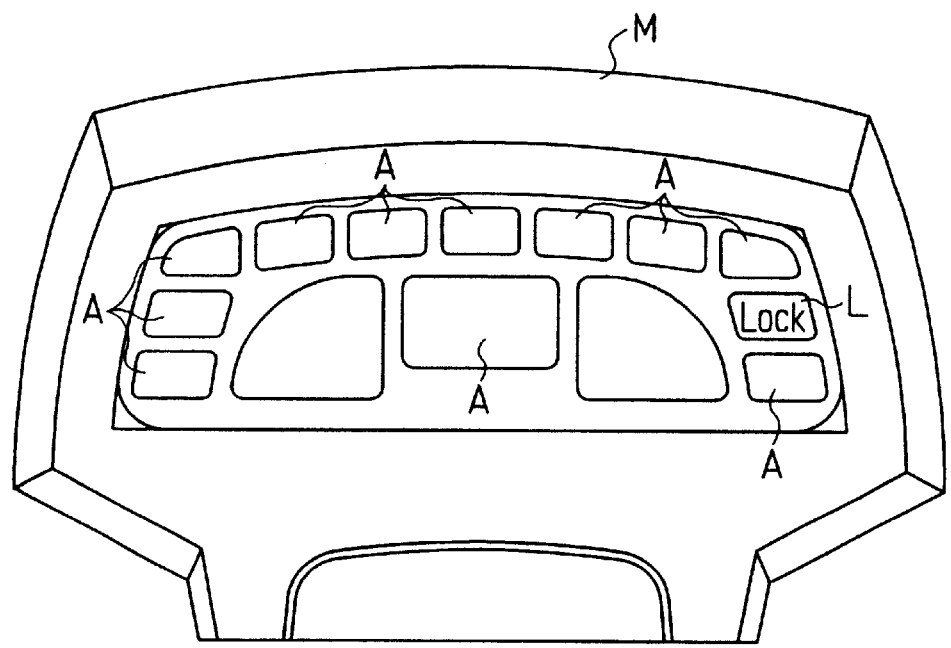
FIG. 34 is a plan view of a meter box.

This embodiment comprises display means for informing the driver of the locking of the rear axle 10. Located at the position adjacent to the steering wheel 12 of the forklift 1 is a meter box M which is equipped with various alarm lamps A for the fuel remainder or the like and a lock display lamp L, as shown in FIG. 34. As shown in FIG. 32, the lock display lamp L is connected via a display drive controller 130 to a controller 30.

Figure 33:
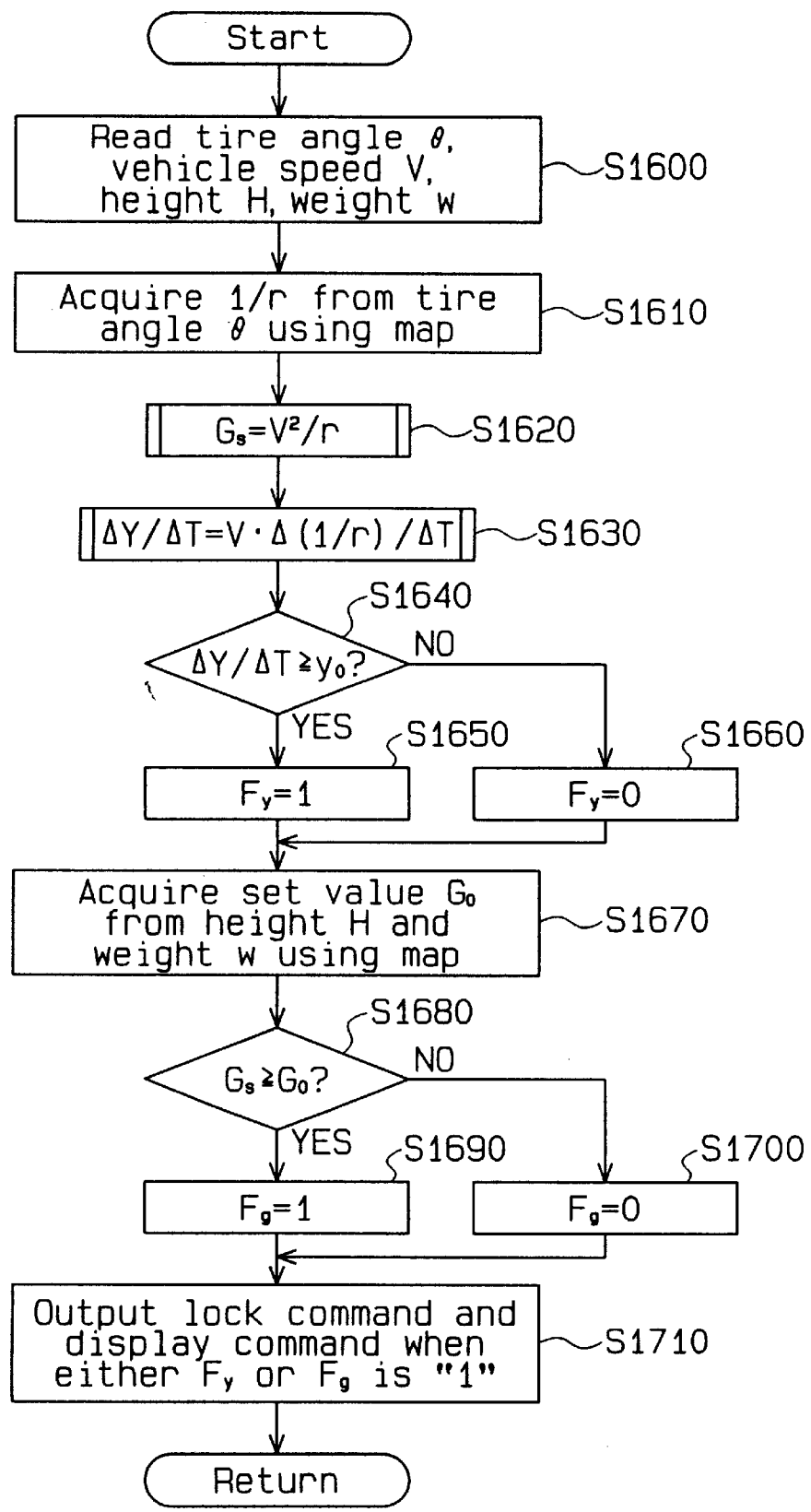
FIG. 33 is a flowchart of a swing process to be executed by a CPU.

In this embodiment, the CPU 36 executes the process according to the flowchart shown in FIG. 33. While the ignition key is on, the detection signals θ, V, H, and w from the individual sensors 21–24 are input to the CPU 36. The CPU 36 reads the detection values of the tire angle θ, the vehicle speed V, the height H and the weight w in step 1600. In step 1610, the CPU 36 acquires the reciprocal of the turning radius 1/r from the tire angle θ using the map stored in the ROM 37.

In step 1620, the CPU 36 computes the estimated value Gs of the centrifugal acceleration using the vehicle speed V and the reciprocal of the turning radius 1/r. The CPU 36 then computes the rate of change in yaw rate ΔY/ΔT in step 1630. Specifically, the CPU 36 reads the tire angle data θ1 older by the predetermined time ΔT from a predetermined memory area in the RAM 38, then calculates ΔY/ΔT=V·Δ(1/r)/ΔT (where Δ(1/r)=1|/r−1/r1|) by using the reciprocal of the turning radius 1/r1 that is determined from this data θ1.

In step 1640, the CPU 36 determines if ΔY/ΔT is equal to or greater than the set value y0. When ΔY/ΔT is equal to or greater than the set value y0, the CPU 36 sets "1" in the flag Fy in step 1650. When ΔY/ΔT is smaller than the set value y0, the CPU 36 sets "0" in the flag Fy in step 1660.

In the subsequent step 1670, the CPU 36 computes the set value G0 of the centrifugal acceleration from the detection values H and w using the map. Subsequently, the CPU 36 determines in step 1680 if Gs≧G0 is met. When the lock condition of Cs>G0 is met, the CPU 36 sets "1" in the flag Fg in step 1690. When Gs>G0 is not met, the CPU 36 proceeds to step 1700 to set "0" in the flag Fg.

This set value G0 is set according to the maps shown in FIGS. 8A and 8B. With the weight w being less than the set value w0 or relatively light, the larger set value G2 is used as G0 when the height H is less than the set value h0 or relatively low, while the smaller set value G1 (<G2) is used as G0 when the height H is equal to or greater than the set value h0 or relatively high, as shown in FIG. 8A.

With the weight w being equal to or greater than the set value w0 or relatively heavy, the larger set value G2 is used as G0 when the height H is less than the set value h0 or relatively low, while the set value 0 is used as G0 when the height H is equal to or greater than the set value h0 or relatively high, as shown in FIG. 8B.

When either one of the flags Fy and Fg is "1" in the next step 1710, the CPU 36 outputs the lock command (lock signal) and a display command (a first display signal). Accordingly, if either the centrifugal acceleration Gs or the rate of change in yaw rate ΔY/ΔT becomes equal to or greater than the associated set value G0 or y0, the changeover valve 14 is switched to the block position to lock the rear axle 10 and the lock display lamp L is lit at the same time.

In this embodiment, when the CPU 36 sends the lock signal to the solenoid 14a via an output interface 47 and the solenoid driver 30, the CPU 36 simultaneously sends the first display signal to the lock display lamp L via the output interface 47 and a display controller 130. In other words, when the rear axle 10 is to be locked, the lock display lamp L should always be lit. The driver can therefore surely confirm that the rear axle 10 is locked, by watching the lock display lamp L on the meter box 19.

What is claimed is:

1. An apparatus equipped with a lock mechanism for locking an axle, supported swingable up and down on a body of a runnable and loading industrial vehicle, for a purpose of ensuring stable running of said vehicle, comprising:

a plurality of sensors for detecting at least one of a running state and a load state of said vehicle, and outputting detection values indicative thereof;

control means for receiving said detection values from said plurality of sensors, calculating a determination value based on said detection values from at least two of said plurality of sensors and activating said lock mechanism when said determination value is equal to or greater than a set value;

diagnosis means for diagnosing a failure of at least one sensor; and setting means, included as part of said control means, for replacing the detection value from the sensor that has been diagnosed as failing by said diagnosis means with a predetermined detection value within a normal detection range of that sensor, whereby said control means does not activate said lock mechanism if the determination value that the control means calculates based on at least said predetermined detection value is less than said set value.

2. The apparatus according to claim 1, wherein said predetermined detection value is within a normal detection range of that failed sensor so as to make said determination value most likely to equal or exceed said set value.

3. The apparatus according to claim 2, wherein said control means does not activate said lock mechanism if the detection value of the other sensor for calculating said determination value takes such a value that the calculated determination value is less than said set value.

4. The apparatus according to claim 2, wherein said plurality of sensors include a plurality of first sensors for providing detection values necessary for calculating at least one of a centrifugal acceleration of said vehicle and a rate of change in yaw rate of said vehicle as determination values;

said control means activates said lock mechanism when said centrifugal acceleration or said rate of change in yaw rate, calculated from said detection values of said plurality of first sensors, becomes equal to or greater than said set value; and said setting means sets said predetermined detection value as the detection value of a sensor among said plurality of first sensor that has been diagnosed as failing by said diagnosis means, in such a manner as to maximize said centrifugal acceleration or said rate of change in yaw rate within a normal detection range of said failing sensor.

5. The apparatus according to claim 4, wherein said first sensors include:

a sensor for detecting a tire angle of said industrial vehicle; and a sensor for detecting a vehicle speed.

6. The apparatus according to claim 4, wherein said first sensors include:

a sensor for detecting a yaw rate of said vehicle; and a sensor for detecting a vehicle speed.

7. The apparatus according to claim 4, further comprising a plurality of second sensors needed to detect a height of gravitational center of said vehicle; and wherein said control means activates said lock mechanism when said centrifugal acceleration becomes equal to or greater than a set value which is determined in accordance with said height of gravitational center of said vehicle; and said setting means sets, as the detection value of a sensor among said plurality of second sensors that has been diagnosed as failing by said diagnosis means, such a value as to maximize said height of gravitational center of said vehicle within a normal detection range of said failing sensor.

8. The apparatus according to claim 7, wherein said second sensors include:

a height sensor for detecting a height of a loading unit provided on said vehicle for a loading purpose; and a weight sensor for detecting a weight of a load on said loading unit.

9. The apparatus according to claim 8, wherein said diagnosis means diagnoses any sensor to be diagnosed as failing when the set value of that sensor keeps satisfying a preset failure condition for a predetermined time or longer.

10. An apparatus equipped with a lock mechanism for locking an axle, pivotably supported by a body of an industrial vehicle, for a purpose of ensuring stable running of the vehicle, wherein the vehicle has a steering wheel and a steered wheel that is steered with the steering wheel for turning the vehicle, the apparatus comprising:

a wheel angle sensor for detecting the wheel angle of the steered wheel;

a steering angle sensor for detecting the steering angle of the steering wheel;

a speed sensor for detecting the running speed of the industrial vehicle;

a first processor for computing a determination value representing a running state of the vehicle based on the detected wheel angle and the detected running speed when the wheel angle sensor is normal;

a second processor for computing the determination value based on the detected steering angle and the detected running speed when the wheel angle sensor fails; and a controller for controlling the lock mechanism, wherein the controller activates the lock mechanism to lock the axle when the determination value is equal to or greater than a predetermined value.

11. The apparatus according to claim 10, wherein the determination value is at least one of a centrifugal acceleration acting on the vehicle and the rate of change in the centrifugal acceleration.

12. The apparatus according to claim 10, wherein the determination value is at least one of a centrifugal acceleration acting on the vehicle and the rate of change in a yaw rate.

13. The apparatus according to claim 10, further comprising means for comparing the detected steering angle with the detected wheel angle wherein the comparing means determines the wheel angle sensor as failing when the detected wheel angle does not change even though the detected steering angle is changing.

14. The apparatus according to claim 10, further comprising means for determining a disconnection originated failure or a short-circuiting originated failure when the detected wheel angle is out of a predetermined normal range.

15. An apparatus equipped with a lock mechanism for locking an axle, supported swingable up and down on a body of a runnable and loading industrial vehicle, for a purpose of ensuring stable running of said vehicle, comprising:

detection means for detecting a running state of said vehicle;

prediction means for predicting a centrifugal acceleration to be applied to said vehicle based on a result of detection by said detection means;

determination means for determining if said centrifugal acceleration predicted by said prediction means becomes equal to or greater than a reference value set at a first value, when said lock mechanism is not locking said axle; and control means for outputting a centrifugal acceleration countermeasure signal to prevent frequent switching between the locked state and the unlocked state of said axles whereby, when said lock mechanism is locking said axle, said centrifugal acceleration countermeasure signal reduces said reference value to a second value which is less than said first value, and said axle is unlocked when said centrifugal acceleration becomes less than said second value.

16. The apparatus according to claim 15, wherein said detection means includes:

first detection means for detecting a vehicle speed of said vehicle; and second detection means for detecting a tire angle of said vehicle.

17. The apparatus according to claim 16, wherein said prediction means predicts the centrifugal acceleration based on the vehicle speed and the wheel angle.

18. The apparatus according to claim 15, wherein said detection means includes a yaw rate sensor for detecting a yaw rate to be applied to said vehicle, and said prediction means predicts a centrifugal acceleration currently applied to said vehicle based on said yaw rate detected by said yaw rate sensor.

19. An apparatus equipped with a lock mechanism for locking an axle, pivotably supported by a body of an industrial vehicle, for ensuring stability of the vehicle, comprising:

a plurality of sensors for detecting a vehicle state including at least one of a running state and a load state of the vehicle, wherein the sensors generate detection values representing the vehicle state;

a controller for controlling the lock mechanism, wherein the controller determines the vehicle state based on the detection values of the sensors, and wherein the controller activates the lock mechanism to lock the axle when the vehicle state satisfies a predetermined lock condition;

test means for testing a failure of at least one sensor; and substituting means for substituting an assumed value for the detection value of the sensor that has been detected as failing, wherein, when the sensor failure is detected, the controller determines an assumed vehicle state based on the assumed value corresponding to the failed sensor and the detection value of the normally functioning sensor, and the controller controls the lock mechanism in accordance with the assumed vehicle state, wherein the substituting means determines the assumed value with a conservative bias towards causing the assumed vehicle state to satisfy the lock condition.

20. The apparatus according to claim 19, wherein each sensor generates the detection value between a predetermined minimum value and a predetermined maximum value when normally functioning, wherein the assumed value corresponds to the maximum value of the detection value of the sensor that has been detected as failing.

21. The apparatus according to claim 19, wherein the sensors include a plurality of first sensors for generating detection values representing the running state of the vehicle and a plurality of second sensors for generating detection values representing the height of the center of gravity of the vehicle, wherein the controller computes a determination value based on the detection values of the first sensors and computes a set value based on the detection values of the second sensors, and wherein the controller determines that the vehicle state satisfies the lock condition when the determination value is equal to or greater than the set value.

22. The apparatus according to claim 21, wherein each sensor generates the detection value between a predetermined minimum value and a predetermined maximum value when normally functioning, wherein the assumed value corresponds to the maximum value of the detection value of the sensor that has been detected as failing.

23. The apparatus according to claim 21, wherein the assumed value corresponding to the failed first sensor causes the determination value to increase, wherein the assumed value corresponding to the failed second sensor causes the set value to decrease.

24. The apparatus according to claim 21, wherein the determination value is at least one of a centrifugal acceleration acting on the vehicle and the rate of change of a yaw rate.

25. The apparatus according to claim 19, further comprising a display for displaying the axle being locked.

26. The apparatus according to claim 25, wherein the display includes a lamp installed in a meter box of the vehicle.

27. An apparatus equipped with a lock mechanism for locking an axle, which is pivotably supported by a body of an industrial vehicle, for ensuring stability of the vehicle, comprising:

detection means for detecting a vehicle state including at least one of a running state and a load state of the vehicle;

a controller for controlling the lock mechanism, wherein the controller activates the lock mechanism to lock the axle when the vehicle state satisfies a predetermined lock condition; and prediction means for predicting the centrifugal acceleration to be applied to the vehicle based on a result of detection by the detection means, wherein, when the predicted centrifugal acceleration is greater than a predetermined reference value while the lock mechanism is locking the axle, the controller generates a warning signal to warn that the running state of the vehicle is unstable.

28. The apparatus according to claim 27, wherein the vehicle has a steered wheel that is steered for turning the vehicle, wherein the detection means includes:

a speed sensor for detecting the speed of the vehicle; and a wheel angle sensor for detecting the wheel angle of the steered wheel.

29. The apparatus according to claim 28, wherein the prediction means predicts the centrifugal acceleration based on the vehicle speed and the wheel angle.

30. The apparatus according to claim 27, wherein the detection means includes a yaw rate sensor for detecting a yaw rate to be applied to the vehicle, and the prediction means predicts the centrifugal acceleration based on the detected yaw rate.

31. The apparatus according to claim 27, further comprising an alarm device for generating an alarm in response to the warning signal.

* * * * *

UNITED STATES PATENT AND TRADEMARK OFFICE
CERTIFICATE OF CORRECTION

PATENT NO. : 6,266,594 B1
DATED : July 24, 2001
INVENTOR(S) : Kazuo Ishikawa

It is certified that error appears in the above-identified patent and that said Letters Patent is hereby corrected as shown below:

Column 3,
Line 66, please delete "FIG. 27" and insert therefor -- FIG. 27A --

Column 8,
Line 11, please delete "$\theta min \geq \theta \geq \theta max$" and insert therefor -- $\theta min \leq \theta \leq \theta max$ --
Line 15, please insert -- 21, -- in front of 27

Column 11,
Line 30, please delete "$\Delta Y/\Delta T \geq y0$," and insert therefor -- $\Delta Y/\Delta T$ is --
Line 31, please delete "$\Delta Y/\Delta T > y0$" and insert therefor "$\Delta Y/\Delta T \geq y0$ --
Line 66, please delete "$Gs > G2$" and insert therefor -- $Gs \geq G2$ --

Column 12,
Line 67, please delete "value 0" and insert therefor -- value $\theta$ --

Column 13,
Line 11, please insert -- if -- after "whereas"
Line 13, please delete "angie" and insert therefor -- angle --
Line 24, please delete "he" and insert therefor -- the --
Line 47, please delete "or Cs" and insert therefor -- of Gs --
Line 48, please delete "G2," and insert therefor -- G2). --

Column 16,
Line 53, please delete "CK-1" and insert therefor -- CK1 --

Column 21,
Line 54, please delete "←T" and insert therefor -- $\Delta T$ --

UNITED STATES PATENT AND TRADEMARK OFFICE
CERTIFICATE OF CORRECTION

PATENT NO. : 6,266,594 B1
DATED : July 24, 2001
INVENTOR(S) : Kazuo Ishikawa

It is certified that error appears in the above-identified patent and that said Letters Patent is hereby corrected as shown below:

Column 22,
Line 25, please delete "$(=\Delta L/\Delta T)$ and insert therefor -- $(= \Delta\omega/\Delta T)$ --
Line 40, please delete "from, the" and insert therefor -- from the --

Column 23,
Line 30, please delete "C1" and insert therefor -- G1 --
Line 50, please delete "$\eta = \Delta G/\Delta T = V^2 \cdot (1/r) \Delta T$" and insert therefor
-- $\eta = \Delta G/\Delta T = V^2 \cdot \Delta(1/r)\Delta T$ --
Line 56, please delete "chance" and insert therefor -- change --
Line 58, please delete "$\Delta L/\Delta T$" and insert therefor -- $\Delta V/\Delta T$ --
Line 60, please delete "$\eta = \Delta G/\Delta T = V^2 \cdot 1/r - 1/r1 \;|$" and insert therefor
-- $\eta = \Delta G/\Delta T = V^2 \cdot |\; 1/r - 1/r1 \;|$ --

Column 24,
Line 1, please delete "Fgv" and insert therefor -- Fg is --
Line 2, please delete "$\alpha \cdot g0$" and insert therefor -- $\alpha \cdot w0$ --
Line 6, please delete "(Gs and" and insert therefor -- (Gs) and --

Column 25,
Line 33, please delete "Pg" and insert therefor -- Fg --
Line 58, please delete "$Gs \geq CS\; (> G2)$" and insert therefor -- $Gs \geq C5\; (> G2)$ --

Column 27,
Line 16, please delete "$Ga = V \cdot \omega$" and insert therefor -- $Gs = V\omega$ --

Column 28,
Line 10, please delete "$\Delta Y/\Delta T = V - |1/r - 1/r1\;|$" and insert therefor
-- $\Delta Y/\Delta T = V \cdot |\; 1/r - 1/r1\;|$ --

UNITED STATES PATENT AND TRADEMARK OFFICE
CERTIFICATE OF CORRECTION

PATENT NO. : 6,266,594 B1
DATED : July 24, 2001
INVENTOR(S) : Kazuo Ishikawa

It is certified that error appears in the above-identified patent and that said Letters Patent is hereby corrected as shown below:

<u>Column 30,</u>
Line 29, please delete "$\Delta(1/r)=1|/r - 1/r1|$" and insert therefor
-- $\Delta(1/r)= |1/r - 1/r1|$ --

<u>Column 32,</u>
Line 58, please insert -- , -- after "angle"
Line 67, please delete "axles" and insert therefor -- axle, --

Signed and Sealed this

Twenty-first Day of May, 2002

Attest:

JAMES E. ROGAN
*Director of the United States Patent and Trademark Office*

*Attesting Officer*